(12) United States Patent
Sheinin et al.

(10) Patent No.: US 11,212,459 B2
(45) Date of Patent: Dec. 28, 2021

(54) COMPUTATIONAL IMAGING OF THE ELECTRIC GRID

(71) Applicants: TECHNION RESEARCH & DEVELOPMENT FOUNDATION LIMITED, Haifa (IL); THE GOVERNING COUNCIL OF THE UNIVERSITY OF TORONTO, Toronto (CA)

(72) Inventors: Mark Sheinin, Pittsburgh, PA (US); Yoav Schechner, Haifa (IL); Kiriakos Neoklis Kutulakos, Toronto (CA); Yoash Levron, Moshav Ein-Eiron (IL)

(73) Assignees: TECHNION RESEARCH & DEVELOPMENT FOUNDATION LIMITED, Haifa (IL); THE GOVERNING COUNCIL OF THE UNIVERSITY OF TORONTO, Toronto (CA)

( * ) Notice: Subject to any disclaimer, the term of this patent is extended or adjusted under 35 U.S.C. 154(b) by 106 days.

(21) Appl. No.: 16/614,432

(22) PCT Filed: May 16, 2018

(86) PCT No.: PCT/IL2018/050539
§ 371 (c)(1),
(2) Date: Nov. 18, 2019

(87) PCT Pub. No.: WO2018/211511
PCT Pub. Date: Nov. 22, 2018

(65) Prior Publication Data
US 2020/0177789 A1 Jun. 4, 2020

Related U.S. Application Data

(60) Provisional application No. 62/506,678, filed on May 16, 2017, provisional application No. 62/608,086, (Continued)

(51) Int. Cl.
*H04N 5/235* (2006.01)

(52) U.S. Cl.
CPC .................. *H04N 5/2357* (2013.01)

(58) Field of Classification Search
CPC ............. G06K 9/00536; G06K 9/4661; H04N 5/2357; H04N 5/3532
See application file for complete search history.

(56) References Cited

U.S. PATENT DOCUMENTS

| | | | |
|---|---|---|---|
| 6,710,818 B1 * | 3/2004 | Kasahara | H04N 5/235 348/226.1 |
| 2003/0030744 A1 | 2/2003 | Baer | |

(Continued)

OTHER PUBLICATIONS

S. Achar, J. R. Bartels, W. L. Whittaker, K. N. Kutulakos and S. G. Narasimhan. Epipolar time-of-flight imaging. In ACM TOG, 36(4), 2017. Retrieved Aug. 2, 2021; DOI: 10.1145/3072959.3073686.

(Continued)

*Primary Examiner* — Amy R Hsu
(74) *Attorney, Agent, or Firm* — The Roy Gross Law Firm, LLC; Roy Gross

(57) ABSTRACT

Systems and methods for imaging scenes illuminated by light sources that are powered by alternating current. Data concerning these light sources are extracted from the imagery. Systems comprising a rolling shutter imaging sensor and configured to de-flicker images with spatial flicker are also provided.

17 Claims, 31 Drawing Sheets
(31 of 31 Drawing Sheet(s) Filed in Color)

Related U.S. Application Data filed on Dec. 20, 2017, provisional application No. 62/664,199, filed on Apr. 29, 2018.

(56) References Cited

U.S. PATENT DOCUMENTS

| | | | | |
|---|---|---|---|---|
| 2009/0033763 | A1* | 2/2009 | Tsukihara | H04N 5/2353 348/226.1 |
| 2015/0207975 | A1* | 7/2015 | Nguyen | H04N 5/2357 348/228.1 |
| 2015/0279023 | A1* | 10/2015 | Lam | H04N 5/2357 348/86 |
| 2016/0042531 | A1* | 2/2016 | Nolan | H05B 47/29 348/135 |
| 2016/0192452 | A1 | 6/2016 | Ganick et al. | |
| 2017/0124689 | A1* | 5/2017 | Doba | G06T 7/593 |

OTHER PUBLICATIONS

F. B. Bianco, S. E. Konnin, C. Mydlarz and M. S. Sharma. Hypertemporal imaging of NYC grid dynamics. In Proc. ACM Intern. Conf, on Sys. for Energy-Efficient Built Env., 2016. Retrieved Aug. 2, 2021; DOI: 10.1145/2993422.2993570.

B.P. Bogert, M.J.R. Healy, and J.W. Tukey The quefrency analysis of time series for echoes: Cepstrum, pseudo-autocovariance, cross-cepstrum, and saphe cracking. In Time Series Analysis, M. Rosenblatt, Ed., (15)209243, 1963.

Y. Dai, H. Li and L. Kneip. Rolling shutter camera relative pose: generalized epipolar geometry. In Proc. IEEE CVPR, 2016. Retrieved May 2, 2016 from: https://arxiv.org/abs/1605.00475; arXiv:1605.00475.

P. Debevec, T. Hawkins, C. Tchou, H.-P. Duiker, W. Sarokin, and M. Sagar. Acquiring the reflectance field of a human face. In ACM SIGGRAPH, 145-156, 2000. Retrieved Aug. 2, 2021 from: https://www.pauldebevec.com/Research/LS/debevec-siggraph2000-high.pdf.

J. Gu, Y. Hitomi, T. Mitsunaga and S. Nayar. Coded rolling shutter photography: Flexible space-time sampling. In Proc IEEE ICCP, 2010. Retrieved Aug. 2, 2021; DOI:10.1109/ICCPHOT.2010.5585094.

Y. Hitomi, J. Gu, M. Gupta, T. Mitsunaga, and S. K Nayar. Video from a single coded exposure photograph using a earned over-complete dictionary. In Proc. IEEE ICCV, 287-294, 2011. Retrieved Aug. 2, 2021 from: https://citeseerx.ist.psu.edu/viewdoc/download?doi=10.1.1.294.2680&rep=rep1&type=pdf.

J. Holloway, A. C. Sankaranarayanan, A. Veeraraghavan, and S. Tambe. Flutter shutter video camera for compressive sensing of videos. In Proc. IEEE ICCP, 2012. Retrieved Aug. 2, 2021 from: http://jrholloway.com/projects/FSVC/FSVC.pdf.

K. Jo, M. Gupta and S. K. Nayar. DisCo: Display-camera communication using rolling shutter sensors. ACM TOG, 35(5), article 150, 2016. Retrieved Aug. 2, 2021 from: https://doi.org/10.1145/2896818.

H. R. V. Joze and M. S. Drew. Exemplar-based color constancy and multiple illumination. IEEE TPAMI, 3(5):860-873, 2014 Retrieved Aug. 2, 2021; DOI:10.1109/TPAMI.2013.169.

H. Y. Lee, H. M. Lin, Y. L. Wei, H. I. Wu, H. M. Tsai and K. C. J. Lin. Rollinglight: Enabling line-of-sight light-to-camera communications. In Proc. ACM 13th Annual Inter. Conf, on Mobile Systems, Appl., and Serv., 167-180, 2015. Retrieved Aug. 2, 2021; Retrieved Aug. 2, 2021 from: https://www.csie.ntu.edu.tw/~hsinmu/wiki/_media/paper/mobisys15.pdf.

B. Li, W. Xiong, W. Hu, and B. Funt. Evaluating combinational illumination estimation methods on real-world images. IEEE TIP, 23(3): 1194-1209, Mar. 2014 Retrieved Aug. 2, 2021; DOI: 10.1109/TIP.2013.2277943.

A. Litvinov and Y. Y. Schechner. Radiometric framework for image mosaicking. JOSA A 22(5):839-848, 2005. Retrieved Aug. 2, 2021 from: https://doi.org/10.1364/JOSAA.22.000839.

M. G. Masi, L. Peretto, R. Tinarelli, and L. Rovati. Modeling of the physiological behavior of human vision system under flicker condition. In IEEE Int. Conf. Harmonics & Quality of Power, 2008. Retrieved Aug. 2, 2021 from: https://vww.cs.toronto.edu/~kyros/pubs/18.iccp.rolling-ac.pdf.

S. U. Mehta, K Kim, D. Pajak, K. Pulli, J. Kautz and R. Ramamoorthi. Filtering environment illumination for interactive physically-based rendering in mixed reality. In ESGR 2015.

H. Murase and S. K Nayar. Visual learning and recognition of 3-D objects from appearance. In Int. J. Computer Vision, 14(1),5-24, 1995. Retrieved Aug. 2, 2021; DOI: https://doi.org/10.1007/BF01421486.

A. V. Oppenheim and R. W. Schafer. From frequency to quefrency: A history of the cepstrum. IEEE Signal Proc. Magazine, 2I(5):95-IO6, 2004. Retrieved Aug. 2, 2021 from: https://www.fceia.unr.edu.ar/prodivoz/Oppenheim_Schafer_2004.pdf.

M. O'Toole, J. Mather, and K N. Kutulakos. 3D shape and indirect appearance by structured light transport. IEEE TPAMI, 38(7):1298. 2016. Retrieved Aug. 2, 2021 from: http://www.cs.toronto.edu/~motoole/papers/14.cvpr.slt.pdf.

D. Reddy, A. Veeraraghavan, and R. Chellappa. P2C2: Programmable pixel compressive camera for high speed imaging. In Proc IEEE CVPR, 329-336,2011. Retrieved Aug. 2, 2021; DOI: 10.1109/CVPR.2011.5995542.

V. Rengarajan, A. N. Rajagopalan and R. Aravind. From bows to arrows: rolling shutter rectification of urban scenes. In Proc. IEEE CVPR, 2016. Retrieved Aug. 2, 2021 from: https://openaccess.thecvf.com/content_cvpr_2016/papers/Rengarajan_From_Bows_to_CVPR_2016_paper.pdf.

V. Rengarajan, Y. Balaji and A. N. Rajagopalan. Unrolling the shutter: CNN to correct motion distortions. In Proc IEEE CVPR, 2017 Retrieved Aug. 2, 2021; DOI 10.1109/CVPR.2017.252.

V. Reno, R. Marani, M. Nitti, N. Mosca, T. D'Orazio and E. Stella. A powerline-tuned camera trigger for ac illumination flickering reduction. IEEE Embedded Systems Letters, 9(4), 97-100, 2017. Retrieved Aug. 2, 2021; doi: 10.1109/LES.2017.2755443.

O. Saurer, K. Koser, J. Y. Bouguet and M. Pollefeys. Rolling shutter stereo. In Proc. IEEE ICCV, 2013. Retrieved Aug. 2, 2021 from: https://openaccess.thecvf.com/content_iccv_2013/papers/Saurer_Rolling_Shutter_Stereo_2013_ICCV_paper.pdf.

Y. Y. Schechner and S. K Nayar. Uncontrolled modulation imaging. In Proc. IEEE CVPR, 197-204, 2004. Retrieved Aug. 2, 2021 from: https://cgm.technion.ac.il/Computer-Graphics-Multimedia/Publications/Papers/2004/2004_Uncontrolled_Modulation_Imaging.pdf.

Y. Y. Schechner and N. Karpel. Attenuating natural flicker patterns. InMTSIIEEE OCEANS, 1262-1268, 2004. Retrieved Aug. 2, 2021; DOI:10.1109/OCEANS.2004.1405760.

P. Sen, B. Chen, G. Garg, S. Marschner, M. Horowitz, M. Levoy, and H. P. A. Lensch. Dual photography. In ACM SIGGRAPH, 745-755, 2005. Retrieved Aug. 2, 2021 from: https://doi.org/10.1145/1073204.1073257.

M. Sheinin, Y. Y. Schechner, and K. Kutulakos. Computational imaging on the electric grid. In Proc. IEEE CVPR, 2017. Retrieved Aug. 2, 2021 from: https://www.cs.toronto.edu/~kyros/research/acam/17.cvpr.acam.pdf.

S. Su and W. Heidrich. Rolling shutter motion deblurring. In Proc. IEEE CVPR, 2015. Retrieved Aug. 2, 2021 from: https://openaccess.thecvf.com/content_cvpr_2015/papers/Su_Rolling_Shutter_Motion_2015_CVPR_paper.pdf.

T. Tajbakhsh and R.-R. Grigat. Illumination flicker correction and frequency classification methods. In Proc.SPIE Electronic Imaging, (6502):1-10, 2007. Retrieved Aug. 2, 2021 from:https://doi.org/10.1117/12.709555.

T. Tajbakhsh and R. R. Grigat. Illumination flicker frequency classification in rolling shutter camera systems. In Proc. SIP, (7):288-293, 2007.

R. Talmon, I. Cohen, S. Gannot and R.R. Coifman. Diffusion maps for signal processing: A deeper look at manifold-learning techniques based on kernels and graphs. IEEE Signal Processing Magazine, 30(4), 75-86, 2013. Retrieved Aug. 2, 2021; doi: 10.1109/MSP.2013.2250353.

(56) References Cited

OTHER PUBLICATIONS

M. P. Tappen, W.T. Freeman, E.H. and Adelson. Recovering intrinsic images from a single image. In In NIPS, I367-I374, 2003. Retrieved Aug. 2, 2021 from: https://www.cs.cmu.edu/~efros/courses/AP06/Papers/tappen-nips-02.pdf.

A. Veeraraghavan, D. Reddy, and R. Raskar. Coded strobing photography: compressive sensing of high speed periodic videos. IEEE TPAMI, 33(4):671-686, 2011. Retrieved Aug. 2, 2021 from: https://www.researchgate.net/?publication/224130024_Coded_Strobing_Photography_Compressive_Sensing_of_High_Speed_Periodic_Videos.

D. Veikhermnan, A. Aides, Y. Y. Schechner, and A. Levis. Clouds in the cloud. In Proc. ACCV, 659-674, 2014. Retrieved Aug. 2, 2021 from: https://webee.technion.ac.il/~yoav/publications/Veikherman_Clouds_inthe_cloud.pdf.

M. Vollmer and K.-P. Moellmann. Flickering lamps. European Journal of Physics, 36(3), 2015. Retrieved Aug. 2, 2021; DOI: 10.1088/0143-0807/36/3/035027.

Mark Sheinin et al. Rolling Shutter Imaging on the Electric Grid. Webpage available at: https://www.marksheinin.com/rollingshutter http://webee.technion.ac.il/ yoav/researchIRScam.html http://www.dgp.toronto.eduIRScam, 2018.

Y. Weiss. Deriving intrinsic images from image sequences. In Proc. IEEE ICCV (2):68-75, 2001. Retrieved Aug. 2, 2021; DOI: 10.1109/ICCV.2001.937606.

G. Woo, A. Lippman, and R. Raskar. VRcodes: Unobtrusive and active visual codes for interaction by exploiting rolling shutter. In IEEE ISMAR, 59-64,2012 Retrieved Aug. 2, 2021; DOI: 10.1109/ISMAR.2012.6402539.

Y. Yoo, J. Im, and J. Paik. Flicker removal for CMOS wide dynamic range imaging based on alternating current component analysis. IEEE Trans. on Consumer Electronics, 60(3):294-301, 2014. Retrieved Aug. 2, 2021 from: https://www.researchgate.net/publication/273396959_Flicker_removal_for_CMOS_wide_dynamic_range_imaging_based_on_alternating_current_component_analysis.

PCT International Search Report for International Application No. PCT/IL2018/050539, dated Aug. 30, 2018, 5pp.

PCT Written Opinion for International Application No. PCT/IL2018/050539, dated Aug. 30, 2018, 7pp.

PCT International Preliminary Report on Patentability International Application No. PCT/IL2018/050539, dated Nov. 19, 2019, 8pp.

\* cited by examiner

Window reflection
captured by ACam recovered canonical times $t_k^{can}$ generated uniform
canonical times

COMPUTATIONAL IMAGING OF THE ELECTRIC GRID

CROSS REFERENCE TO RELATED APPLICATIONS

This application is a National Phase of PCT Patent Application No. PCT/IL2018/050539 having International filing date of May 16, 2018, which claims the benefit of priority of U.S. Provisional Patent Application No. 62/506,678, filed May 16, 2017, entitled "Computational Imaging on the Electric Grid"; U.S. Provisional Patent Application No. 62/608,086, filed Dec. 20, 2017, entitled "Rolling Shutter Imaging on the Electric Grid"; and U.S. Provisional Patent Application No. 62/664,199, filed Apr. 29, 2018, entitled "Rolling Shutter Imaging on the Electric Grid"; the contents of which are incorporated herein by reference in their entirety.

FIELD OF INVENTION

The present invention is in the field of imaging the electric grid.

BACKGROUND OF THE INVENTION

Power plants supply the city's electrical needs using alternating current (AC) power transmission. In AC power transmission, electrical energy is distributed by generating an AC voltage waveform (usually a sine wave) with a frequency of 50 or 60 Hz. This waveform is then distributed over the city's grid via power lines. The power plant generates three sine waves with phases spread apart by 120°. On a city scale, power transformers introduce additional phase shifts to these three phases. Each power consumer within the city, from street lamps to household power outlets, connects to ones of these three phases, arbitrarily.

As a result, whether outdoors at night or indoors at all hours, most of the light reaching our eyes—and our cameras—originates from artificial sources powered by the electric grid. These light sources change their intensity and spectral power distribution in response to the grid's alternating current, but their flicker is usually too subtle and too fast to notice with the naked eye (100 Hz or more). Artificial lighting produces unnatural-looking colors in photos and temporal aliasing in video. As a result, it is broadly considered undesirable. A method of harnessing this AC-induced lighting variation, recording, untangling and using these signals as a way of gaining information about the electrical grid, gaining information about light sources and improving/modifying pictures is greatly needed.

The foregoing examples of the related art and limitations related therewith are intended to be illustrative and not exclusive. Other limitations of the related art will become apparent to those of skill in the art upon a reading of the specification and a study of the figures.

SUMMARY OF THE INVENTION

Provided herein, in accordance with some embodiments, is a method comprising: operating a rolling shutter imaging sensor to capture one or more images of a scene that is illuminated, at least in part, by an AC-powered light source; applying a machine learning classifier to a set of pixel intensity values for a vertical or horizontal sequence of pixels corresponding to one flicker cycle, wherein the classifier is trained on a plurality of sets of pixel intensity values corresponding to a plurality of labeled light source; and determining an identity of the AC-powered light source, based on the application of the classifier.

Further provided herein, in accordance with some embodiments, is a method comprising: operating a rolling shutter imaging sensor to capture one or more images of a scene that is illuminated, at least in part, by an AC-powered light source; estimating pixel intensity values for a vertical or horizontal sequence of pixels in the one or more images, the sequence corresponding to a flicker cycle of the AC-powered light source; and determining an identity of the AC-powered light source, based on the estimation.

Further provided herein, in accordance with some embodiments, is a method comprising: operating an imaging sensor and a shutter to capture image data of a scene illuminator by a plurality of AC-powered light sources, wherein the shutter is associated with AC mains power and is controlled to open and close based on cycles of the AC mains power; and extracting, for the image data, different components related to different ones of the light sources.

Further provided herein, in accordance with some embodiments, is a method comprising: operating a rolling shutter imaging sensor to capture an image of a scene illuminated by an AC-powered light source, wherein said image is subject to spatial flickering, and generating a de-flickered said image by extracting, for each pixel in said image, a flicker-independent intensity value.

Further provided herein, in accordance with some embodiments, is a system comprising: an imaging device comprising a rolling shutter imaging sensor; at least one hardware processor; and a non-transitory computer-readable storage medium having stored thereon program instructions, the program instructions executable by the at least one hardware processor to: (a) operate the imaging device to capture an image of a scene illuminated at least by a light source powered by an AC (Alternating Current) power source, (b) estimate a set of pixel intensity values for a vertical or horizontal sequence of pixels corresponding to one flicker cycle, (c) compare said set of pixel intensity values to a database of sets of pixel intensity values corresponding to a plurality of light sources, (d) identify said light source as one of said plurality of light sources in the database.

In some embodiments, said estimating is based, at least in part, on applying to said image at least one digital bandstop filter having a frequency response which blocks multiple harmonics of a base frequency given as a multiple of (i) an inter-row or inter-column delay value of said rolling shutter, divided by (ii) a duration of a cycle of said AC power source.

In some embodiments, said identifying further comprises determining an electric phase of said light source.

In some embodiments, said identifying further comprises determining a point in a cycle of said AC power source in which said image was captured.

In some embodiments, said instructions further comprise operating said imaging device to capture a second image.

In some embodiments, an exposure time used for capturing said second image is equal to an integer multiple of said flicker cycle, and wherein said estimating is based, at least in part, on said second image.

In some embodiments, said light source is within direct view of said imaging device, and wherein said image is captured using an optical filter operatively coupled to said imaging device, wherein said optical filter has a transfer function that creates stripes in the captured image.

In some embodiments, (i) wherein said instructions further comprise operating said imaging device to capture a plurality of images, (ii) wherein said estimating is based, at least in part, on identifying said vertical or horizontal sequence of pixels relating to a diffuse surface in said images, and (iii) wherein said identifying comprises at least determining a point in a cycle of said AC power source in which each said image was captured.

In some embodiments, (i) wherein said instructions further comprise operating said imaging device to capture a plurality of images, (ii) wherein said estimating is based, at least in part, on estimating a temporal difference between each pair of images, based at least in part on relative intensity values of corresponding pixels in said pair of images, (iii) and wherein said identifying comprises at least determining a point in a cycle of said AC power source in which each said image was captured.

In some embodiments, said instructions further comprise operating said imaging device to capture a plurality of images over a specified period, and wherein said identifying further comprises generating a global-shutter image at any point during said period, based, at least in part, on estimating a Fourier series coefficients of a temporal signal observed at each pixel in said images.

Further provided herein, in accordance with some embodiments, is a system comprising: an imaging device comprising a rolling shutter imaging sensor; at least one hardware processor; and a non-transitory computer-readable storage medium having stored thereon program instructions, the program instructions executable by the at least one hardware processor to: (a) operate the imaging device to capture an image of a scene illuminated at least by a light source powered by an AC (Alternating Current) power source, (b) apply a machine learning classifier to a set of pixel intensity values for a vertical or horizontal sequence of pixels corresponding to one flicker cycle, wherein the classifier was trained on a plurality of sets of pixel intensity values corresponding to a plurality of labeled light source, wherein the application of the classifier results in identification of said light source of said image.

Further provided herein, in accordance with some embodiments, is a system comprising: an imaging device comprising a rolling shutter imaging sensor; at least one hardware processor; and a non-transitory computer-readable storage medium having stored thereon program instructions, the program instructions executable by the at least one hardware processor to: (a) operate the imaging device to capture an image of a scene illuminated by an AC-powered light source, wherein said image is subject to spatial flickering, (b) generate a de-flickered said image by extracting, for each pixel in said image, a flicker-independent intensity value.

In some embodiments, said extracting is based, at least in part, on applying to said image at least one digital bandstop filter having a frequency response which blocks multiple harmonics of a base frequency given as a multiple of (i) an inter-row or inter-column delay value of said rolling shutter, divided by (ii) a duration of a cycle of said AC power source.

Further provided herein, in accordance with some embodiments, is a system comprising: an imaging device comprising an imaging sensor and a shutter configured to move between a closed position and an open position; at least one hardware processor; and a non-transitory computer-readable storage medium having stored thereon program instructions, the program instructions executable by the at least one hardware processor to: (a) generate a signal having level changes corresponding to specified points in a cycle of a waveform detected from a mains alternate current (AC) outlet, (b) move said shutter into said open position based upon said level changes, for a specified number of said cycles, (c) operate the imaging device to capture image data of a scene illuminated by a plurality of light sources, wherein said image data is being captured when said shutter is in said open position during said specified number of cycles, and (d) extract, from said image data, components related only to a selected one of said plurality of light sources, wherein said extraction is based on at least some of (i) a light response function, (ii) a chromaticity value, and (iii) an electric phase of said light source.

In some embodiments, said imaging device further comprises a plurality of shutter masks operatively coupled to said shutter.

In some embodiments, said capturing comprises defining a sequence of one or more of said shutter masks, wherein each of said shutter masks is applied to said shutter in said sequence, during each period when said shutter is in a said open position within a said cycle.

In some embodiments, each said open position has a duration of at least 1 microsecond.

In some embodiments, said specified number of cycles is at least 2.

In some embodiments, said system is further configured for detecting at least some of a light response function, a chromaticity value, and an electric phase of a said light source.

In some embodiments, said system is further configured for creating and storing a database of light sources, based, at least in part, on said detecting.

In some embodiments, said databased further comprises, for each light source, at least some of a type, a manufacturer, and a power rating.

In some embodiments, said extraction is based, at least on part, on information retrieved from said database.

In some embodiments, said extraction further comprises performing at least one of reflections corrections and color corrections with respect to said image data.

Further embodiments and the full scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Exemplary embodiments are illustrated in referenced figures. Dimensions of components and features shown in the figures are generally chosen for convenience and clarity of presentation and are not necessarily shown to scale. The figures are listed below.

FIGS. 3A-C: (3A) Enlarged photo of a close-up of Haifa bay from FIG. 1A. Kilometers away, lamps are recognized from DELIGHT ACam-captured images. In conjunction, the grid phase at each bulb is recognized. (3B) A line graph of raw signals normalized by mean brightness, plotted along with their best-matching BRFs from DELIGHT. Colors correspond to the bulbs indicated in 3A. (3C) A line graph to illustrate how well the measured signals of 3B compare to each other. We shifted each by minus its recognized phase, effectively placing them all on grid phase zero. Observe that the signals from bulbs of the same type are indeed very similar.

DETAILED DESCRIPTION

The present invention, in some embodiments, provides systems and methods for imaging scenes illuminated at least by one or more light sources powered by alternating current. (AC) The systems and methods are capable of extracting data concerning those light sources, such as light response function, chromaticity and electric phase. Further, the systems and methods provide the capability to de-flicker images, as well as decompose scenes illuminated by multiple light sources into scenes illuminated by only a single light source. These systems and methods can employ a mechanical shutter or a rolling shutter.

Figure 1A:
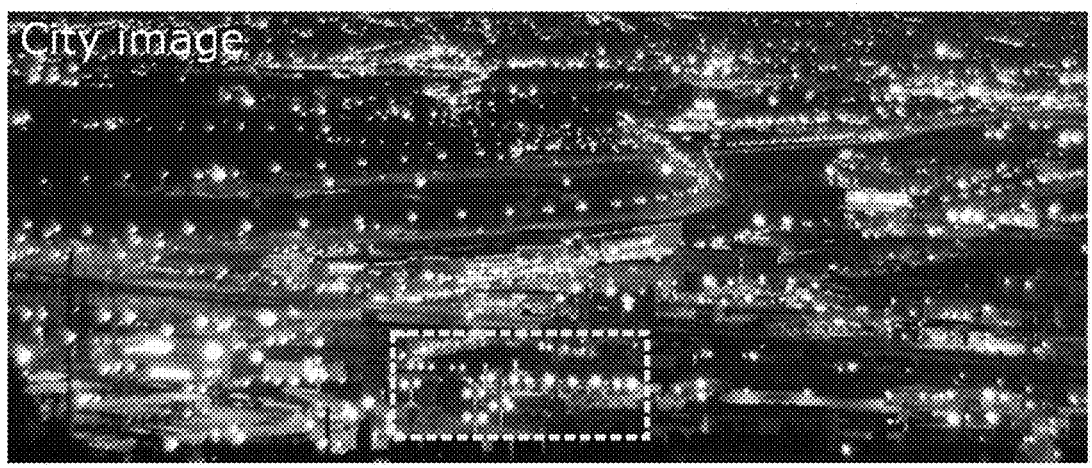
FIGS. 1A-C: (1A) Photo of a city-scale scene of Haifa. Inset is magnified in FIG. 3A. (1B) Image from 1A, but with the AC bulb response function, we can recognize which bulbs are used and the electric-grid phase of each is color coded. This enables statistical analysis of the grid. (1C) Photos of unmixing a scene into single-light-source component images.
Figure 1B:
Figure 1C:
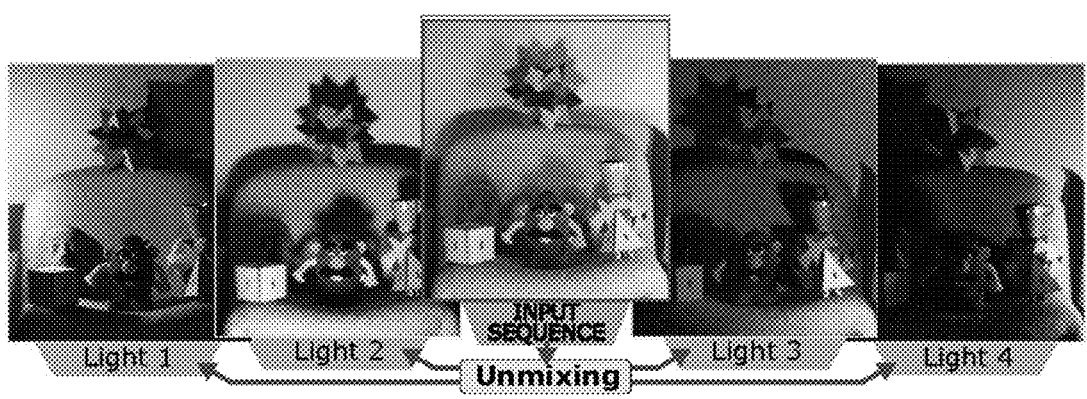

Ubiquitous AC-induced lighting variations are a very powerful visual cue—about indoor and outdoor environments, about the light sources they contain, and the electrical grid itself (FIG. 1A-B). To this end, we derive a model of time-varying appearance under AC lighting and describe a novel coded-exposure imaging technique to acquire it. Our approach yields several never-seen-before capabilities that we demonstrate experimentally with our "ACam" camera prototype: (1) acquiring a scene's transport matrix by passive observation only, (2) computing what a scene would look like if some of its lights were turned off or changed to a different bulb type (FIG. 1C), (3) recognizing bulb types from their temporal profiles, (4) analyzing city-scale grid phases in the electric grid, and (5) doing all the above under very challenging conditions—nocturnal imaging, an off-the-shelf (30 Hz) camera, dimly-lit scenes, uncontrolled environments, distances of meters to kilometers, and operation in two continents using both 110V and 220V AC standards. To enable all this, we compiled a database of temporal lighting response functions (DELIGHT) for a range of bulb types, the first of its kind in computer vision. Initially, the constraints in this approach were access to a power outlet and a largely stationary scene, however, the method has been adapted so that it can be performed on commercially available smartphones and cameras.

The key observation behind our work is that ambient AC lighting has a great deal of structure already. This is because of two fortunate facts: (1) AC light sources often do not flicker with the same phase even if located in the same space and (2) their temporal intensity profile is different depending on bulb type, make and model. The former comes from a desire to spread evenly the three phases of AC across light sources in order to balance load on the grid and make flicker even less noticeable. The latter comes from differences in power circuitry and in the mechanism of light emission (fluorescence, incandescence, LED) Thus, the light arriving at a camera pixel is a mixture of differently-shifted and potentially very diverse signals: even among household LED bulbs, we have observed modulations down to 10% of maximum intensity in some products and near-constant intensity in others. The precise mixture of these light signals differs from pixel to pixel in accordance with the scene's light transport properties.

Figure 13A:
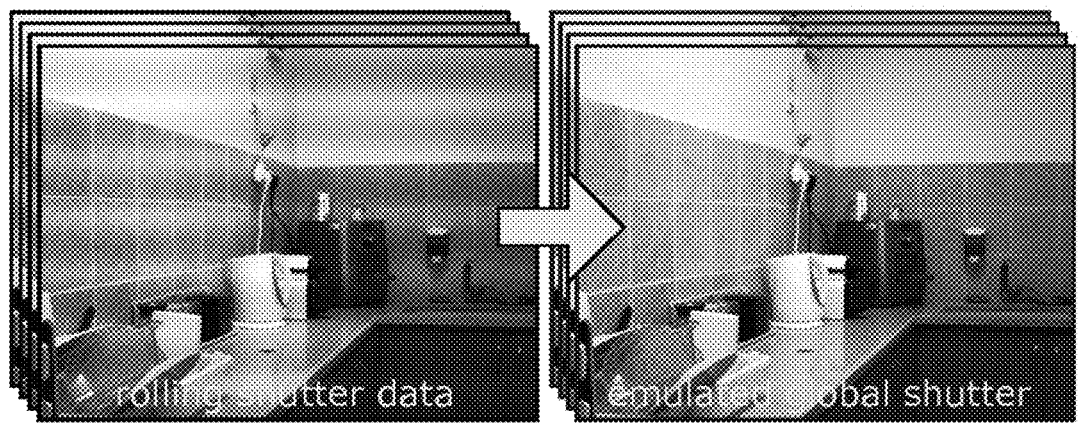
FIGS. 13A-B. (13A) Images showing that rolling-shutter imaging flicker of AC lighting results in a vertical wave pattern, and that we can compute global-shutter frames of the scene. (13B) Images of a scene at night of point emitters imaged with a standard lens and through an optical star filter. Along the vertical arms of the star point-spread function a rolling-shutter frame reveals wave-like modulation created by AC-induced flicker.

We also show that ubiquitous rolling-shutter cameras suffice to quantitatively sense and analyze flicker. A rolling shutter creates an inter-row delay of exposure. This delay is constant and very short, enabling fast and dense temporal sampling of flicker. This effect creates a spatiotemporal wave pattern in raw rolling-shutter images (FIG. 13A), which we derive herein. Moreover, regularity and periodicity of this pattern lead to a set of scene analysis approaches, suiting different data sizes and scene types (Table 1). Even a single rolling-shutter image yields useful information. This includes the types and electric phases of light sources connected to the grid; regions in the scene they illuminate; the bulbs' temporal response to AC; and the time at which the rolling-shutter image was acquired, relative to zero-crossing of the grid voltage.

same in any electrical outlet across the city. The reason is that electricity perturbations propagate at a speed on the order of the speed of light.

Figure 2A:
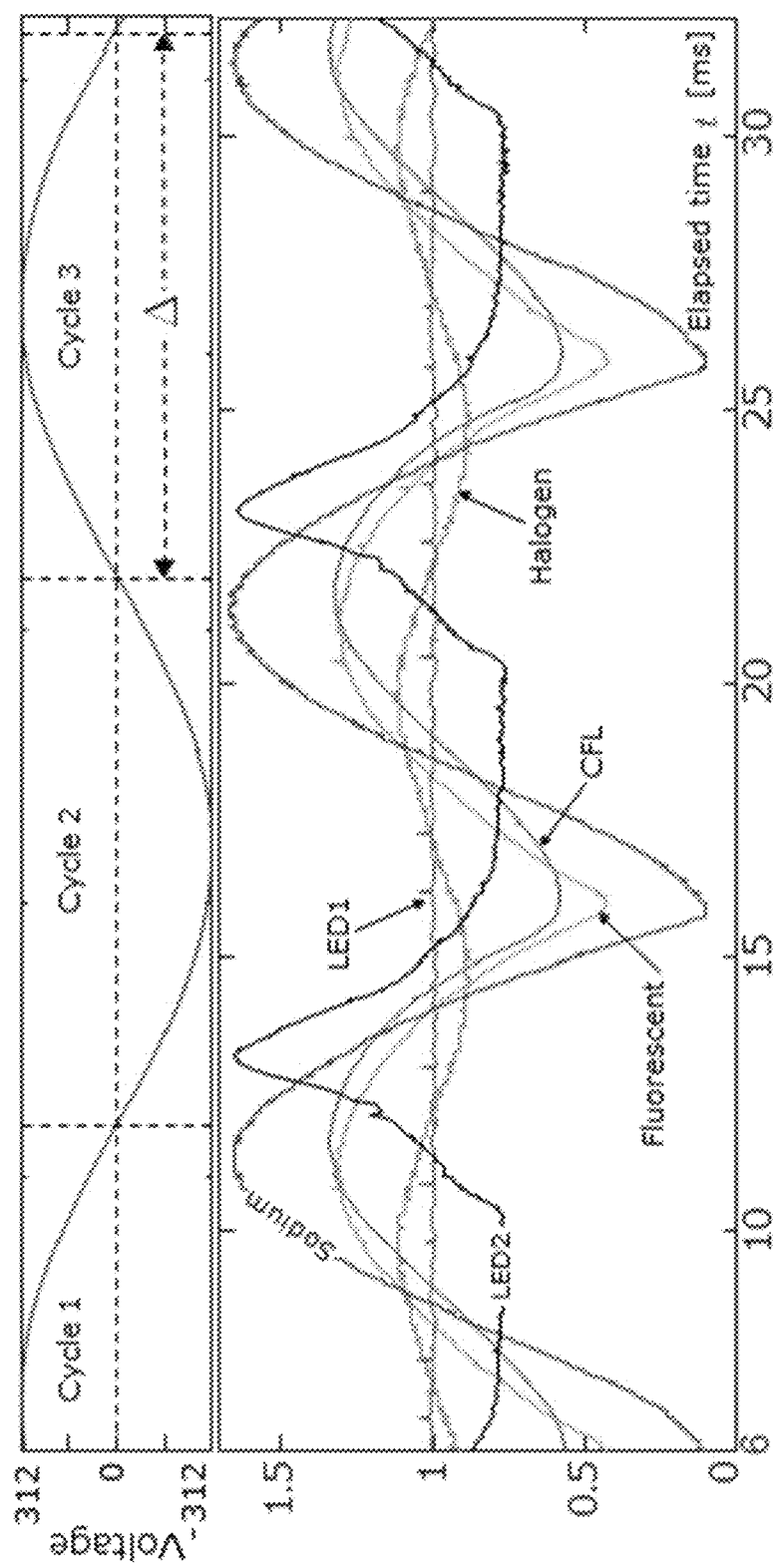
FIGS. 2A-C: (2A) The top shows a pure sine wave, fitted to the raw voltage at the reference outlet in Haifa. We count time t starting from a negative-to-positive zero crossing at this outlet. The bottom shows raw sine waves from a bare photodiode for a sample of the bulbs in DELIGHT, spanning multiple cycles. Each signal was normalized by its temporal average over one flicker cycle. For better visualization, LED2's waveform was attenuated by ⅓. (2B) The bottom shows a line graph of the corresponding monochrome BRFs from FIG. 2A. These were computed by acquiring signals like those of FIG. 2A (bottom) 200 times, averaging them, and cropping them at t∈[0,Δ]. Here LED 1's BRF was amplified ×10 to illustrate that it is not actually constant. The top shows the three-band BRF of one of the bulbs, measured by placing color filters in front of the photodiode. (2C) A photo of the bulbs and fixtures collection in DELIGHT.

In practice, the temporary frequency of the AC is determined from the time interval $\Delta$ between two successive zero crossings (FIG. 2A, top). Since there are two such crossings per period of the AC, its frequency is given by $$f=1/(2\Delta). \quad (1)$$

The electric grid carries AC in a discrete set $\mathbb{P}$ of grid phases, using distinct, exclusive sets of cables. In most scenes there are three such phases spaced $2\pi/3$ apart. Each outlet is connected to one of these grid phases. In our labs, we declared one outlet to be the reference, having phase $\phi=0$. Hence, $\mathbb{P}=\{0,2\pi/3,4\pi/3\}$ (see FIG. 1B). Some regions may be linked by a distribution transformer that shifts all phases by a constant $\phi'$. If the scene contains two such subregions then $\mathbb{P}=\{0,2\pi/3,4\pi/3, \phi',2\pi/3+\phi',4\pi/3+\phi'\}$. However, we did not encounter such a scene in our experiments. Now suppose we count time t with a stopwatch,

TABLE 1

| Method | Frames | Applies to | Key assumptions |
|---|---|---|---|
| Image deflicker | 1 | Diffuse surfaces | Spatially-smooth light transport, reflection at each pixel dominated by one source |
| Single-frame analysis | 1 | Diffuse surfaces | Spatially-smooth light transport, reflection at each pixel dominated by one source, BRF database |
| Two-frame analysis | 2 | Diffuse surfaces | Reflection at each pixel dominated by one source, BRF database |
| Star-filter analysis | 2 | Directly viewed sources | Image contains spatially separated light sources, BRF database, an optical star-filter attached to the lens |
| Surface-based | Many | Scenes having a diffuse surface | A wide, diffuse surface is in view |
| Emitter-based | Many | Any scene | Entire batch of frames |
| Render global shutter | Many | Any scene | After frame assignment by Example 15, one known scene bulb (for AC analysis application only) |
| Real-time | Stream | Scenes having a diffuse surface | Continuous assignment using Example 15, one known scene bulb (for AC analysis application only) |

Figure 13B:
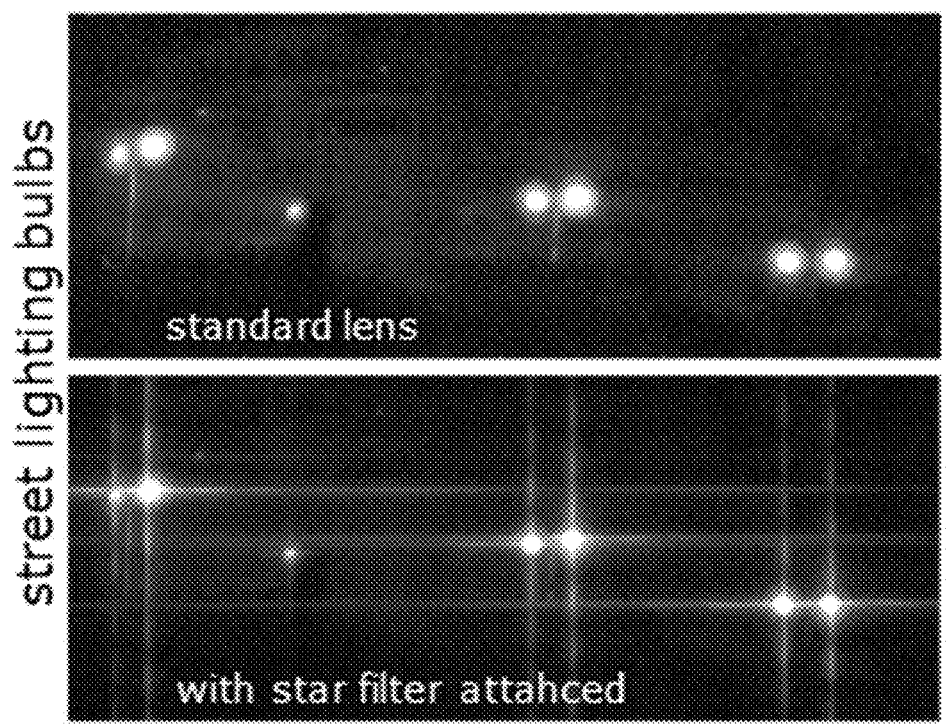

The results are significantly improved if the input short-exposure rolling-shutter frame is accompanied by an image whose exposure time lasts an integer multiple of the flicker cycle. The latter emulates illumination by direct current (DC), easing signal decomposition to flicker illumination modulation and a flicker independent image. Further, we induce the wave pattern spatially in an image of point emitters by mounting a star-filter on the camera (FIG. 13B).

Alternating Current in the Grid

We now describe a model of AC-modulated lighting. Power suppliers strive for a zero-mean sinusoidal AC voltage having a regular peak outlet amplitude $V_{max}$. Depending on the country $V_{max}$ is 170 or 312 zero-to-peak Volts, yielding a root-mean-squared voltage of 120 or 220 Volts, respectively. There are two exclusive standards, having nominal frequencies 50 Hz and 60 Hz. The Americas use the former, while Asia and Europe mainly use the latter. Imperfections in electricity generation slightly wiggle the AC frequency randomly. Hence, the AC is quasi periodic: for a short time span, the effective frequency is a perturbation of the nominal frequency. The wiggle is practically spatially invariant in spatiotemporal scales typical to computer vision: the temporary frequency of the AC is essentially the beginning from some negative-to-positive zero crossing of the voltage at the reference outlet (FIG. 2A, top). The AC voltage is then $$V(t)=V_{max}\sin(2\pi ft-\phi). \quad (2)$$

From AC Electricity to Light

A bulb $\beta$ is a system whose input is the voltage V(t) and its output is spectral flux $L_\beta(t,\lambda)$, where $\lambda$ denotes wavelength. Hypothesize for a moment a bulb which is electrically linear, i.e., the current J(t) satisfies a proportionality $J(t) \propto V(t)$. Then, hypothesize that this bulb is unmediated, converting electric power $J(t)V(t) \propto V^2(t)$ to flux directly and instantaneously. Thus, the spectral flux $L_\beta(t,\lambda)$ is equivalent to $V^2(t)$. Consequently, the hypothetical bulb flickers at double the AC frequency and becomes dark whenever V(t) goes to zero. We call this flickering period a cycle, whose duration is $\Delta$.

In practice, the transition from electricity to radiance is mediated by various mechanisms. Optical mediators include heat, gas discharge and phosphorescence. Non-incandescent bulbs generally have electronic components inside the bulb fixture, to which the lay person is oblivious. These components (diodes, inductors, etc.) mediate between voltage and spectral flux. Mediators have response times and nonlinearities. Hence the function $L_\beta(t,\lambda)$ is a distortion of $V^2(t)$: there is a delay, and $L_\beta(t,\lambda)$ generally does not go to zero during a cycle.

Denote by $\mathbb{B}$ the finite set of bulbs in use. Consider a bulb $\beta \in \mathbb{B}$, such as a particular fluorescent bulb in a brand fixture, whose time-averaged spectral flux over one cycle is $\overline{L_\beta}(\lambda)$ Relative to this average, at time t the bulb emission fluctuates as:

$$L_\beta(t,\lambda) = \overline{L_\beta}(\lambda) B_\beta(t,\lambda) \quad (3)$$

We define the unit-less function $B_\beta(t,\lambda)$ to be the spectral bulb response function (SBRF). This function has a time average of 1 for each wavelength and serves as an intrinsic model of a bulb's temporal behavior.

Acquiring a lamp's SBRF requires specialized equipment like integrating spheres and high-speed spectrometers. As such, measuring the SBRF directly is rather involved. A more practical model of bulb behavior is to consider the time-varying measurements from a camera or photodiode placed nearby (with or without color filters):

$$I_\beta(t,\sigma) = \overline{I_\beta}(\sigma) B^*_\beta(t,\sigma) \quad (4)$$

Here $I_\beta(t,\sigma)$ is the intensity measured at a pixel or photodiode at time t and spectral band $\sigma$, $\overline{I_\beta}(\sigma)$ is its temporal average and $B^*_\beta(t,\sigma)$ is the unit-less bulb response function (BRF). Unlike the SBRF, the BRF depends on the placement and spectral sensitivity of the device used. Specifically, the spectral flux and measured intensity are related by the integral $I_\beta(t,\sigma) = G \int L_\beta(t,\lambda) R(\sigma,\lambda) d\lambda$ where $R(\sigma,\lambda)$ is the sensor's spectral sensitivity. The geometric factor G converts emitted flux to pixel/photodiode intensity and depends on their placement, aperture, etc.

In general, both the SBRF and the BRF may exhibit a slightly different temporal profile across cycles (e.g., due to voltage polarity, warm-up period, ambient temperature, etc.) Here we ignore these secondary effects for the sake of simplicity, treating BRFs as essentially invariant to the number of cycles since time zero. Thus, our BRFs are fully specified by their values in very first cycle. In the following we restrict t to lie in the interval $[0,\Delta]$ and treat the BRF as a function that is defined over just that interval.

Cameras and photodiodes provide discrete samples of the continuous intensity $I_\beta(t,\sigma)$. Suppose $I_\beta(t,\sigma)$ is resolved into K samples within a cycle. These samples correspond to integrals of $I_\beta(t,\sigma)$ over consecutive time intervals of duration $\Delta/K$. Thus, Eq. (4) becomes $$i_\beta(\sigma) = \overline{I_\beta}(\sigma) b_\beta(\sigma) \quad (5)$$

$$= \underbrace{\left(\sum_\sigma \overline{I_\beta}(\sigma)\right)}_{brightness} \underbrace{\frac{\overline{I_\beta}(\sigma)}{\sum_\sigma \overline{I_\beta}(\sigma)}}_{chromaticity\ Q_\beta(\sigma)} \underbrace{b_\beta(\sigma)}_{BRF} \quad (6)$$

where the K-dimensional row vectors $i_\beta(\sigma)$ and $b_\beta(\sigma)$ hold the intensity and BRF samples, respectively.

Figure 2B:
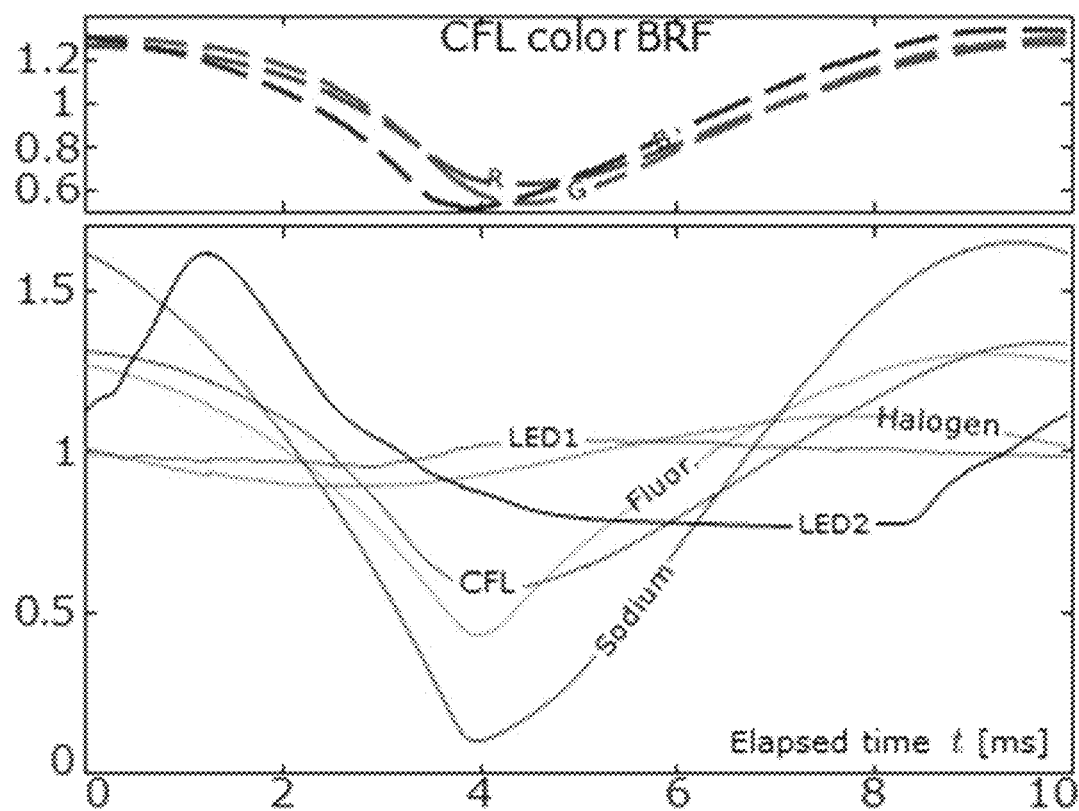

FIGS. 2A and 2B show several examples of sampled BRFs. As can be seen, all bulbs flicker at double the AC frequency (FIG. 2A, bottom) and are locked to individual cycles.

According to one aspect, there is provided a database of light sources. In some embodiments, the database comprises light source specific bulb response function (BRF). In some embodiments, the database further contains for a given light source at least one of: the manufacturer, the power rating, the bulb wattage and the sensor/filter used to capture the data. In some embodiments, the database is for use in at least one of: computerized imaging of a power grid, determining grid phase of a light source, determining bulb type of a light source, unmixing an image, denoising an image, white balancing an image and relighting an image. As used herein, "unmixing" refers to taking a scene illuminated by more than one light source and producing an image of the scene as it would appear when illuminated by only one, or only some of the slight sources. As used herein, "relighting" refers to converting an image of a scene that is illuminated by at least one light to the same scene illuminated by a different light source. In some embodiments, the different light source does not illuminate the original scene. In some embodiments, the image is illuminated by more than one light source and the relighting is generating an image illuminated by one, or only some, of the light sources. In some embodiments, the BRF is a monochrome BRF. In some embodiments, the BRF is a chromatic BRF. In some embodiments, the BRF is monochrome and/or chromatic.

ACam System

By a first aspect there is provided, a system comprising: an imaging device comprising an imaging sensor and a shutter wherein the shutter is configured to move between a closed position and an open positions; at least one hardware processor; and a non-transitory computer-readable storage medium having stored thereon program instructions, the program instructions executable by the at least one hardware processor to: generate a signal having level changes corresponding to specified points in a cycle of a waveform detected from a mains alternate current (AC) outlet, move the shutter into the open position based upon the level changes, for a specified number of the cycles, operate the imaging device to capture an image of a scene illuminated by a plurality of light sources, wherein the image data is being captured when the shutter is in the open position during the specified number of cycles, and extract from the image data, components related only to a selected one of the plurality of light sources, wherein the extraction is based on at least some of (i) a light response function, (ii) a chromaticity value, and (iii) an electric phase of the light source.

By another aspect, there is provided a method of at least one of reflection correction, color correction, white balancing, de-flickering, relighting, calculating a light response, calculating a chromaticity value, determining the electric phase of a light source in and decomposing an image, the method comprising operating a system of the invention to capture an image of a scene illuminated by at least one light source, and extracting data from the image.

As used herein, the term "chromaticity" refers to a quality of a color regardless of it luminance. In some embodiments, chromaticity comprises hue. In some embodiments, chromaticity comprises colorfulness. Colorfulness may also be referred to by saturation, chroma, intensity or excitation purity.

In some embodiments, the imaging device is a camera. In some embodiments, the camera is a fixed aperture camera. In some embodiments, the camera is a global shutter camera. In some embodiments, the camera is a mechanical shutter camera. In some embodiments, the camera is not a rolling shutter camera. In some embodiments, the camera is configured to keep its shutter open for at least 1, 2, 3, 5, 10, 20, 30, 40, 50, 60, 70, 80, 90, 100, 200, 300, 400, 500, 1000, 1500 or 2000 cycles of the electric grid. Each possibility represents a separate embodiment of the invention. In some embodiments, the camera is configured to keep its shutter open for between 2-2000, 2-1500, 2-1000, 2-900, 2-800, 2-700, 2-600, 2-500, 10-2000, 10-1500, 10-1000, 10-900, 10-800, 10-700, 10-600, 10-500, 50-2000, 50-1500, 50-1000, 50-900, 50-800, 50-700, 50-600, 50-500, 100-2000, 100-1500, 100-1000, 100-900, 100-800, 100-700, 100-600, 100-500, 150-2000, 150-15000, 150-1000, 150-900, 150-800, 150-1700, 150-600 or 150-500 cycles of the electric grid. Each possibility represents a separate embodiment of the invention. In some embodiments, the camera is configured to keep its shutter open for between 50 and 2000 cycles. In some embodiments, the camera is a black and white camera. In some embodiments, the camera is a color camera. In some embodiments, the camera is a black and white or color camera.

In some embodiments, the level changes correspond to a programmable delay from specified points in the cycle. In some embodiments, the specified points are at least one reference point. In some embodiments, the reference point is a zero-crossing. In some embodiments, the level change is the same for each cycle.

As used herein, the term "waveform detected from a mains alternate current outlet" refers to the waveform produced by an electric grid. The electric grid will be the grid of the city in which the outlet is located, and the cycle of the waveform will be the cycle of the electric grid. In this way the system of the invention can couple the action of the imaging device and other components of the system to specific points in the AC cycle. In some embodiments, the outlet draws power from the same power grid as the light sources. In some embodiments, the outlet draws power from a different power grid as the light sources. In some embodiments, the mains alternate current outlet is any power outlet. In some embodiments, the mains alternate current outlet is AC power outlet. In some embodiments, the mains alternate current outlet is any outlet in a city.

The system of the invention holds the shutter of the imaging device open for a specified number of cycles of the electric grid. In some embodiments, each open position has a duration of between 1 microsecond and 50 seconds, 1 microsecond and 40 seconds, 1 microsecond and 30 seconds, 1 microsecond and 20 seconds, 1 microsecond and 10 seconds, 1-50, 1-40, 1-30, 1-20, 1-10, 5-50, 5-40, 5-30, 5-20, 5-10, 10-50, 10-40, 10-30, 15-50, 15-40 or 15-30 seconds. Each possibility represents a separate embodiment of the invention. In some embodiments, each open position has a duration of at least 1 microsecond, 100 microseconds, 1000 microseconds, 10000 microseconds, 100000 microseconds, 1 seconds, 2 seconds, 5 seconds, 10 seconds or 20 seconds. Each possibility represents a separate embodiment of the invention.

In some embodiments, the system is connected to the AC electric grid. In some embodiments, the system comprises a direct connection to the AC electric grid. The system can thus open and close the shutter at the same point in the AC cycle. In some embodiments, the signal corresponds to an arbitrary start of the cycle. In some embodiments, at least one signal is produced. In some embodiments a plurality of signals is produced. In some embodiments, the specified number of cycles is at least 10, 20, 30, 40, 50, 60, 70, 80, 90, 100, 200, 300, 400, or 500 cycles of the electric grid. Each possibility represents a separate embodiment of the invention. In some embodiments, the specified number of cycles is between 10-2000, 10-1500, 10-1000, 10-900, 10-800, 10-700, 10-600, 10-500, 50-2000, 50-1500, 50-1000, 50-900, 50-800, 50-700, 50-600, 50-500, 100-2000, 100-1500, 100-1000, 100-900, 100-800, 100-700, 100-600, 100-500, 150-2000, 150-15000, 150-1000, 150-900, 150-800, 150-1700, 150-600 or 150-500 cycles of the electric grid.

Each possibility represents a separate embodiment of the invention. In some embodiments, the shutter is opened and closed in response to the same signal. In some embodiments, the shutter is opened and closed at the same specified point of the cycle.

In some embodiments, the scene is illuminated by at least one light source. In some embodiments, the scene is illuminated by at least 2 light sources. In some embodiments, the scene is illuminated by a plurality of light sources. In some embodiments, the light sources are attached to an AC power grid. In some embodiments, the light sources are all attached to the same AC power grid. In some embodiments, the light sources are attached to the same AC power grid as the system of the invention. In some embodiments, at least one light source is a natural light source. In some embodiments, at least one light source is not a man-made light source. In some embodiments, at least one light source does not run on AC power. In some embodiments, at least one light source is not connected to an AC power grid. In some embodiments, the light source is in a database. In some embodiments, the light source is in the DELIGHT database. In some embodiments, the light source is not in the DELIGHT database. In some embodiments, the light source is selected from a fluorescent bulb, a non-fluorescent bulb, an LED, an incandescent bulb, a halogen bulb, a compact fluorescent bulb, a sodium lamp, a mercury lamp and a metal halide lamp.

In some embodiments, the extraction is based on a light response. In some embodiments, the extraction is based on chromaticity value. In some embodiments, the extraction is based on an electric phase of the light source. In some embodiments, the extraction is based on at least one of a light response function, a chromaticity value, and (iii) an electric phase of the light source. In some embodiments, the phase of the light source is extracted. In some embodiments, an image of the scene illuminated by only some of the light sources is extracted. In some embodiments, an image of the scene illuminated by only one light source is extracted. In some embodiments, a de-flickered image is extracted. In some embodiments, an image of the scene illuminated by a different light source is extracted. In some embodiments, the type of bulb in the light source is extracted. In some embodiments, a combination of the above is extracted. In some embodiments, the extraction comprises performing a de-flickering of the image. In some embodiments, the extraction comprises performing a relighting of the image. In some embodiments, the extraction comprises performing a decomposition of the image. In some embodiments, the extraction comprises performing reflection correction with respect to the image. In some embodiments, the extraction comprises performing color correction with respect to the image. In some embodiments, the extraction comprises performing white balancing to the image. In some embodiments, the extraction comprises performing a combination of the above described alterations with respect to the image. In some embodiments, the extraction comprises at least one of reflection correction, color correction, white balancing, de-flickering, relighting, and decomposing the image. In some embodiments, the extraction comprises at least one of reflection correction, color correction, white balancing, de-flickering, relighting, calculating a light response, calculating a chromaticity value, determining the electric phase of and decomposing the image.

In some embodiments, the imaging device further comprises at least one shutter masks. In some embodiments, the system further comprises at least one shutter masks. In some embodiments, the imaging device further comprises a plurality of shutter masks. In some embodiments, the system further comprises a plurality of shutter masks. In some embodiments, the shutter masks are operatively couple to the shutter. In some embodiments, the capturing comprises defining a sequence of one or more shutter masks. In some embodiments, each successive image in said series of images is captured using one of said shutter masks in the sequence. In some embodiments, each of the shutter masks is applied to the shutter in the sequence, during each period when the shutter is in an open position within a cycle. In some embodiments, each shutter mask corresponds to a specified point in the cycle. In some embodiments, each mask is placed in front of the shutter only during the specified point in the cycle. In some embodiments, the sequence of shutter masks moves to block the shutter during one imaging. In this way during one imaging, which last many cycles, there is always the same mask on the shutter during the same point of the cycle.

In some embodiments, the shutter masks are spatially configurable. In some embodiments, a shutter mask blocks, or turns off, at least one pixel. In some embodiments, a shutter mask blocks or turns off, more than one pixel. In some embodiments, a shutter mask blocks or turns off, a block of pixels.

In some embodiments, the specified points are zero points of the waveform. In some embodiments, the specified points are zero points crossings of the waveform. In some embodiments, the specified points may be any time in the waveform.

In some embodiments, the system further comprises a microprocessor. In some embodiments, the microprocessor is an Arduino. In some embodiments, the microprocessor coordinates the opening/closing of the shutter, and/or the moving of the masks, with the AC cycle. In some embodiments, the system further comprises an AC voltage transformer. In some embodiments, the system is compatible with a voltage of 120 and/or 220 volts. In some embodiments, the system is compatible with a frequency of 50 Hz and/or 60 Hz.

In some embodiments, the system is further configured for detecting at least one of a light response function, a chromaticity value and an electric phase of a light source. In some embodiments, the system is further configured for creating and storing a database of light sources, based, at least in part on the detection. In some embodiments, the database is the DELIGHT database. In some embodiments, the database is a continuation of the DELIGHT database. In some embodiments, the extraction is based, at least in part, on information from the database. In some embodiments, the extraction is based, at least in part, on information from the DELIGHT database.

Recognizing AC Lights and Grid Phase

Let us point a camera at a bulb in the scene. The measured signal $i(\sigma)$ follows Eq. (6). This signal is normalized by the mean brightness, yielding $i^{norm}(\sigma)$. Now, all temporal variations are due to the bulb's BRF, chromaticity and grid phase. We recognize the bulb and its phase using:

$$\{\hat{\beta}, \hat{\phi}\} = \underset{\beta \in \mathbb{B}, \phi \in \mathbb{P}}{\operatorname{argmin}} \sum_\sigma \| i^{norm}(\sigma) - Q_\beta(\sigma) \operatorname{shift}(\phi, b_\beta(\sigma)) \|^2 \quad (7)$$

where $\mathbb{B}$ is the set of bulbs in DELIGHT, $\mathbb{P}$ is the set of possible grid phases, $Q_\beta(\sigma)$ is the chromaticity of bulb $\beta$ in the database, and shift ( ) circularly shifts to the right the bulb's sampled BRF by phase $\phi$. When using a monochrome camera, there is only one spectral band so $Q_\beta(\sigma)=1$.

Theory of AC Light Transport

To simplify notation, we drop the spectral band $\sigma$ wherever we can. A scene contains static objects and is illuminated by S light sources. It is observed by a camera having a linear radiometric response and P pixels. As in Example 2, we resolve the time-varying image into K frames.

Now suppose only source s is on, with chromaticity $Q_s$, BRF $b_{\alpha S}$ and phase 0. Furthermore, suppose matrix $I_s$ holds the resulting single-source image sequence. Each column of $I_s$ is a frame and each row is the intensity of one pixel through time. At frame k pixel p's intensity follows Eq. (6):

$$I_s[p,k] = \tau_{ps} Q_s b_s[k] \quad (8)$$

where brackets denote individual elements of $I_s$ and $b_s$. The factor $\tau_{ps}$ expresses light transport. This factor specifies the total flux transported from source s to pixel p via all possible paths. This transport encapsulates global factors such as the camera's numerical aperture and spectral response; spatial and angular variations in radiance at pixel p by source s; the BRDF at p when illuminated by s; shadows, inter-reflections, etc.

Expressing Eq. (8) in matrix form we obtain:

$$I_s = \tau_s Q_s b_s \quad (9)$$

Here column vector $\tau_s$ concatenates the transport factors of all pixels for source s. It follows that individual frames of the sequence are just scalings of vector $\tau_s$.

Now, the scene is illuminated by S sources connected to phase zero. The image sequence becomes a superposition of S single-source sequences, one per source s:

$$I = I_1 + \ldots + I_s + \ldots + I_S \quad (10)$$

Suppose the chromaticities and BRFs of these sources are $b_1, \ldots, b_S$ and $Q_1, \ldots, Q_S$ respectively. Combining Eqs. (9) and (10), factorizing various terms and denoting $^T$ for transpose we obtain $$I = [\tau_1 \ldots \tau_S][Q_1 b_1^T \ldots Q_S b_S^T]^T \quad (11)$$

$$= \underbrace{[\tau_1 \ldots \tau_S]}_{transport\, matrix\, T} \underbrace{\begin{bmatrix} Q_1 & & 0 \\ & \ddots & \\ 0 & & Q_S \end{bmatrix}}_{chromaticity\, matrix\, Q} \underbrace{\begin{bmatrix} b_1 \\ \vdots \\ b_S \end{bmatrix}}_{BRF\, matrix\, B} \quad (12)$$

$$= TQB. \quad (13)$$

Matrix T is the scene's P×S transport matrix. Each column of T describes the appearance of the scene when a specific source is turned on. This matrix is time-invariant and generally unknown.

Finally, suppose the sources in the scene have phases $\phi_1, \ldots, \phi_S$ instead of being zero. The BRF matrix in Eq. (13) now contains BRFs that have been circularly shifted individually according to their sources' phase:

$$B = [\operatorname{shift}(\phi_1, b_1)^T \ldots \operatorname{shift}(\phi_s, b_s)^T]^T \quad (14)$$

Unmixing: Source Separation

Single-source sequences are linearly mixed in the data I. We seek unmixing, i.e., linear source separation. The key is to estimate the transport matrix T based on Eq. (13).

Consider any two sources $s_1$ and $s_2$ that are connected to the same phase and have the same BRF. According to Eq. (9), the two-source sequence due to these sources is $$I_{s_1} + I_{s_2} = (\tau_{s_1} Q_{s_1} + \tau_{s_2} Q_{s_2}) \operatorname{shift}(\phi_{s_1}, b_{s_1}) \quad (15)$$

Thus, the contributions of the two sources add up as if the scene is illuminated by a single source having the same phase and BRF. The contribution of these sources is therefore inseparable. Divide all sources used in the scene into subsets of sources, where each subset has no linear dependency to another. We consider unmixing only across these linearly-independent subsets. For the rest of the paper we refer to these independent subsets as the S "sources.".

Assume we know QB. This is measured in two ways:
(a) Sources are very often in the field of view. Thus, their BRFs and chromaticities can be acquired directly by our ACam. This is also possible for pixels dominated by one source (e.g., reflections from nearby surfaces).
(b) Sampling the signal as in (a) and then using DELIGHT and the recognition method described herein.

The transport matrix is estimated using $$\hat{T} = \underset{T \geq 0}{\operatorname{argmin}} \|W \odot (I - TQB)\|_F^2, \quad (16)$$

where $\odot$ denotes a Hadamard (element-wise) multiplication and $\|\cdot\|_F$ is the Frobenius norm. The P×K weight matrix W discards saturated data:

$$W[p,k] = \begin{cases} 0 & \text{if any spectral band is saturated at } I[p,k] \\ 1 & \text{otherwise.} \end{cases} \quad (17)$$

Eq. (16) is a simple least-squares estimator. Due to noise and minor differences between sources of the same class, the assumption of a known QB is not precisely met. To counter slight inconsistencies, a refinement allows B to change a bit. Using $\hat{T}$ derived in Eq. (16), we compute:

$$\hat{B} = \underset{B \geq 0}{\operatorname{argmin}} \|W \odot (I - \hat{T}QB)\|_F^2. \quad (18)$$

After this least-squares estimation of $\bar{B}$, the estimation in Eq. (16) is applied again using $\hat{B}$. We have observed in our experiments that, unless this refinement is done, the result may suffer from minor artifacts.

Each column of $\hat{T}$ is an unmixed image of the scene. This image is already white balanced because the chromaticities of all sources are factored into Q.

High Dynamic Range, Denoising, and Reimaging

We can reconstruct the single-source image sequence of a source s using $$I_s = \hat{\tau}_s Q_s \text{shift}(\phi_s, b_s) \quad (19)$$

where $\hat{\tau}_s$ is the corresponding column of $\hat{T}$. The intensities in this sequence can safely exceed the saturation level of the sensor. This is because Eqs. (16) and (17) bypass saturated data when estimating $\hat{T}$. Intensities in the captured image sequence suffer from sensor readout noise. Yet, since Eq. (19) forces all pixels to vary in synchrony according to a common BRF, the rendered sequence $\hat{I}_s$ is less noisy than the input data.

Last but not least, light sources can be changed to bulbs that were not seen at all during the acquisition. Changing bulbs means changing their chromaticity and BRF to that of other bulbs (e.g., in DELIGHT or merely imagined). Moreover, we can change the grid phase of light sources and can use a diagonal amplification matrix A to amplify or de-amplify them. This leads to generalized relighting:

$$I^{relight} = \hat{T}[AQB]^{relight} \quad (20)$$

Semi-Reflection Separation

To separate a semi-reflection from a transmitted scene, we show a new principle: passive AC-based unmixing. We realize this principle using either one of the following two mechanisms:

AC-illuminated scene: When all light sources originate from AC-powered bulbs, unmixing is done as described in section "Unmixing: source separation".

Natural illumination involved: Scene illumination contains an outdoor component from daylight.

The indoor environment is illuminated by two kinds of sources. First, part of the natural daylight illuminates the indoors through a window. The second light source indoors is connected to the AC grid. In this case $\tau_{out}$ and $\tau_{ac}$ correspond to the two sources. Since daylight is approximately time-invariant at timescales of a few thousand cycles, its BRF is a vector of all ones. The bulb's BRF $b_{ac}$ is unknown, i.e., we are not relying on any database or known grid phase.

As before, our input data is an image sequence I. We ignore chromaticities for brevity. Now consider two frames $k_1$ and $k_2$ with $b_{ac}[k_1] > b_{ac}[k_2]$. The corresponding images, represented by columns of I, are:

$$I[k_1] \tau_{blackout} \tau_{blackac} b_{ac}[k_1] \quad (21)$$

$$I[k_2] = \tau_{blackout} T_{blackac} b_{ac}[k_2] \quad (22)$$

It follows that vectors $\tau_{ac}$ and $I[k_1] - I[k_2]$ are equal up to a scale factor. Along similar lines, it is possible to show that vectors $\tau_{out}$ and $I[k_2] - AI[k_i]$ are also equal up to a scale factor for some unknown scalar A. We estimate this scalar using independent component analysis (ICA). Specifically, A is optimized to minimize the mutual information of vectors $I[k_1] - I[k_2]$ and $I[k_2] - AI[k_i]$.

Rolling-Shutter Model for AC Flicker

We now briefly describe the model of illumination under AC power. AC voltage is approximately a sinusoid in time. Its frequency f is either 50 Hz or 60 Hz, depending on the country. Bulbs flicker at double the AC frequency, in a cycle lasting $\Delta = 1/(2f)$ seconds. Each bulb is powered by one of three electric grid lines, having respective AC phases $\phi \in \{0°, 120°, 240°\}$. Any electric outlet or bulb connected to one of these power lines can be considered as a reference, i.e., having $\phi = 0°$.

Figure 14:
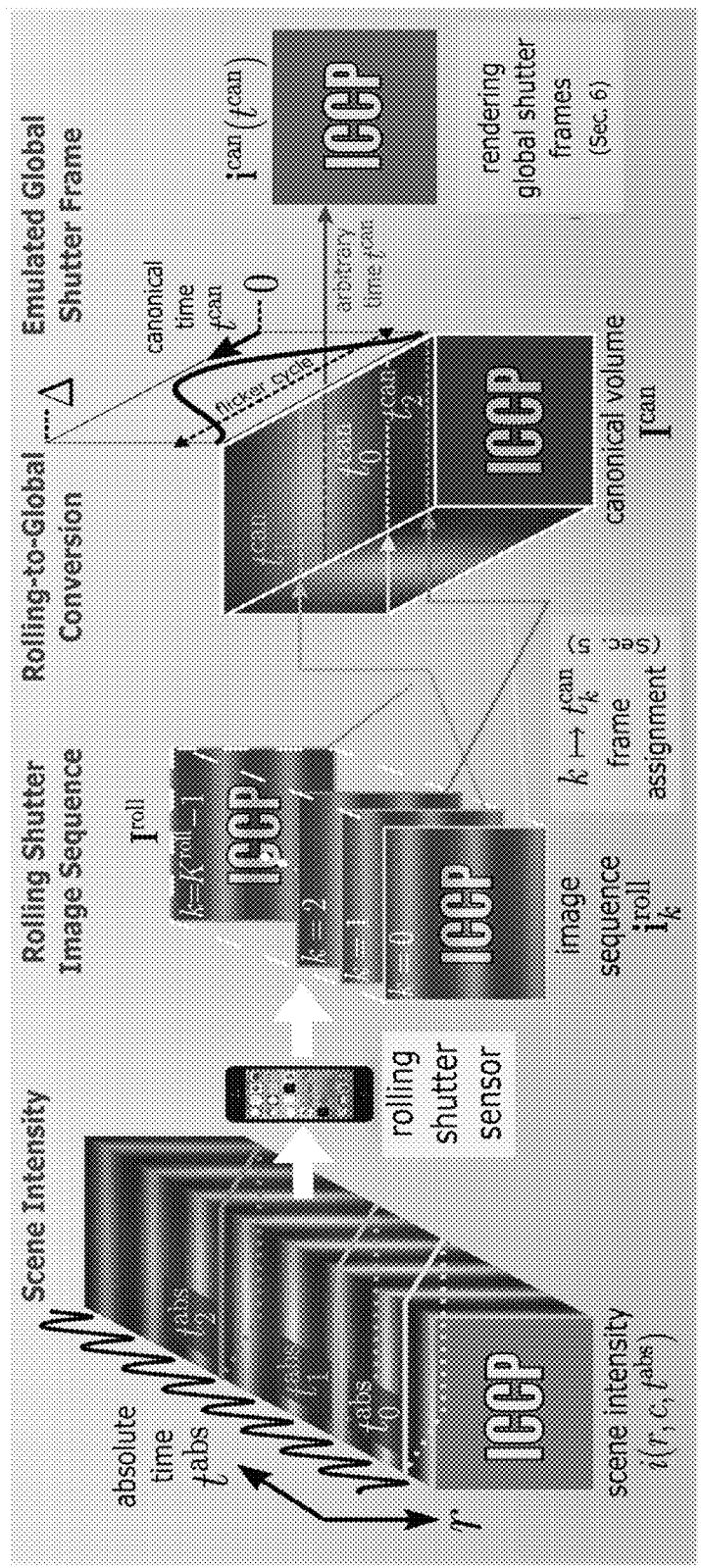
FIG. 14. A schematic of rolling-shutter imaging under AC lighting. First a rolling-shutter camera captures a sequence of frames. In frame k, the topmost row is sampled at absolute time $t_k^{abs}$. Row r is sampled with constant delay D relative to row r−1. Thus, the space-time volume $i(r, c, t^{abs})$ is sampled along diagonal slices. The resulting rolling-shutter frames exhibit a wave pattern in each frame and across frames. Each $t_k^{abs}$ corresponds to an in-cycle canonical time $t_k^{can} \in [0,\Delta]$, where $\Delta$ is the flicker cycle. Finally, once we assign canonical times to all frames, we can compute a global-shutter frame of the scene at any arbitrary canonical time $t^{can}$.

Events of interest, such as raw image acquisition, take place in absolute time, denoted $\tau^{abs} \in \mathbb{R}$ (FIG. 14). On the other hand, because flicker is periodic, it suffices to define flicker by an in-cycle canonical time $t^{can} \in [0, \Delta]$. We set the origin $t^{can} = 0$ to be a zero crossing of the AC voltage at a reference bulb. A bulb type is denoted by $\beta$. The bulb flicker is its response to AC. The response is expressed as a unit-less bulb response function (BRF), denoted $B_\beta(t^{can})$. For every color channel the BRF satisfies $$\frac{1}{\Delta} \int_0^\Delta B_\beta(t^{can}) dt^{can} = 1. \quad (24)$$

Herein, the time variable $t^{can}$ ranges over the circular domain $[0, \Delta]$. If a bulb is connected to an outlet of phase $\phi$, then the bulb's flicker response is $B_\beta(t^{can} - \phi \Delta / 2\pi)$. BRFs can be measured "in the field" (see Example 18) or obtained from a database such as DELIGHT.

An image has R×C pixels, where r indexes rows and c indexes columns. The scene is illuminated by S sources, indexed by s. Let $B_s$ be the BRF of the bulb type to which source s belongs, and $\phi_s$ be the electric phase to which this source is connected. The intensity of an object illuminated by S sources at pixel (r,c) is $$i(r,c,t^{can}) = \sum_{s=1}^{S} \tau_s(r,c) B_s(t^{can} - \phi_s \Delta/2\pi) \quad (25)$$

Here $\tau_s$ (r,c) is the response of image pixel (r,c) to illumination by s. It encompasses image radiance factors that depend on the distance of the object from the light source, surface slope, albedo, lens aperture, bidirectional reflectance, inter-reflections and exposure duration $T_{exp}$. That is, $\tau_s$ (r,c) is the light transport coefficient at this pixel. The transport coefficients in all pixels constitute a matrix $\tau_s$.

In a rolling shutter, the exposure of each row is delayed by D seconds relative to the preceding row. Though some rolling-shutter sensors delay columns rather than rows, without loss of generality, we assume a sensor with inter-row delay. Let row 0 (topmost row) be acquired at absolute time $t_k^{abs}$, where k=0, 1, . . . is the discrete index of a captured rolling-shutter frame. Row r is thus acquired at time $$t_{k,r}^{abs} = t_k^{abs} + rD \quad (26)$$

Rows thus correspond to distinct temporal samples. Often D is much smaller than the exposure duration $T_{exp}$. This enables a high temporal sampling rate (1/D Hz), while enough photons accumulate during $T_{exp}$ for a high signal.

We now model image formation of an AC-illuminated scene that is viewed by a rolling-shutter camera (FIG. 14). The topmost row of a rolling-shutter image k is acquired at $t_k^{abs}$. This $t_k^{abs}$ corresponds to some in-cycle canonical time $t_k^{can}$. This means that there is a mapping $$k \mapsto t_k^{can} \in [0, \Delta]. \quad (27)$$

We describe herein how this mapping can be derived from image data. For the moment, let this mapping be known. Following Eq. (26), row r of rolling-shutter frame k is acquired at canonical time $$t_{k,r}^{can} = t_k^{can} + rD. \quad (28)$$

Let $i_k^{roll}$ (r,c) be the intensity measured at pixel (r,c) of frame k. Combining Eqs. (25, 28), this intensity is equal to $$i_k^{roll}(r,c) = \sum_{s=1}^{S} \tau_s(r,c) B_s(t_k^{can} + rD - \phi_s \Delta/2\pi) \quad (29)$$

Figure 15A:
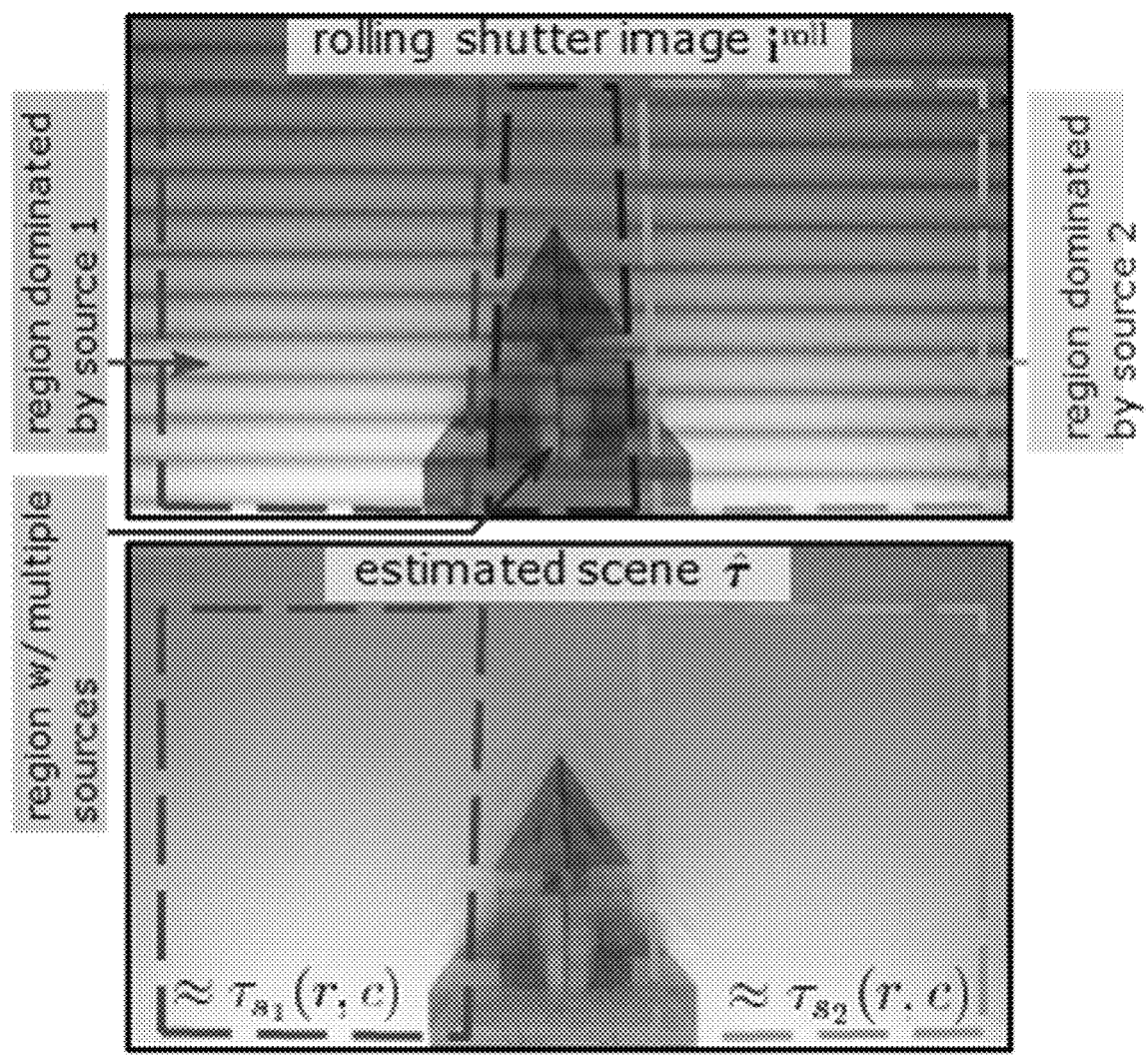
FIGS. 15A-B. (15A) Rolling-shutter image of a scene illuminated from its sides by two identical bulbs powered by different AC phases. In the top image flicker induces wave patterns. An image with single-frame de-flickering using a digital bandstop filter tuned to the flicker frequency and its higher harmonics is also provided. (15B) Line graph of the spectrum of a single image column before and after deflicker filtering. In the x-axis, the image spatial frequency (in pixel units) is multiplied by 1/D to yield the corresponding temporal frequency.
Figure 15B:
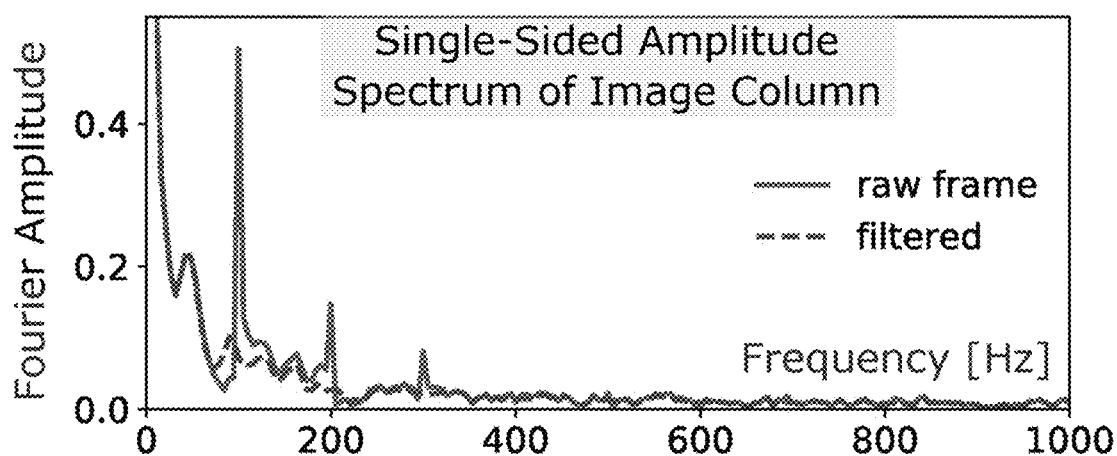

Eq. (29) corresponds to a spatial vertical wave pattern with a period of Δ/D rows (FIG. 15A-B). To see this mathematically, consider a region Ω for which $\tau_s(r,c)$ is vertically uniform, i.e., independent of r. Then, Eq. (29) satisfies $$i_k^{roll}(r,c) = i_k^{roll}(r + \Delta/D, c) \quad (30)$$

For a sequence of rolling-shutter frames, Eq. (29) expresses a spatiotemporal wave function that moves vertically with upward velocity $$v = 1/D \quad (31)$$

pixels per second. To see this, consider two consecutive rolling-shutter images, k and k+1, whose canonical times are $t_k^{can}$, $t_{k+1}^{can}$, respectively. In an image region Ω for which $\tau_s(r,c)$ is vertically uniform, Eq. (29) satisfies $$i_k^{roll}(r,c) = i_{k+1}^{roll}(r - v(t_{k+1}^{can} - t_k^{can}), c) \quad (32)$$

This wave motion is independent of the scene's BRFs.

When the exposure time is Δ (e.g., 0.01 sec in a 50 Hz electric grid) or an integer multiple thereof, the image is unaffected by the wave pattern and emulates imaging under DC. Following Eqs. (24, 29), $$i^{DC}(r,c) = \frac{1}{\Delta} \int_0^\Delta \sum_{s=1}^{S} \tau_s(r,c) B_s(t_k^{can} + rD - \phi_s \Delta/2\pi) dt^{can} = \sum_{s=1}^{S} \tau_s(r,c). \quad (33)$$

By another aspect, there is provided a system comprising an imaging device comprising a rolling shutter imaging sensor; at least one hardware processor; and a non-transitory computer-readable storage medium having stored thereon program instructions, the program instructions executable by the at least one hardware processor to: operate the imaging device to capture an image of a scene illuminated by at least one AC powered light source, wherein the image is subject to spatial flickering, generate a de-flickered image by extracting, for each pixel in the image, a flicker-independent intensity value.

By another aspect, there is provided a system comprising an imaging device comprising a rolling shutter imaging sensor; at least one hardware processor; and a non-transitory computer-readable storage medium having stored thereon program instructions, the program instructions executable by the at least one hardware processor to: operate the imaging device to capture an image of a scene illuminated at least by one light source powered by an AC power source, estimate a set of pixel intensity values for a vertical or horizontal sequence of pixels corresponding to one flicker cycle, compare the set of pixel intensity values to a database of sets of pixel intensity values corresponding to a plurality of light sources, identify the light source as one of the plurality of light sources in the database.

By another aspect, there is provided a system comprising an imaging device comprising a rolling shutter imaging sensor; at least one hardware processor; and a non-transitory computer-readable storage medium having stored thereon program instructions, the program instructions executable by the at least one hardware processor to: operate the imaging device to capture an image of a scene illuminated at least by one light source powered by an AC power source, apply a machine learning classifier to a set of pixel intensity values for a vertical or horizontal sequence of pixels corresponding to one flicker cycle, wherein the classifier was trained on a plurality of sets of pixel intensity values corresponding to a plurality of labeled light source, wherein the application of the classifier results in identification of the light source of the image By another aspect, there is provided a method for de-flickering an image subject to spatial flickering, comprising: capturing with a rolling shutter imaging device an image of a scene illuminated by a single light source powered by an AC power source, wherein the image is subject to spatial flickering, extracting for each pixel in the image a flicker-independent intensity value, thereby extracting a de-flickered image from an image with spatial flickering.

By another aspect, there is provided a method for at least one of reflection correction, color correction, white balancing, de-flickering, relighting, calculating a light response, calculating a chromaticity value, determining the electric phase of a light source and decomposing of an image, the method comprising, operating an imaging device with a rolling shutter to capture an image of a scene illuminated by at least one light source powered by an AC power source, estimating a set of pixel intensity values for a vertical sequence or horizontal sequence of pixels corresponding to one flicker cycle, comparing the set of pixel intensity values to a database of sets of pixel intensity values corresponding to a plurality of light sources, identifying the at least one light source as one of the plurality of light sources in the database. In some embodiments, the pixel intensities are flicker-independent.

By another aspect, there is provided a method comprising: operating a rolling shutter imaging sensor to capture one or more images of a scene that is illuminated, at least in part, by an AC-powered light source; estimating pixel intensity values for a vertical or horizontal sequence of pixels in the one or more images, the sequence corresponding to a flicker cycle of the AC-powered light source; and determining an identity of the AC-powered light source, based on the estimation. In some embodiments, the pixel intensities are flicker-independent.

By another aspect, there is provide a method comprising: operating an imaging sensor and a shutter to capture image data of a scene illuminator by a plurality of AC-powered light sources, wherein the shutter is associated with AC mains power and is controlled to open and close based on cycles of the AC mains power; and extracting, for the image data, different components related to different ones of the light sources.

In some embodiments, the imaging device is a camera. In some embodiments, the camera is in a computer. In some embodiments, the camera is in a smart phone. In some embodiments, the camera is a webcam. In some embodiments, the camera is a commercially available camera. In some embodiments, the camera is a black and white camera. In some embodiments, the camera is a color camera. In some embodiments, the camera is a black and white or color camera. In some embodiments, the camera delays the exposure of each row. In some embodiments, the camera delays the exposure of each column. In some embodiments, the camera delays the exposure of each row and/or column.

In some embodiments, the estimating is based, at least in part, on applying to the image at least one digital bandstop filter. In some embodiments, the bandstop filter has a frequency response which is a multiple of (i) and inter-row or inter-column delay value of the rolling shutter, divided by (ii) a duration of a cycle of the AC power source. In some embodiments, the bandstop filter has a frequency response which blocks multiple harmonics of a base frequency given as a multiple of (i) and inter-row or inter-column delay value of the rolling shutter, divided by (ii) a duration of a cycle of the AC power source. It will be understood by one skilled in the art that for cameras with a row delay the value will be the delay between rows, and for cameras with a column delay the value will be delay between columns. In some embodiments, the multiple is an integer multiple. In some embodiments, the harmonic is a multiple or integer multiple. In some embodiments, the bandstop filter blocks the main frequency. In some embodiments, the bandstop filter blocks the main frequency and at least one of its harmonics.

In some embodiments, the identification further comprises determining an electric phase of the light source. In some embodiments, the identification further comprises determining at least one of a light response function, a chromaticity value, and an electric phase of the light source. In some embodiments, the identification further comprises determining at least one of a light response function, a chromaticity value, a contribution of each light source to the total illumination in the image, and an electric phase of the light source. In some embodiments, the identification further comprises determining a point in a cycle of the AC power source in which the image was captured. In some embodiments, the determining the point in a cycle is determining the phase of the cycle. In some embodiments, the phase is selected from 0, 120 and 240 degrees.

In some embodiments, the instructions further comprise operating the imaging device to capture a second image. In some embodiments, the exposure time used for capturing the second image is equal to an integer multiple of the flicker cycle. In some embodiments, the exposure time is equal to an integer multiple of the AC cycle. In some embodiments, the estimating is based, at least in part, on the second image.

In some embodiments, the instructions further comprise operating the imaging device to capture a plurality of images. In some embodiments, the estimating is base, at least in part, on identifying a second vertical or horizontal sequence of pixels relating to a diffuse surface in the images. It will be understood that for cameras with vertical delay the sequence will be vertical and for cameras with horizontal delay the sequence will be horizontal. In some embodiments, the estimating is based, at least in part, on estimating a temporal difference between each pair of images. In some embodiments, the estimating difference is based at least in part on relative intensity values of a selected pixel in the pair of images. In some embodiments, the estimating difference is based at least in part on relative intensity values of corresponding pixels in the pair of images. In some embodiments, the identifying comprises at least determining a point in a cycle of the AC power source in which each of the images was captured. In some embodiments, the phase of the cycle is determined. In some embodiments, the point in the cycle in which all of the images were captured is determined.

In some embodiments, the identifying further comprises generating a global-shutter image. In some embodiments, the global-shutter image is generated at any point during the period. In some embodiments, the global-shutter image is generated at any point during the cycle. In some embodiments, the global-shutter image is based, at least in part, on estimating Fourier series coefficients of a temporal signal observed at each pixel in the image. In some embodiments, the Fourier series coefficients are determined using at least one of equations 47, 48, and 49. In some embodiments, the Fourier series coefficients are determined using equation 56. In some embodiments, the Fourier series coefficients are determined using at least one of equations 47, 48, 49 and 56.

In some embodiments, the period is longer than an AC cycle. In some embodiments, the period is multiple AC cycles. In some embodiments, the period is as long as the shutter is open.

In some embodiments, the scene is illuminated by at least one light source. In some embodiments, the scene is illuminated by at least 2 light sources. In some embodiments, the scene is illuminated by a plurality of light sources. In some embodiments, the light sources are attached to an AC power grid. In some embodiments, the light sources are all attached to the same AC power grid. In some embodiments, the light sources are attached to the same AC power grid as the system of the invention. In some embodiments, at least one light source is a natural light source. In some embodiments, at least one light source is not a man-made light source. In some embodiments, at least one light source does not run on AC power. In some embodiments, at least one light source is not connected to an AC power grid. In some embodiments, the light source is in a database. In some embodiments, the light source is in the DELIGHT database. In some embodiments, the light source is not in the DELIGHT database. In some embodiments, the light source is selected from a fluorescent bulb, a non-fluorescent bulb, an LED, an incandescent bulb, a halogen bulb, a compact fluorescent bulb, a sodium lamp, a mercury lamp and a metal halide lamp.

In some embodiments, the light source is within direct view of the imagining device. In some embodiments, the light source is out of the view of the imaging device. In some embodiments, the light source is within direct view of the imaging device and the image is captured using an optical filter operatively coupled to the imaging device. In some embodiments, the optical filter has a transfer function that creates stripes in the captured image. In some embodiments, the stripes are an optical spread. In some embodiments, the stripes are horizontal, vertical or both. In some embodiments, the optical filter has an optical transfer function, or a point spread function, that creates stripes on a sensor plane with the filter. In some embodiments, the optical filter has an optical transfer function, or a point spread function, that creates stripes on an image taken with the filter. In some embodiments, the optical filter is a star filter. Examples of optical filters include, but are not limited to a diffuser, a prism a diffraction grating, a star filter and a fast-rotating mirror. In some embodiments, the optical filter is anything that spreads light. In some embodiments, the optical filter creates a two-arm, or more, spread. In some embodiments, the image is captured using an optical filter operatively coupled to the imaging device. In some embodiments, the imaging device further comprises an optical filter.

Machine learning is well known in the art, and the systems of the invention can use a machine learning algorithm to identify and categorize different AC-powered light sources. In some embodiments, at least 1, 2, 3, 4, 5, 6, 7, 8, 9, 10, 15, or 20 light sources with different BRFs are analyzed before the algorithm can identify and/or classify an unknown AC-powered light source.

In some embodiments, the methods of the invention further comprise color-correcting at least one of the one or more images. In some embodiments, the color correction is based on the determined identity of the AC-powered light source. In some embodiments, the methods of the invention further comprise determining a phase of the AC power. In some embodiments, the determining is determining a phase of the AC power of at least one light source illuminating the scene. In some embodiments, the phase of the AC power is determined based on the estimation. In some embodiments, when the scene is illuminated by multiple AC-powered light sources the methods of the invention further comprise creating at least one new image of the scene, each image simulating an appearance of the scene under illumination by at least one of the multiple AC-powered light sources. In some embodiments, the simulated appearance is of the scene under illumination by not all of the light sources. In some embodiments, the simulated appearance is of the scene under illumination by only one light source. In some embodiments, the simulated appearance is of the scene under illumination by a different light source that did not originally illuminate the scene. In some embodiments, the methods of the invention further comprise relighting the scene. In some embodiments, the methods of the invention further comprise decomposing the lighting of the scene. In some embodiments, the methods of the invention further comprise at least one of: color-correcting at least one of the one or more images; determining a phase of the AC power, and when the scene is illuminated by more than one light source creating at least one new image of the scene simulating the scene illuminated by not all of the more than one light source.

Single-Frame De-Flickering by Filtering

The flicker that affects $i_k^{roll}$ has a known spatial frequency of $D/\Delta$. We leverage this property to decompose $i_k^{roll}$ into a flicker-dependent and flicker-independent component. This operation is motivated by common (non-flicker) intrinsic-image decomposition techniques.

Consider an image region illuminated by a single source s. Then, Eq. (29) becomes $$i_k^{roll}(r,c) = \tau_s(r,c) B_s(t_k^{can} + rD - \phi_s \Delta/2\pi) \quad (34)$$

for all pixels in the region. This is a product of a flicker-independent component $\tau_s(r,c)$ and a flicker dependent component $B_s(tk^{can},r) \equiv B_s(t_k^{can} + rD - \phi_s\Delta/2\pi)$. From Eq. (34)

$$\ln[i_k^{roll}(r,c)] = \ln[\tau_s(r,c)] + \ln[B_s(t_k^{can},r)]. \quad (35)$$

Due to the vertical periodicity of $B_s(t_k^{can},r)$, all the signal energy associated with $\ln[B_s(t_k^{can},r)]$ resides in specific spatial frequencies: $0, \pm D/\Delta, \pm 2D/\Delta, \ldots$. Thus, M non-DC harmonics of $\ln[B_s(t_k^{can},r)]$ can be eliminated using a linear filter $V(r)$ whose frequency response blocks frequencies $\pm D/\Delta, \pm 2D/\Delta, \ldots, \pm MD/\Delta$. This vertical homomorphic spatially invariant filtering yields $$\hat{\tau}(r,c) = \exp(\ln[i_k^{roll}] * V(r)) =$$

$$\exp(\ln[\tau_s(r,c)] * V(r) + \ln[B_s(t_k^{can},r)] * V(r)) =$$

$$\exp\overline{B}_s \cdot \exp(\ln[\tau_s(r,c)] * V(r)) \sim \tau_s(r,c) \quad (36)$$

Here $\hat{B}_s$ is the temporal mean of $\ln[B_s]$. For any image region dominated by any single source s, the result $\hat{\tau}(r,c)$ approximates $\tau_s(r,c)$ there (FIG. 15A, bottom).

We used a cascade of digital filters, i.e., $V(r) = V_1(r) * V_2(r) * \ldots * V_M(r)$. Each $V_m(r)$ blocks the $m^{th}$ flicker harmonic by a 4 order bandstop Bessel filter, defined by a critical bandstop domain $[D(m/\Delta - \varepsilon), D(m/\Delta + \varepsilon)]$. In our case $1/\Delta = 100$ Hz, $\varepsilon = 8$ Hz and $M = 8$.

AC Lighting Retrieval from a Single Frame: Image regions mainly illuminated by a single source are modeled by Eq. (34). Different sources may illuminate different image regions. In regions dominated by each source s, we seek: (a) the bulb type $\beta \in \mathbb{B}$ per s, (b) the electric phase $\phi_s$, and (c) the canonical time of the image $t_k^{can}$. The AC phase $\phi_s$ and $t_k^{can}$ are linearly coupled in Eq. (34). Hence define an unknown $$g_k^{can} = t_k^{can} - \phi\Delta/2\pi \quad (37)$$

Suppose we have an approximation of the transport coefficients $\hat{\tau}_s$. Such an approximation can be obtained by the filtering operation of Eq. (36). Alternatively, if the flicker spatial period is small, $\hat{\tau}_s$ may be approximated by a low-pass filter of $i_k^{roll}$. Then, from Eq. (345), $$i_k^{filt}(r,c) \equiv \frac{i_k^{roll}(r,c)}{\hat{\tau}_s(r,c)} \approx B_s(t_k^{can} + rD - \phi\Delta/2\pi). \quad (38)$$

Define a vertical image line $\overline{\Omega}_{r,c} \in \Omega$ with length of a single flicker cycle in pixels centered at pixel (r,c):

$$\overline{\Omega}_{r,c} = \{(r-l,c), \ldots, (r,c), \ldots, (r+l,c)\}, \quad (39)$$

where $l = \lceil \Delta/(2D) \rceil$. The mean intensity of $i_k^{filt}$ on $\overline{\Omega}_{r,c}$ is $\mu_{r,c}$. Let $$F_{r,c}(g_k^{can}, \beta) = \sum_{(r',c') \in \overline{\Omega}_{r,c}} \left| \frac{i_k^{filt}(r',c')}{\mu_{r,c}} - B_\beta(g_k^{can} + r'D) \right|. \quad (40)$$

Eq. (40) normalizes $i_k^{filt}$ by $\mu_{r,c}$, so that the subsequent analysis is insensitive to any potential residual scale factor. Now, we recognize the bulb type $\beta$ that dominates pixel (r,c) as well as the value of $g_k^{can}$ there using $$\{\hat{g}_k^{can}(r,c), \hat{\beta}(r,c)\} = \arg \min_{g_k^{can} \in [0,\Delta], \beta \in \mathbb{B}} F_{r,c}(g_k^{can}, \beta). \quad (41)$$

Once $\hat{g}_k^{can}(r,c)$ has been estimated for all pixels, we decompose it into an associated per-pixel electric-grid phase $\phi(r,c)$ and frame canonical time $t_k^{can}$. Let pixel $(r_0, c_0)$ be strongly dominated by illumination from the reference AC outlet. Hence, set $\hat{\phi}(r_0, c_0) = 0°$. Thus, following Eq. (37), $$\hat{t}_k^{can} = \hat{g}_k^{can}(r_0, c_0) \quad (42)$$

Based on Eqs. (37, 42), $$\hat{\phi}(r,c) = 2\pi[\hat{t}_k^{can} - \hat{g}_k^{can}(r,c)]/\Delta \quad (43)$$

It is expected that in areas that are strongly dominated by a single source, $\hat{\phi}(r,c)$ should be either 0°, 120°, or 240°.

Two Frames: Transport-Invariant Analysis and Optical Star-Filter for Emitter Analysis Previously we assumed an approximately constant $\tau_s$ per region $\Omega$. We compensated for deviation from this assumption by roughly estimating $\tau_s$ from a single image. However, we can retrieve $\tau_s$ directly by using a second image. Specifically, in addition to $i_k^{roll}$, let us capture $i_k^{DC}$ using Eq. (33). In image regions dominated by s, $$i^{DC}(r,c) = \tau_s(r,c) + \Sigma_{s' \neq s} \tau_{s'}(r,c) \cong \tau_s(r,c) \quad (45)$$

Then, from Eqs. (34, 45) derive $$i_k^{norm}(r,c) = \frac{i_k^{roll}(r,c)}{i^{DC}(r,c)} = B_s(t_k^{can} + rD - \phi_s\Delta/2\pi). \quad (46)$$

Figure 17A:
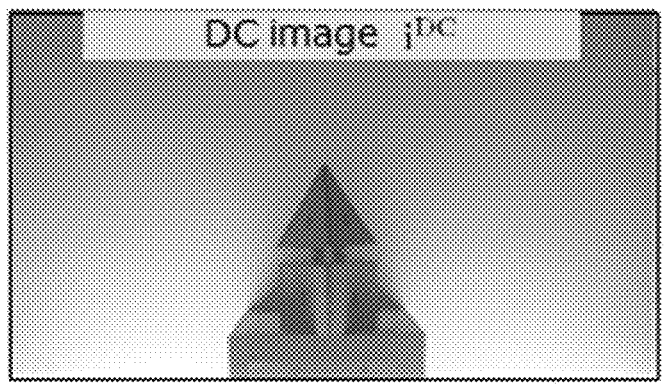
FIGS. 17A-C. AC analysis using two frames. (17A) A DC image of the same scene from 16A. (17B) A normalized image generated by normalizing a rolling-shutter frame (16A) by a DC frame (17A) yields $i^{norm}$. This improves bulb information recovery. (17C) An electrical phase map. Compare the estimated electric phase map to the one in 16E and they are the same.
Figure 17B:
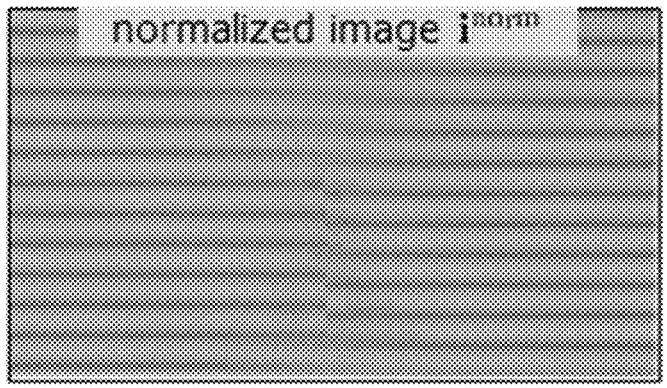
Figure 17C:
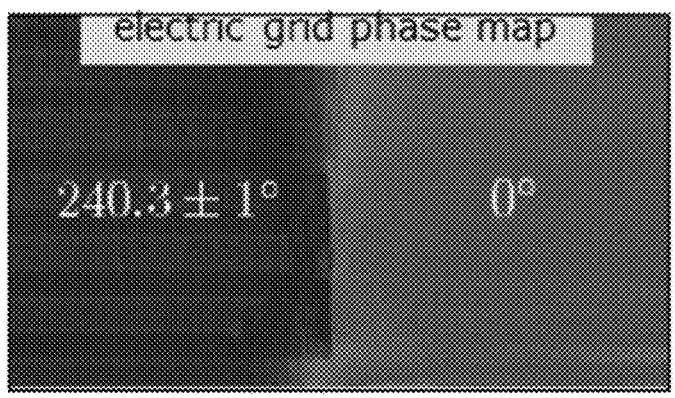

Thus, in a region dominated by a single source, the image $i_k^{norm}$ is invariant to the scene's light transport $\tau_s$, expressing $B_s(t_k^{can} + rD - \phi_s\Delta/2\pi)$, as desired. Consequently, we use $i_k^{norm}$ instead of $i_k^{filt}$ in Eq. (40), and then apply Eqs. (41-43). FIGS. 17A-C show the result of this process.

Canonical Volume from an Image Sequence

We now deal with a long sequence of $K^{roll}$ raw rolling-shutter frames. They express a data volume $I^{roll} = [i_0^{roll}, i_1^{roll}, \ldots i_{K^{roll}-1}^{roll}]$. We seek a canonical volume $I^{can}$, whose spatial domain is discrete (pixels), and whose time domain is continuous. The canonical volume expresses the spatiotemporal flicker signal. To achieve this, each input index k should be mapped to an in-cycle canonical time tr according to Eq. (27). Consequently, the output intensity $i^{can}(r,c,t_k^{can})$ at each pixel (r,c) can be thought of as the output of a very fast light detector that captures $K^{roll}$ consecutive samples in $[0,\Delta]$ (FIG. 14). Once the assignment in Eq. (27) is computed, we can re-sample and discretize the canonical time domain $t^{can}$ to emulate a global-shutter sequence using any method of choice.

Assigning according to Eq. (27) faces three challenges:
(a) The raw temporal order of the rolling-shutter frames is often meaningless. Consider the frames captured in absolute times $t_1^{abs} < t_2^{abs} < t_3^{abs} \ldots$. This ordering is generally not maintained in the corresponding canonical times $t^{can}$, i.e, we may have $t_2^{can} < t_{32}^{can} < t_3^{can} < t_1^{can} \ldots$. This is largely because our rolling-shutter camera's clock is unsynchronized and untethered to the AC. This problem is exacerbated when taking a sequence of still images at random times, e.g., by a cellphone.

Figure 19:
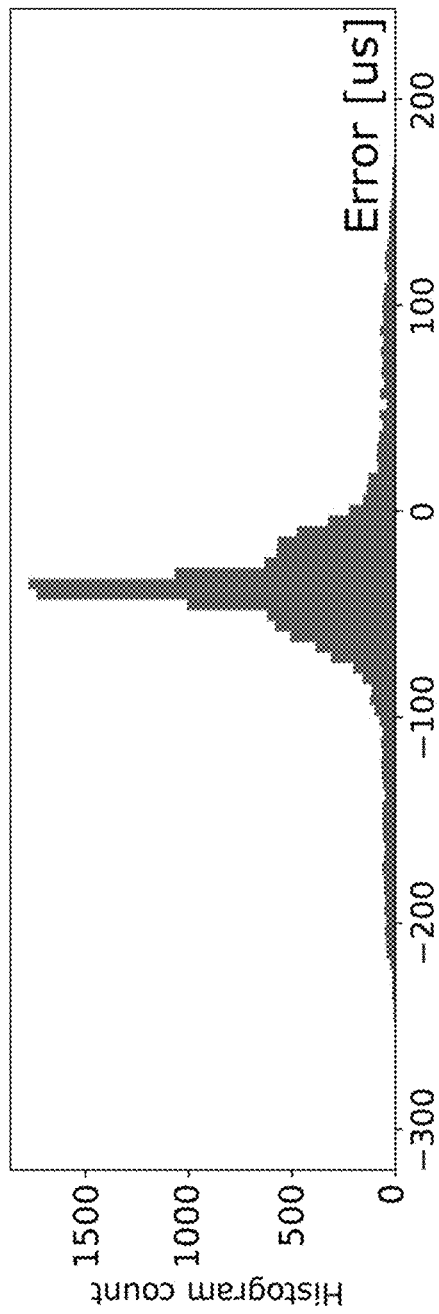
FIG. 19. A histogram showing $(t_{k+1}^{abs}-t_k^{abs})-t^{FR}$, where $t^{FR}$ corresponds to the declared setting of the camera. The histogram is based on 15000 frames of an IDS UI-348xLE camera.
Figure 20A:
FIGS. 20A-E. An experiment using a OnePlus cellphone with exposure set to 1/500 sec. We manually triggered 138 rolling-shutter frames. (20A) The first frame. (20B) A line graph of the vertical signal along $\overline{\Omega}$. (20C) A polar plot of the recovered canonical times. In the polar plot, the radii and color denote k while the angle represents $t_k^{can} \in [0,10\text{ ms}]$. Note that $t_k^{can}$ is distributed randomly. We render 30 uniformly spread global shutter frames spanning the flicker cycle. (20D) A polar plot of the times of the rendered frames. (20E) Two rendered frames at times 0 and 5 ms.
Figure 20B:
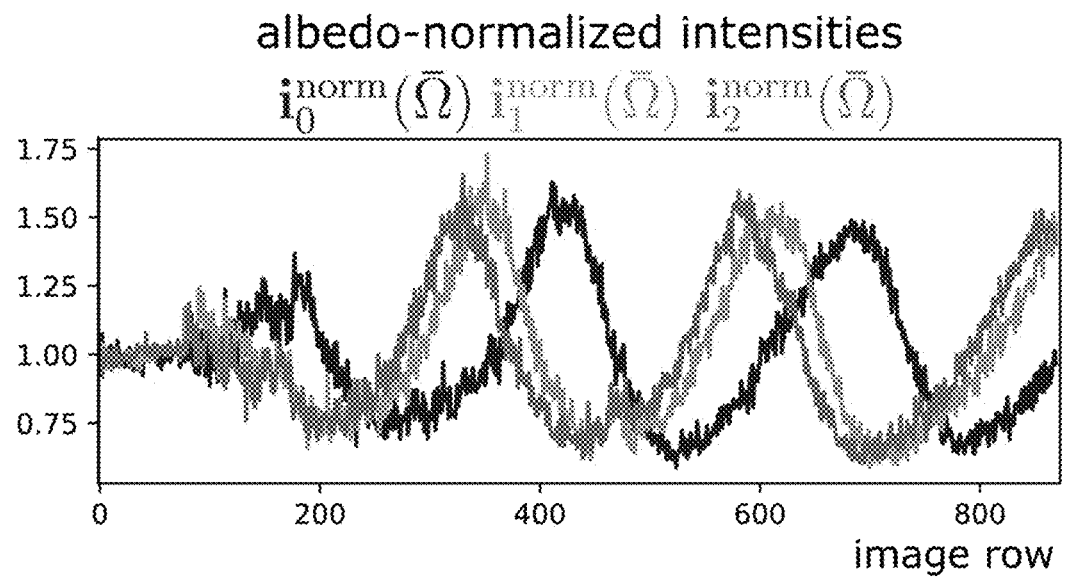
Figure 20C:
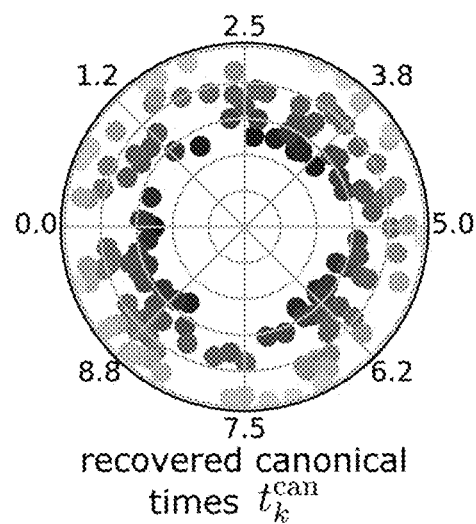
Figure 20D:
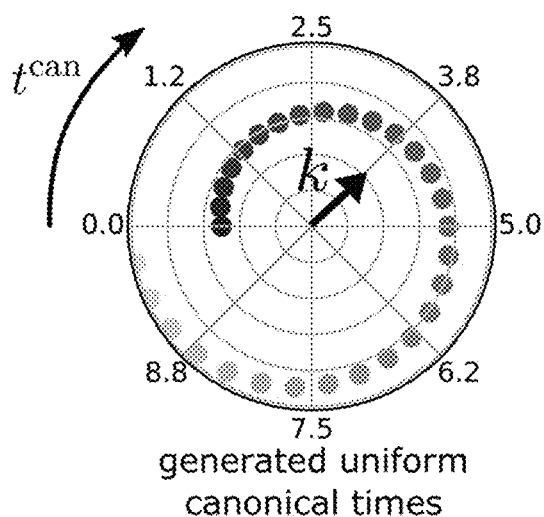
Figure 20E:
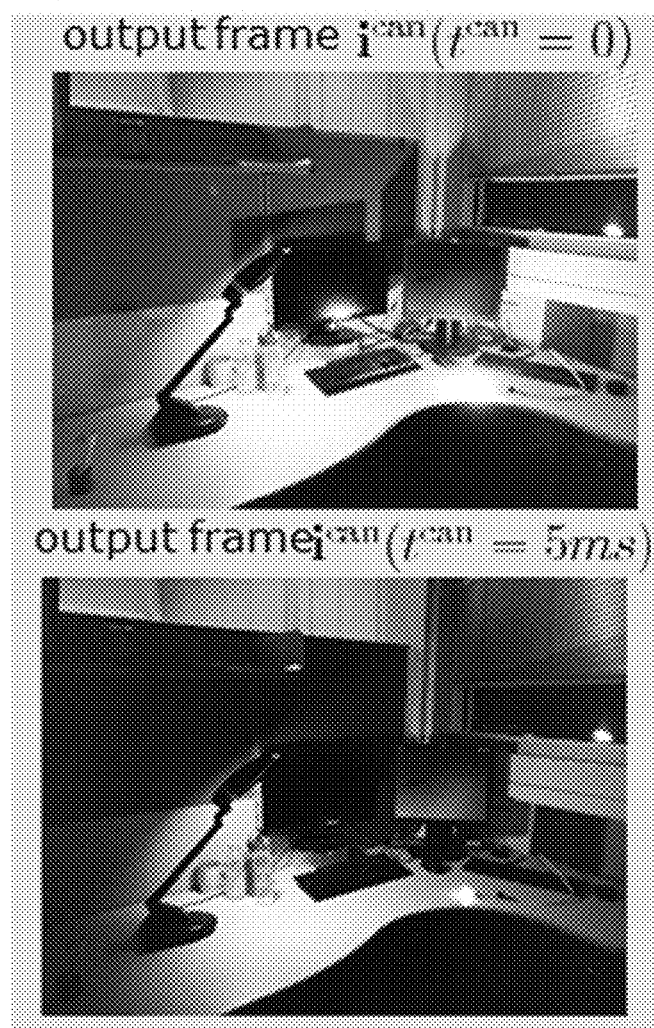

(b) Even when the frames are well sorted, the time interval between them is not a fixed fraction of the flicker cycle, i.e., $|t_{k+1}^{abs} - t_k^{abs}| \neq |t_{k+1}^{can} - t_k^{can}|$. This is mainly due to jitter of the AC grid and is exacerbated by jitter of the camera electronics (FIG. 19).

(c) Temporal shift. Suppose the entire canonical time axis is cyclically shifted globally by $\delta$. This shift does not affect the temporal order of frames or the interval between them and is inconsequential to many applications. However, such a shift does affect the relation between canonical time and the AC zero crossing and must be eliminated to accurately relate image measurements to the grid's behavior. We solve these challenges hereinbelow.

We compute the canonical time of each frame up to an unknown shift both for scenes having a significant large diffuse surface, and for emitter scenes. Because we do not solve for a global shift currently, we determine all canonical times relative to the first frame, whose canonical time is denoted tr.

Canonical Times from Diffuse Surfaces: Suppose there is a large diffuse surface in the scene, such as a wall, reflecting light towards the camera. Recall that in this case, the rolling-shutter sequence creates a spatiotemporal wave whose vertical motion and velocity are independent of BRFs. Consequently, the wave's motion enables estimation of canonical time differences, e.g., $t_k^{can} - t_0^{can}$, without prior knowledge of bulb BRFs.

Similar to before, we consider a vertical image region $\Omega$, where the corresponding diffuse surface is mainly illuminated by a single source s. We choose $\Omega$ manually in an image region that clearly exhibits a flicker wave pattern. The imaging model is thus represented by Eq. (34). As described hereinabove, shift analysis is simplified if it relies on images $i_k^{norm}$ having vertical flicker that is invariant to spatial variations of $\tau_s$ in the scene.

Irrespective of the BRFs in the scene, the wave pattern in $i_k^{norm}$ has a spatial period of $\Delta/D$ pixels, i.e, fundamental angular spatial frequency $2\pi D/\Delta$. We can then rely on simple Fourier analysis. The fundamental mode of the pattern has phase $$\theta_k = \text{angle}\{\Sigma_{(r',c') \in \overline{\Omega}} i_k^{norm}(r',c') \exp(j2\pi r'D/\Delta)\}, \quad (47)$$

not to be confused with electric grid phase. Here angle is the argument of a complex number and $\overline{\Omega}$ is an image line in SI Comparing to the pattern phase $\theta_0$ of k=0, the canonical time assignment of frame k satisfies $$t_k^{can} - t_0^{can} = \frac{\theta_k - \theta_0}{2\pi}\Delta. \quad (48)$$

Recall that for $i_k^{norm}$ we require $i^{DC}$. However, there is no need to capture $i^{DC}$ if we compute assignment of for an entire batch of frames, whose sampling times $t_k^{can}$ span the interval $[0,\Delta]$ uniformly. We can approximate it using $$i^{DC}(r,c) \approx \frac{1}{K^{roll}} \sum_k i_k^{roll}(r,c) \approx \tau_s(r,c). \quad (49)$$

Canonical Times Without Surface Reflection: In outdoor nocturnal scenes, sometimes no reflecting object is reliably sensed in the short exposures needed, due to low photon counts away from emitting bulbs. Thus, only bulbs are effectively observed. Contrary to the situation described earlier, here temporal assignment cannot rely on a wave pattern that is spatially observed on a surface. We now show that canonical time estimation is still possible.

The method described here applies to general scenes. There is no need for a star filter. Moreover, since this method does not make use of the rolling-shutter model, it can apply to global shutter sensors as well. However, unlike previously where assignment is done for each frame individually, here, we rely on the entire batch of captured frames to assign canonical time to each frame. Moreover, we require that our image batch's random samples span the interval [0,Δ] uniformly.

We make the following observation. In any scene, if the canonical times of two rolling-shutter frames are very close, then the pixel intensities in these frames are very close as well, i.e., if $|t_k^{can} - t_{k'}^{can}| \ll \Delta$, then $\|i_k^{roll} - i_{k'}^{roll}\|$ is small. This pair-wise affinity between closely-timed images leads to an overall mutual ordering between all rolling-shutter frames, i.e., expressing how far $t_k^{can}$ and $t_{k'}^{can}$, are, even for dissimilar frames in the set.

Any frame $i_k^{roll}$ is a point in a vector space of dimension R×C. For a specific scene, the set of all $K^{roll}$ rolling-shutter frames $\{i_k^{roll}\}$ resides on a low-dimensional manifold in this space. Moreover, when $|t_k^{can} - t_{k'}^{can}| \ll \Delta$, it follows that $i_k^{roll}$ and $i_{k'}^{roll}$ lie close to each other on this manifold. Furthermore, the underlying phenomena that drive changes in the images are temporally periodic. For this reason, the manifold has a ring topology.

Hence, location on the ring encodes the canonical time $t_k^{can}$ of any rolling-shutter frame. Thus, to estimate $t_k^{can}$ relative to to $t_0^{can}$, we need to measure how far on the ring $i_k^{roll}$ is relative to $i_0^{roll}$. A ring can be expressed as a curve in a two-dimensional space. Dimensionality reduction from R×C into two dimensions, the ring structure and the embedding of $i_k^{roll}$ on the ring emerge from a diffusion map. Let us denote the dimensionality reduction of the frames from R×C to two dimensions by an operator $$A = DM_{RC \to 2}\{I^{roll}\} \quad (50)$$

Figure 21:
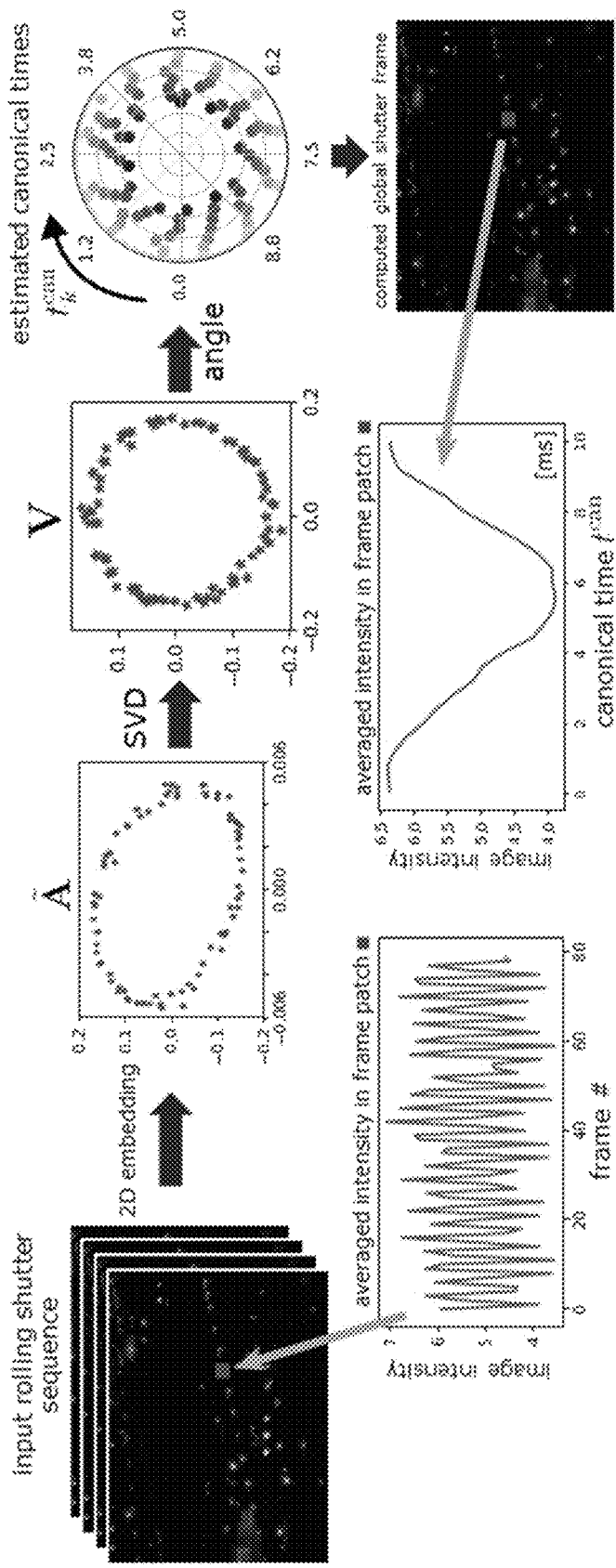
FIG. 21. A schematic of the computing of a 2D embedding of frames to obtain their canonical times. A machine vision color camera (IDS UI-155xLE) with exposure time set to 1788 us captured 80 frames of the Haifa bay area from afar.

The diffusion maps algorithm requires specifying the pair-wise affinity of frames. We used a Gaussian kernel whose width was manually adjusted per scene to yield a ring. As seen in FIG. 21, the resulting ring is generally skewed. We remove this skew using singular value decomposition (SVD). First, define the ring's center of mass $$[a_0 a_1] = 1_{K^{roll}} A^T / K^{roll} \quad (51)$$

where $1_{K^{roll}}$ is a row vector of length $K^{roll}$, all of whose elements are 1's. Here T denotes transposition. Then, the ring is centered by $$\tilde{A} = A - \begin{bmatrix} a_0 1_{K^{roll}} \\ a_1 1_{K^{roll}} \end{bmatrix}. \quad (52)$$

Using SVD, decompose $\tilde{A}$ to $$\tilde{A} = U \Sigma V \quad (53)$$

where Σ is a 2×2 diagonal positive matrix. Now, any rolling-shutter frame k is represented by column k of V, where $V \in \mathbb{P}^{2 \times K^{roll}}$. As seen in FIG. 21, now the ring manifold is not skewed. Let column k of V be $[v_0(k) v_1(k)]^T$. Then, using the argument of a complex number in lieu of a temporal phase-angle, set $$\theta_k = \text{angle}\{v_0(k) + j v_1(k)\} \quad (54)$$

We use Eq. (48) to convert temporal phase-angle $\theta_k$ to canonical time.

So far we assumed that the relation between $t_0^{can}$ and the AC zero crossings is unknown. To recover this relation, we rely on two priors: a database $\mathbb{B}$ of BRFs (DELIGHT) and knowledge of the bulb type that affects one pixel $(r_0, c_0)$ in the image. We treat that bulb as a reference whose AC phase is φ is zero. Then we find the temporal shift δ that best aligns the BRF $B_\beta$ to the time-varying normalized intensity at $(r_0, c_0)$:

$$\hat{\delta} = \arg\min_\delta \sum_k |l_k^{norm}(r_0, c_0) - B_\beta(T_k^{can} - t_0^{can} + \delta)|^2 \quad (55)$$

Once $\hat{\delta}$ is estimated, we set $t_0^{can} = \hat{\delta}$ and thus determine $t_k^{can}$ for all frames relative to the AC zero crossing.

Computing Global-Shutter Frames

We have previously described temporal assignment of rolling-shutter frames to canonical times $\{t_0^{can}, \ldots, t_{K^{roll}-1}^{can}\}$. Following this assignment, we can now compute canonical images, as if taken by a global shutter at an arbitrary $t^{can}$. The canonical volume $I^{can}$ represents a signal which is temporally periodic. Hence for each pixel (r,c), the canonical intensity function $i^{can}(r,c,t^{can})$ is represented by a Fourier series: the fundamental temporal frequency is 1/Δ, and there are higher harmonics. We use this representation to compute $I^{can}$ in two steps:

(a) Use the $K^{roll}$ raw rolling-shutter frames to estimate the Fourier series coefficients of the 1D temporal signal observed at each pixel (r,c).

(b) Use the per-pixel Fourier coefficients to compute the canonical volume $I^{can}$ and/or any of its slices for any $t^{can}$.

Here are the mathematical details. Per pixel, the real-valued Fourier series of the canonical signal is $$i^{can}(r, c, t^{can}) = \quad (56)$$
$$p_0(r, c) + \sum_{m=0}^{M} \left[ p_m(r, c) \cos \frac{2\pi m t^{can}}{\Delta} + q_m(r, c) \sin \frac{2\pi m t^{can}}{\Delta} \right].$$

There are 2M+1 real-valued Fourier coefficients $p_m$, $q_n$, for each pixel (r,c). To make the estimation well-posed, $2M+1 \leq K^{roll}$. Fortunately, BRFs are usually smooth. So, intensity variations due to flicker can be represented with just a few Fourier coefficients.

Concatenate these Coefficients to Form a Vector $$p(r,c) = [p_0(r,c), p_1(r,c), \ldots, q_1(r,c), q_M(r,c)]^T \quad (57)$$

Define a Row Vector $$h(t) = \left[ 1, \cos \frac{2\pi t^{can}}{\Delta}, \ldots \cos \frac{2\pi M t^{can}}{\Delta}, , \sin \frac{2\pi t^{can}}{\Delta}, \ldots \sin \frac{2\pi M t^{can}}{\Delta} \right]. \quad (58)$$

Then, rendering of a global-shutter image for any time $t^{can}$ is enabled by expressing Eq. (56) as $$i^{can}(r,c,t^{can}) = h(t^{can}) p(r,c) \quad (59)$$

Let us estimate p(r,c) from a sequence of rolling shutter frames. The canonical time assigned to row r of frame k is given by Eq. (28). Intensities in frame k are given by $$i_k^{roll}(r,c) = i^{can}(r,c,t_{k,r}^{can}) = h(t_{k,r}^{can})p(r,c) \quad (60)$$

Define a Matrix $$H_r = [h(t_{0,k}^{can})^T, \ldots, h(t_{k,r}^{can})^T, \ldots, h(t_{k^{roll}-1,r}^{can})^{T1}]^T \quad (61)$$

Let column vector $d_{r,c}$ of length $K^{roll}$ denote the intensities at pixel (r,c), i.e., $d_{r,c}[k] = i_k^{roll}(r,c)$. Then, $$d_{r,c} = H_r p(r,c) \quad (62)$$

Computing p(r,c) is essentially a least-squares Fourier series estimation:

$$\hat{p}(r,c) = (H_r^T H_r)^{-1} H_r^T d_{r,c} \quad (63)$$

Live Rolling-to-Global Shutter Conversion: When the field of view includes a diffuse surface, we can estimate global-shutter images in real-time. This yields a live-streaming algorithm that can continuously compute global-shutter frames. To achieve this, we develop the following updated process:
1. In a ramp-up stage, $K^{roll}$ increases with every new input frame, until reaching a pre-set maximum value $K^{roll} = K_{max}^{roll}$. After this ramp-up, for each new frame streaming in, the oldest frame in the queue is deleted.
2. Use the $K^{roll}$ frames in the queue to estimate the Fourier series coefficients of each pixel.
3. When a new rolling-shutter frame is acquired, compute its canonical time $t_k^{can}$, using the method of "Canonical times from diffuse surfaces". Then, update the Fourier series coefficients for all pixels.
4. Using the Fourier series, the canonical volume $I^{can}$ can be rendered for any $t^{can}$.

Temporal smoothness of BRFs allows using a small number of Fourier coefficients. Hence even during ramp-up, when $K^{roll}$ is small, we obtain a good estimate of $I^{can}$.

As used herein, the term "about" when combined with a value refers to plus and minus 10% of the reference value. For example, a length of about 1000 nanometers (nm) refers to a length of 1000 nm+−100 nm.

It is noted that as used herein and in the appended claims, the singular forms "a," "an," and "the" include plural referents unless the context clearly dictates otherwise. Thus, for example, reference to "a polynucleotide" includes a plurality of such polynucleotides and reference to "the polypeptide" includes reference to one or more polypeptides and equivalents thereof known to those skilled in the art, and so forth. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

In those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination. All combinations of the embodiments pertaining to the invention are specifically embraced by the present invention and are disclosed herein just as if each and every combination was individually and explicitly disclosed. In addition, all sub-combinations of the various embodiments and elements thereof are also specifically embraced by the present invention and are disclosed herein just as if each and every such sub-combination was individually and explicitly disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Rather, the computer readable storage medium is a non-transient (i.e., not-volatile) medium.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Additional objects, advantages, and novel features of the present invention will become apparent to one ordinarily skilled in the art upon examination of the following examples, which are not intended to be limiting. Additionally, each of the various embodiments and aspects of the present invention as delineated hereinabove and as claimed in the claims section below finds experimental support in the following examples.

Various embodiments and aspects of the present invention as delineated hereinabove and as claimed in the claims section below find experimental support in the following examples.

EXAMPLES

Example 1: The Alternating-Current Camera (ACam)

The ability to perform the various imaging procedures described herein relies on a key image acquisition task: capturing a sequence of K frames that spans one cycle. Very little light, however, enters the camera at the timescale of 1/K-th the AC cycle. For instance, acquiring K=20 images per cycle in North America, where light flickers at 120 Hz, requires a frame exposure time of 416 µsec. This is especially problematic at night and indoors where light levels are usually low and sensor readout noise overwhelms the signal. Moreover, frame acquisition must support high-dynamic range (HDR) imaging. This is because the field of view may include both bright light sources and poorly-lit surfaces (e.g., from shadows, squared-distance light fall-off, AC flicker, etc.) These issues make capturing K-frame sequences impractical with a high-speed camera.

Figure 7:
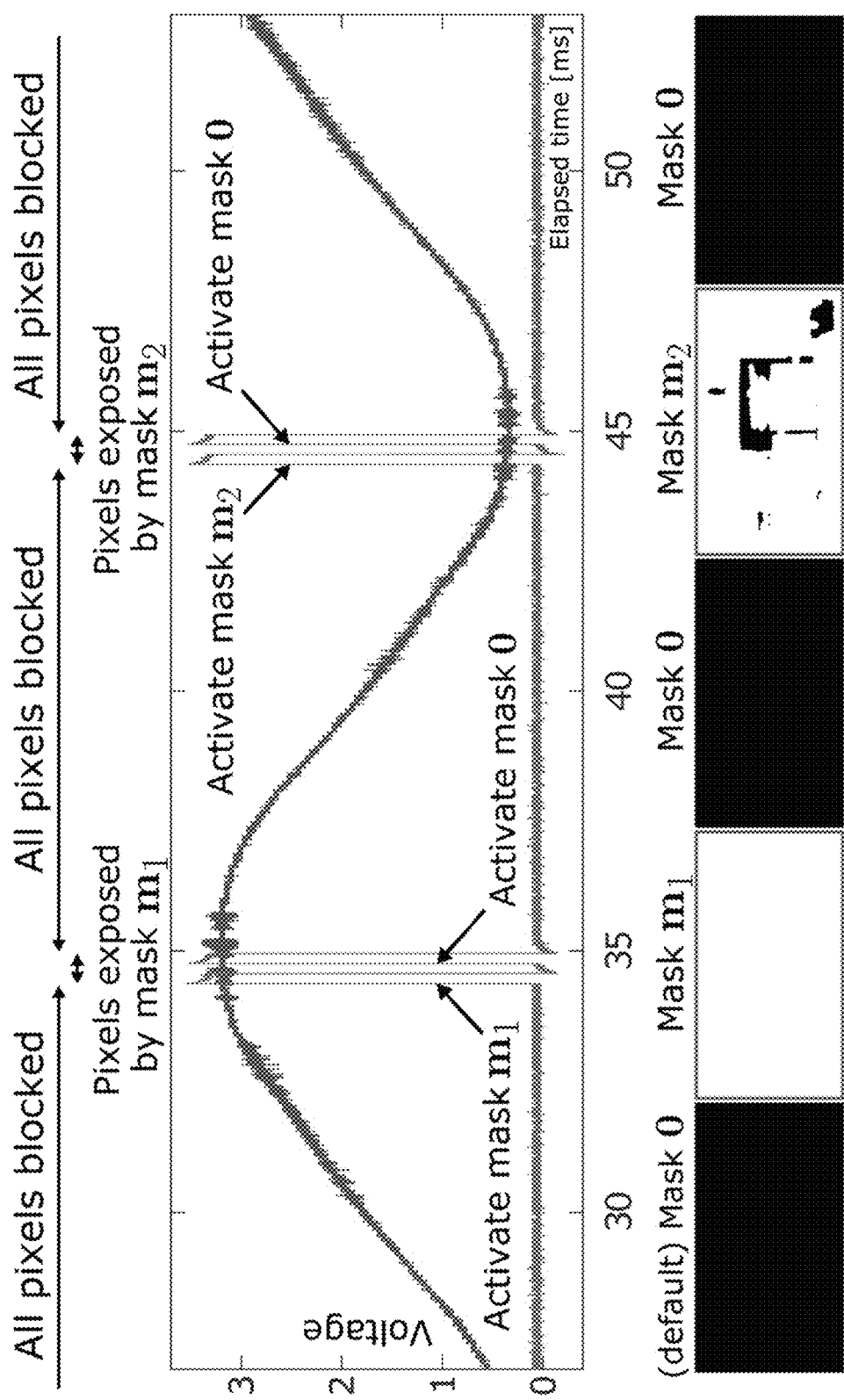
FIG. 7: A schematic summary of ACam operation. Top: The camera's pixels are repeatedly blocked and unblocked over C cycles so that they can integrate light only during the same brief interval in each cycle. Because each cycle's duration varies slightly, the timing of these events is controlled precisely with an Arduino that tracks AC zero-crossings in real time. Here we show the Arduino's input voltage (blue) and the mask-switching signal it generates (red), measured simultaneously with a high-speed oscilloscope. Masks are switched at the signal's rising edge and must persist for at least Δ/K microseconds. The ACam supports K≤26 for 50 Hz grids and K≤22 for 60 Hz grids. Bottom: The corresponding DMD masks. Mask 0 is active most of the time and acts like a global shutter. Mask $m_1$ briefly exposes all pixels to light. Mask $m_2$, on the other hand, blocks light from some of the pixels in the next cycle to prevent their saturation.

To overcome them, our ACam keeps its electronic shutter open for hundreds of cycles while optically blocking its sensor at all times except during the same brief interval in each cycle. This is illustrated in FIG. 7 (top). Since the light collected by the sensor is proportional to the number of cycles the electronic shutter is open, the ACam trades off acquisition speed for enhanced signal-to-noise ratio. Moreover, it can handle large variations in light level across the field of view by allowing some sensor pixels to integrate light for fewer cycles than others (FIG. 7, bottom).

Figure 8:
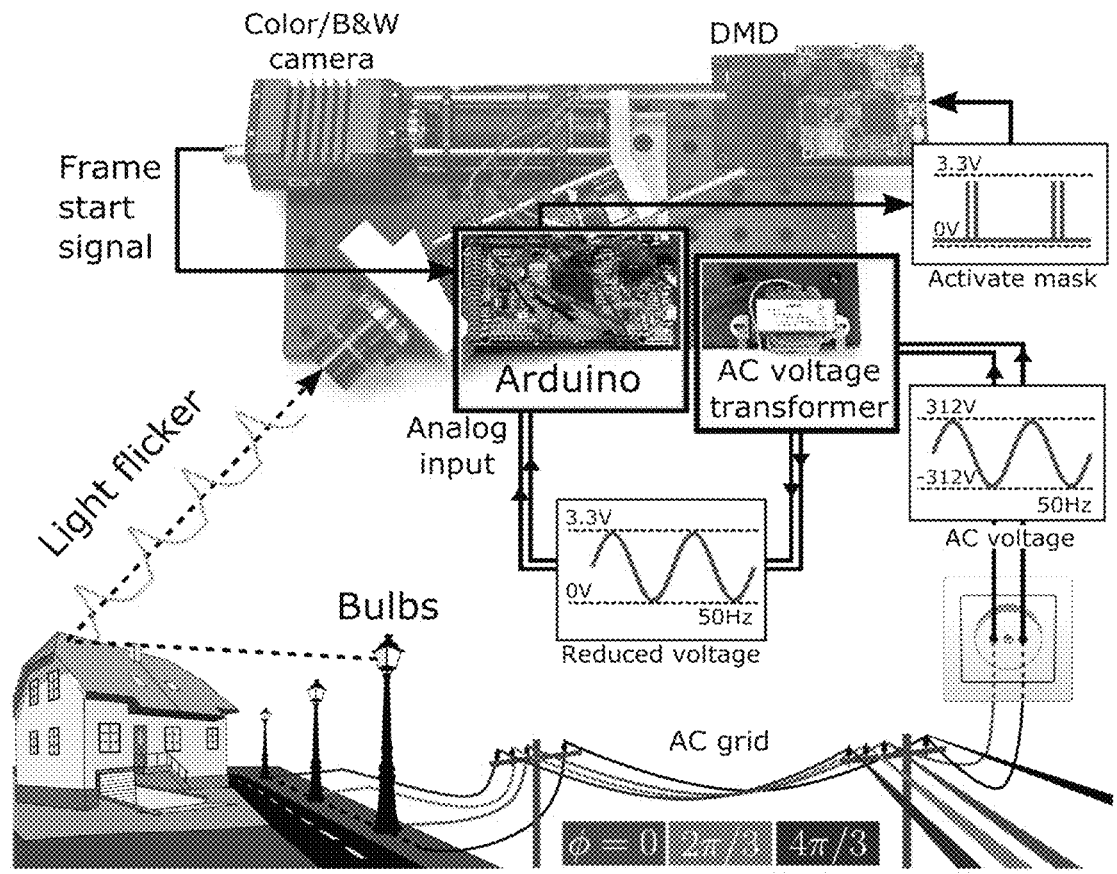
FIG. 8: A diagram of Acam and its connection to the AC grid. Our ACam combines an Arduino and voltage transformer with a DMD-based programmable mask. The Arduino senses the AC grid in real-time, switching between DMD masks over hundreds of cycles. The masks are loaded to the DMD by a PC (not shown). In each AC cycle, these masks expose individual pixels for a small fraction of the cycle duration.

We implement high-speed pixel masking with a digital micromirror device (DMD) that is optically coupled to an off-the-shelf camera. The design was modified for the purpose of passive AC-modulated imaging. FIG. 8 shows our ACam and highlights its main components. It operates correctly on 60 Hz/120V and 50 Hz/220V grids.

Each ACam image yields exactly one frame of the K-frame sequence, indexed by $k \in [1 \ldots K]$. The procedure is applied K times to acquire all frames—and is potentially applied more times if high dynamic range (HDR) frames are needed.

Acquiring frame k without HDR: To capture a frame we (1) define a sequence of M binary DMD masks, (2) open the electronic shutter for C cycles while the DMD is locked to the AC, and (3) close the shutter and read out the image. In practice, C ranges from 100 to 1500 cycles depending on light levels. During this period the DMD repeatedly goes through its M masks. ACam imaging is therefore controlled by three quantities: the number of cycles C, the matrix M holding the mask sequence, and the timing signal that forces the DMD to switch from one mask to the next.

Our mask matrix has the following general form:

$$M=[m_1 0 m_2 0 \ldots m_{M/2} 0] \quad (23)$$

where $m_m$ is a column vector representing a binary pixel mask and 0 is a mask of all zeros. The zero mask blocks the sensor completely and is active at all times except during the interval corresponding to frame k. The non-zero mask, on the other hand, determines which pixels are actually exposed to light during that interval. To acquire a non-HDR image we set $m_m=1$ for all m. This forces the DMD to act like a "flutter-shutter" synchronized with the AC. To acquire an HDR image we modify M adaptively over repeated long-exposure acquisitions (see below).

Figure 9A:
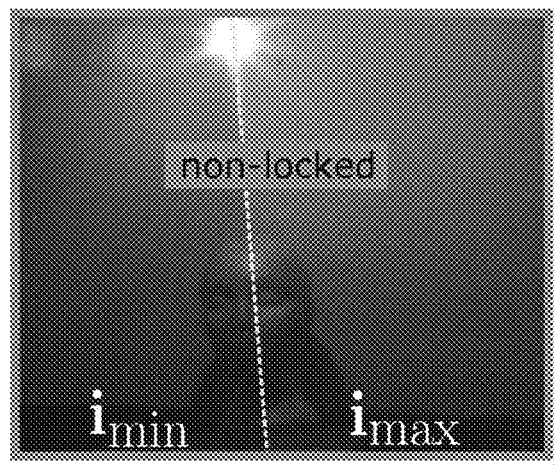
FIGS. 9A-B: (9A) Non-locked versus (9B) AC-locked imaging. Using a 1500-cycle integration to acquire frames corresponding to the maximum and minimum intensity of a bulb (LED2). (9A) Without AC locking the integration time window drifts, causing temporally-blurred results. (9B) When the ACam is continuously synchronized to the AC zero-crossings, temporal blur is minimal.
Figure 9B:
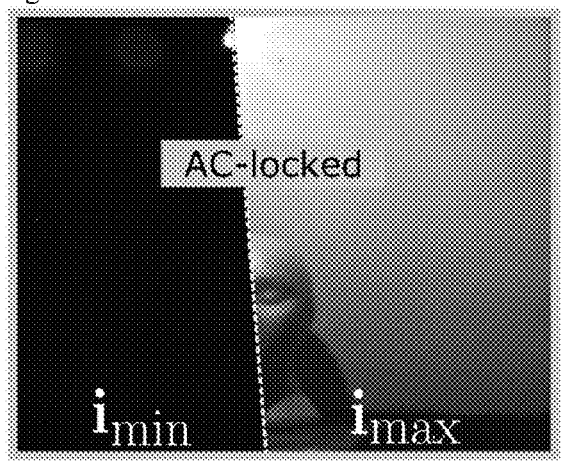
Figure 10:
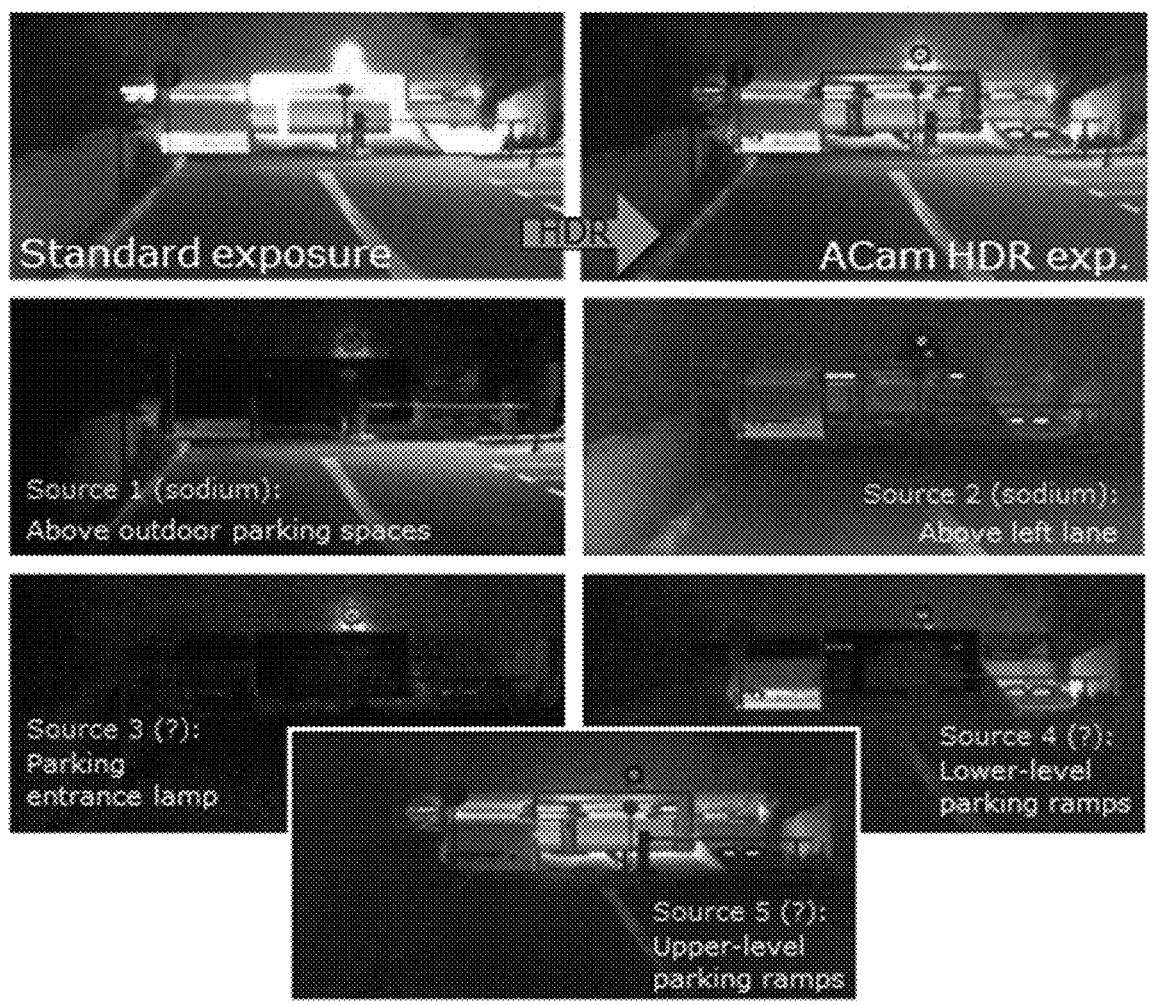
FIG. 10: Photos showing an unmixing experiment for a scene that deviates from our assumptions. Here, some scene bulbs are not in DELIGHT and are not observed directly due to their location deep inside the building. Lacking knowledge of the number of independent sources, BRFs and chromaticities, we set S=5 for unmixing but in reality S is likely higher. The results suffer from residual crosstalk and color distortion, e.g., notice that some signal from sources 4 and 5 falsely appears in parts of sources 1 and 2.

AC-locked mask switching: We generate the mask-switching signal with an Arduino microcontroller plugged into the reference outlet (FIG. 8, top). We found it very important to generate this signal in a closed loop, locked to the last-detected zero-crossing. Given that the duration of each cycle varies slightly, switching masks without accounting for this variation causes their position within a cycle to drift over time and leads to poor results (FIG. 9A). In contrast, locking the signal onto the zero-crossings gives temporal-blur-free images even after thousands of cycles (FIG. 9B).

Acquiring frame k with HDR: We first acquire the frame without HDR, using a long enough exposure time to achieve good signal-to-noise ratio at dimly-lit surfaces. If this frame has saturated pixels, we repeat the acquisition with a modified mask matrix that exposes saturated pixels to light for a lot less. Specifically, let p be a saturated pixel and let M[p,:] be the row corresponding to p. We modify M[p,:] by zeroing out half its non-zero elements. This cuts in half the time that pixel p will be exposed to light. In contrast, the rows of M associated with unsaturated pixels are left as-is. The process of modifying M and re-acquiring the frame is repeated until either the number of saturated pixels falls below a threshold or M has rows with only one non-zero element. Our ACam's DMD can handle up to M=96 masks so the maximum number of iterations is $\lfloor \log_2(M/2) \rfloor = 6$. In this way, the brightest points in a scene can be exposed up to M/2 times less than the darkest ones.

Example 2: ACam Technical Details

We feed the Arduino in the ACam with a reduced version of the raw AC voltage in the reference outlet. The AC voltage is reduced so as to span the Arduino's analog input voltage range, in our design 0 to 3.3V. For the inner-camera module, our experiments used Allied Vision Prosilica GT 1920, relying either on color or monochrome (BW) sensors.

Controller Delay Calibration: The ACam tracks zero-crossings in real time. During capture of frame $k \in K$, the Arduino repeatedly detects AC voltage zero-crossings. Once a zero-crossing is detected, the Arduino exposes sub-frame k by holding mask 0 for $[(k-1)\Delta]/K$ seconds before switching to mask $m_m$ (see FIG. 7). However, in practice, electronic imperfections may introduce a constant delay between zero-crossing detection and switching to mask mm. This delay causes a slight and constant phase shift $\Delta\varphi Ard$ to the K-frame sequence I. Such a constant phase shift effects tasks that rely on DELIGHT BRFs; scene BRFs may be slightly shifted, compared to database BRFs.

To compensate for this phase shift, we find $\Delta\varphi Ard$ by imaging a known scene bulb, e.g. a Sodium lamp, which is abundant in outdoor scenes. Then, $\Delta\varphi Ard$ is determined as the phase difference between the measured BRF and the corresponding DELIGHT BRF. This calibration is done once per camera and operating conditions; $\Delta\varphi Ard$ is then applied to all measured I.

Re-syncing to AC: Due to random wiggle of the AC frequency, the ACam is locked to last-detected zero crossing. In practice, locking the camera to every zero-crossing is technically more involved.

Fortunately, the temporal blur effect shown in FIG. 9A is cumulative. Hence, while this effect accumulates over the entire exposure time, it is practically negligible in the span of a few tens of cycles. Therefore, resyncing need not be done at every AC cycle. In our experiments, we re-synced the camera every 10 cycles. This enabled a much simpler controller implementation, while having virtually no effect of the acquired sequence.

Example 3: The DELIGHT Database of Bulb Responses

In order to perform many of the tasks described herein we created a Database of Electric LIGHTs (DELIGHT). Databases have contributed immensely to computer vision and graphics, particularly in determining subspaces of physics-based effects. Our work provides a missing link: a database of BRFs, which dominate indoor and nocturnal outdoor lighting. The database is very helpful for comp u t e r vision on the electric grid, particularly for recognition of grid phase and bulb type at a distance, as well as unmixing, white balancing and relighting. To do this we acquired a variety of bulbs and fixtures. Street lighting is dominated by a few bulb types, mainly high-pressure sodium, metal halide, mercury and fluorescent. Each streetlight type is used rather consistently in large areas. Indoor lighting has higher variety, including halogen, fluorescent tubes, different compact fluorescent lamps (CFLs) and simple incandescent.

Bulb BRFs were captured in three ways:
(1) BRFs were sensed using a TEMT6000 Ambient Light Sensor, in parallel to measuring the AC voltage V (t) at the reference outlet. The reference outlet was selected arbitrarily. Color filters were used to measure different color channels. Each bulb folder contains between 100 and 400 identical measurements triggered by a positive-to-negative zero-crossing of the AC voltage. The actual data capturing begins with a slight delay after the zero-crossing. These multiple measurements are averaged and clipped between two zero crossings to produce a noise-free BRF.
(2) Here, we used the same setup as in (1) but without any filters.

(3) We pointed our ACam, fitted with a Prosilica GT1920C color camera, at a white sheet and captured a K-frame sequence. BRFs were produced by averaging the normalized signal $i^{norm}$ (σ) of many pixels on the white sheet.

Figure 2C:

LED lighting has an interesting variety of BRFs, some having very low and some very high BRF amplitudes (FIG. 2B). Table 2 details the bulbs measured, so far. FIG. 2C shows bulbs that were used. We found that new LED bulbs show an interesting variability or BRFs across brands. FIG. 2A (Bottom) shows raw bulb measurements using the photodiode. FIG. 2B (Bottom) shows the averaged, low-noise BRFs, extracted using the multiple raw measurements.

TABLE 2

DELIGHT

| Type | Brand | Power | Name | Sensing Method |
|---|---|---|---|---|
| Incandescent | OSRAM | 60 W | Incand1 | (2), (3) |
| Incandescent | TUNGSRAM L5 LM | 100 W | Incand2 | (2) |
| Incandescent | ONOUR | 100 W | Incand3 | (2) |
| Incandescent | LUXLIGHT 17/6 | 100 W | Incand4 | (2) |
| Incandescent | LUXLIGHT 17/6 | 100 W | Incand5 | (2) |
| Incandescent | HATCHI | 100 W | Incand6 | (2) |
| Fluorescent 60 cm | LUXLIGHT L18 W/ 765-Fixt. 1 | 18 W | Fluores1 | (1), (2), (3) |
| Fluorescent 60 cm | LUXLIGHT L18 W/ 765-Fixt. 2 | 18W | Fluores1 f2 | (2) |
| Fluorescent 60 cm | LUXLIGHT L18 W/ 765-Fixt. 3 | 18 W | Fluores1 f3 | (2) |
| Fluorescent 60 cm | LUXLIGHT L18 W/ 765 | 18 W | Fluores2 | (2) |
| CFL | OSRAM DULUX S | 7 W | CFL 2U | (2), (3) |
| CFL | OSRAM | 11 W | CFL2 | (2) |
| CFL | ELECTRA MINI STAR 6500 K | 23 W | CFL3 | (2) |
| CFL | PHILIPS PL E-T | 23 W | CFL4 | (2) |
| CFL | LEELITE 6500 K | 11 W | CFL5 | (2) |
| CFL | unknown 6500 K | 32 W | CFL6 | (2) |
| CFL | NEPTON Daylight 1022 lm | 20 W | CFL7 | (2) |
| CFL | HYUNDAI ECO T2 2700 K | 15 W | CFL8 | (2) |
| CFL | NEPTON Daylight 1022 lm | 20 W | CFL9 | (2) |
| CFL | LEELITE 6400 K | 11 W | CFL10 | (2) |
| CFL | PHILIPS MASTER PL-C | 18 W | CFL-F | (1), (2), (3) |
| Halogen | SYLVANIA E06D | 42 W | Halogen1 | (2) |
| LED | LEELITE 3000 K | 6 W | LED1 | (2) |
| LED | SAYNET 6500 K | 3 W | LED2 | (2), (3) |
| LED | SEMICON | 17 W | LED3 | (2) |
| LED | ELECTRA LED 530 | 12 W | LED4 | (2) |
| LED | SEMICON | 18 W | LED5 | (2) |
| LED | FSL | 11 W | LED6 | (2) |
| LED | EUROLUX 6000 K | 30 W | LED7 | (2) |
| Sodium | ORSAM VIALOX | 70 W | Sodium | (1), (2), (3) |
| Mercury | ORSAM HQL (MBF-U) | 125 W | Mercury | (2), (3) |
| Metal Halide | ORSAM HQI-T W/D PRO | 250 W | MH1 | (2), (3) |

To keep it common to all BRFs, DELIGHT was acquired by connecting all bulbs and fixtures to a single 50 Hz reference outlet in Haifa. The AC voltage V(t) was simultaneously measured at this outlet. We used three sensing schemes: (1) a photodiode with one of three color filters; (2) the same photodiode without any filters; and (3) our ACam prototype described herein, fitted with a color camera. For schemes (1) and (3), we saved in DELIGHT the BRF of individual bulbs and their chromaticity. For scheme (2) only a monochrome BRF is saved. In all cases, metadata such as bulb wattage and sensor/filter used are stored as well.

Examples 4: Recognizing AC Lights and Grid Phase

Figure 3A:
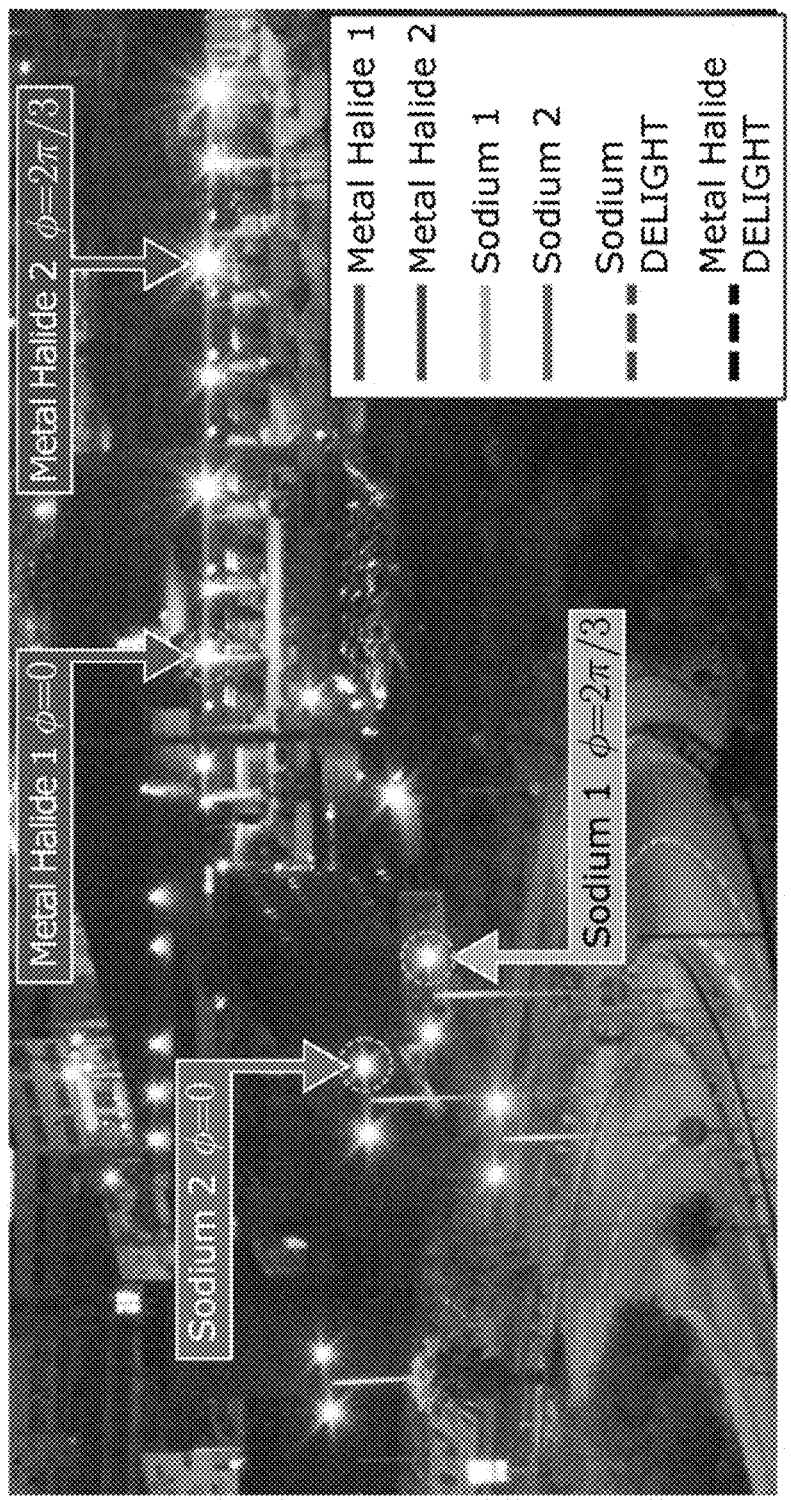
Figure 3B:
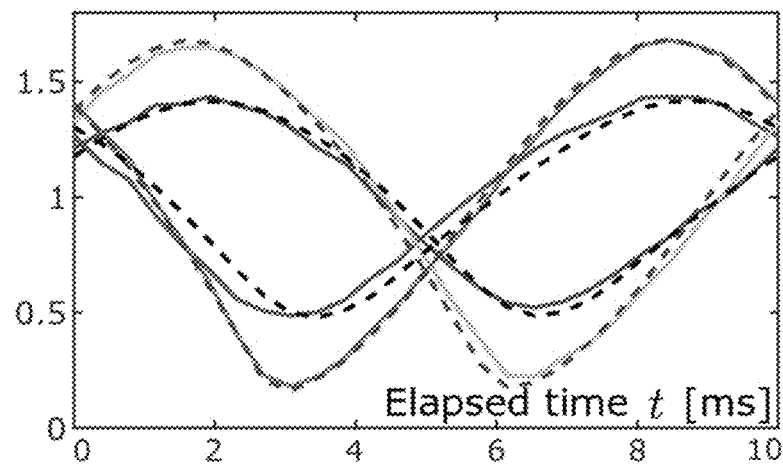
Figure 3C:
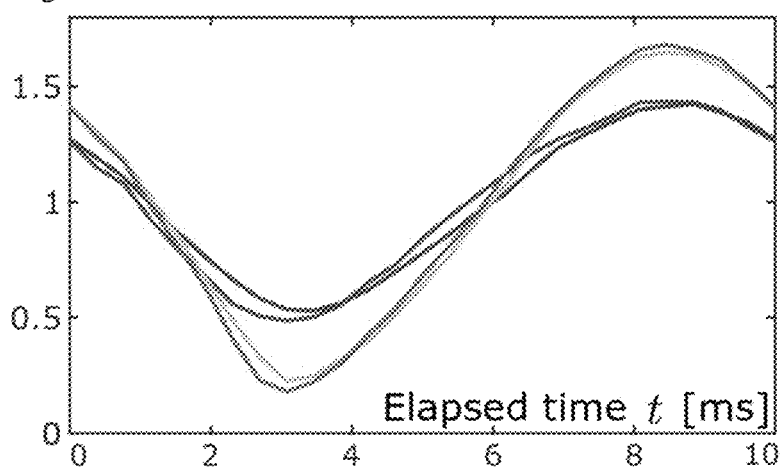

The ability of our ACam to distinguish grid phase was tested. FIGS. 1A-B and 3. A show results from Haifa Bay, when the ACam was fitted with a monochrome camera. In this metropolitan scale, we recognize the bulb types and their three grid phases. Simple analysis shows that the distribution of grid phases is approximately uniform over the bulbs detected in the field of view.

Example 5: Unmixing: Source Separation

The ACam was also capable of separating a source image into unmixed images of the scene as it would appear if it were illuminated by only one source of light. No whit balancing was necessary as the chromaticities of all light sources are already factored into the unmixing equations. Examples for indoor and outdoor scenes are shown in FIGS. 4A-D and 5A-D respectively.

Example 6: High Dynamic Range, Denoised Rendering

Figure 4A:
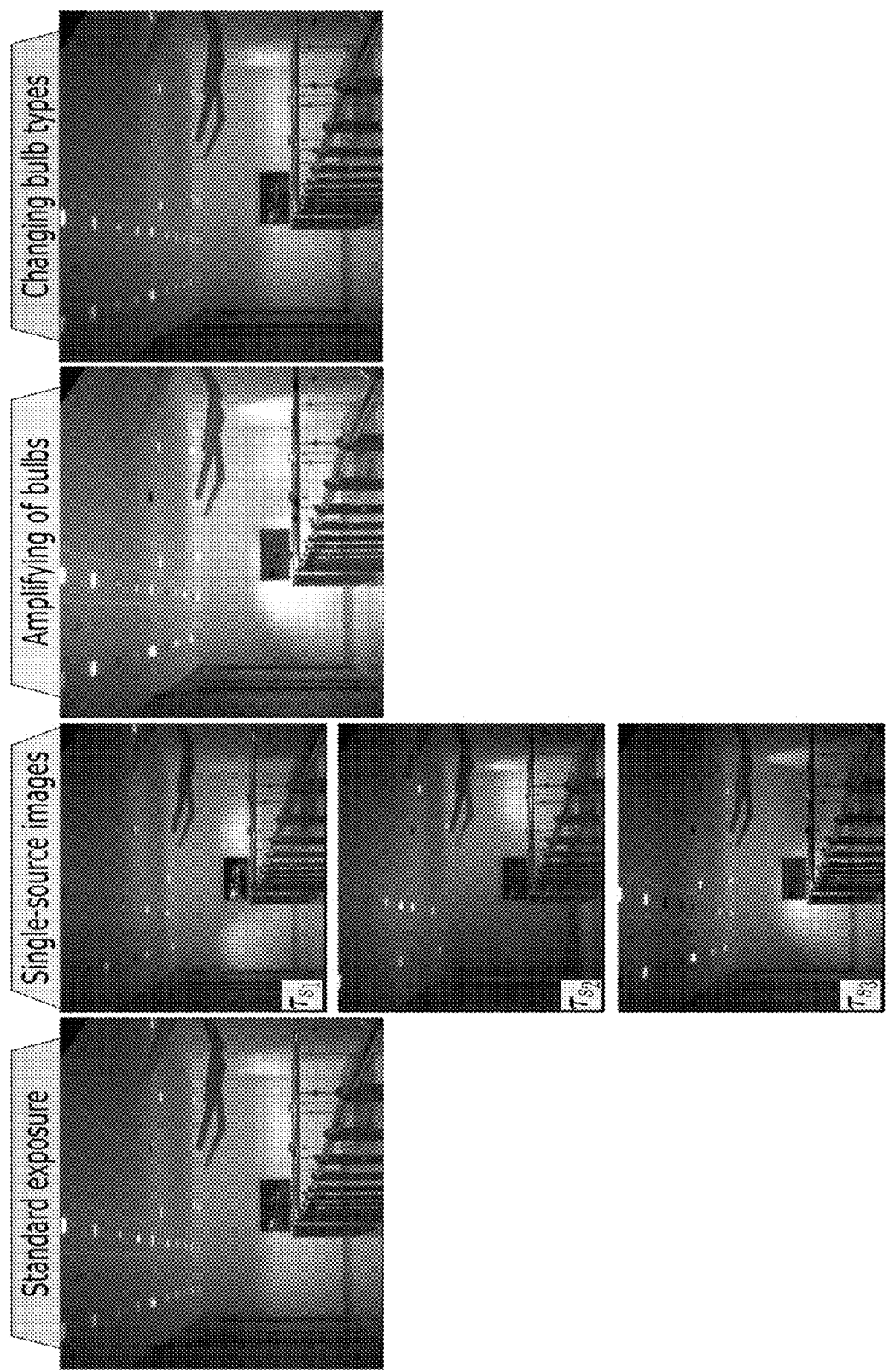
FIGS. 4A-D: (4A) Photos of unmixing results. The second column shows the single-source images reconstructed by unmixing. We simulate bulb amplification/de-amplification by computing $\tau_1 + 3.5\tau_3$, and bulb replacement by replacing b1 with a Sodium BRF. (4B) A line plot shows the monochrome BRFs sampled directly by ACam. (4C-D) Plots illustrating the successful reconstruction of (4C) saturated or (4D) noisy pixels.
Figures 4B, 4C, 4D:
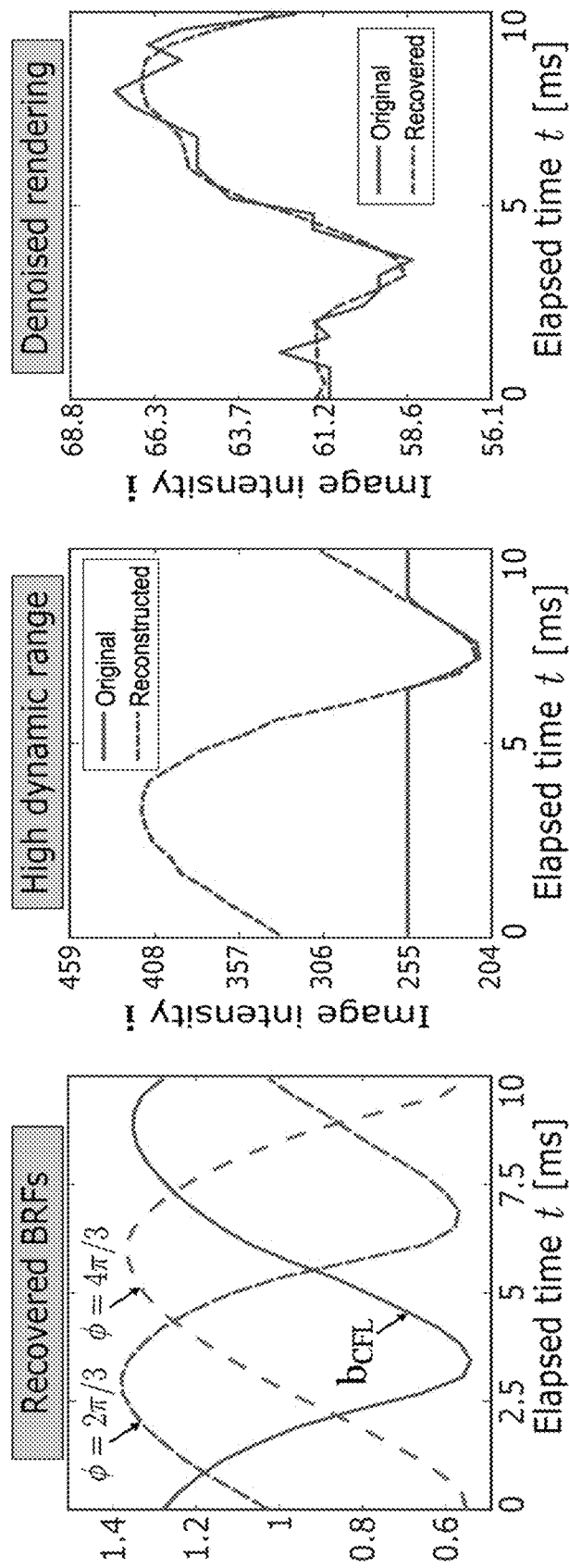
Figure 5A:
FIGS. 5A-D: Unmixing results for an (5A) outdoor scene showing phots of illumination by just (5B) a fluorescent light, (5C) a close sodium light and (5D) a farther away sodium light.
Figure 5B:
Figure 5C:
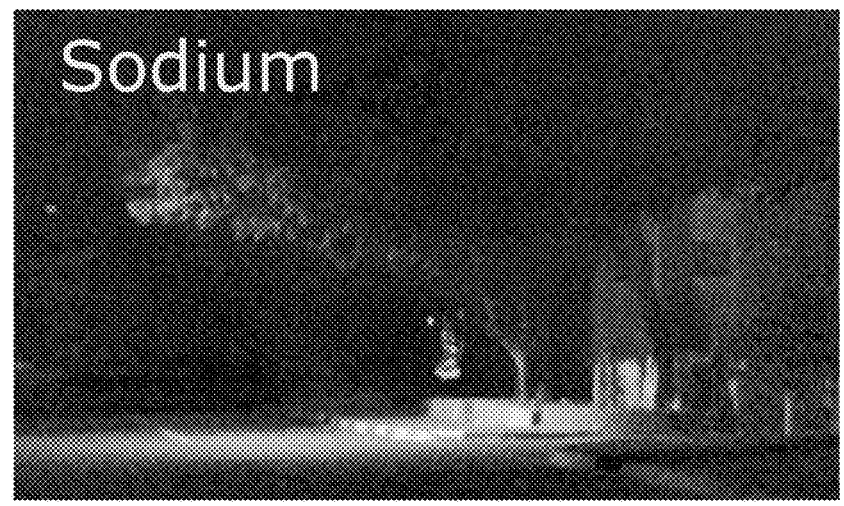
Figure 5D:

We can now reconstruct the single-source image sequence of a source s using $$\hat{I}_s = \hat{\tau}_s Q_s \text{shift}(\phi_s, b_s) \qquad (19)$$

where $\hat{\tau}_s$ is the corresponding column of $\hat{T}$. The intensities in this sequence can safely exceed the saturation level of the sensor. This is because Eqs. (16) and (17) bypass saturated data when estimating $\hat{T}$. We therefore obtain high dynamic range results thanks to the AC (FIG. 4C).

The unmixing process also leads to denoising. Intensities in the captured image sequence suffer from sensor readout noise. Yet, since Eq. (19) forces all pixels to vary in synchrony according to a common BRF, the rendered sequence $\hat{I}_s$ is less noisy than the input data (FIG. 4D).

Example 7: Semi Reflection Separation

Figure 6A:
FIGS. 6A-C: (6A) A photo through a window showing reflection on the glass from inside. (6B-C) Temporal variations due to AC flicker are attributed to the indoor scene. ICA separates the (6B) indoor reflection from the (6C) transmitted scene. Both are recovered up to an unknown scale.
Figure 6B:
Figure 6C:

The ACam can be used to separate combined images arising from semi-reflection by transparent structures (windows, glass, etc.). This can be done with AC powered light sources on both sides of the transparent structure or when natural illumination is involved. An example of the result from such a separation when natural light is illuminating from one side of the transparent structure is shown in FIGS. 6A-C.

Example 8: ACam Further Experimental Details

Figure 11A:
FIGS. 11A-D. (11A) A photo of a scene to be illuminated by five bulbs each connected to one of three grid phases $\varphi \in P$. (11B) A standard exposure image from mixed lighting components. ACam sampled the scene, creating a sequence of K=26 sub-cycle samples. (11C) Phots of the scene unmixed using bulb BRFs from DELIGHT. This unmixing was consistent with ground truth that was obtained by lighting the scene with each bulb individually. (11D) Recovered single-source images of sodium bulb in FIG. 1C. An inset is magnified and contrast-stretched in the top images. Minor artifacts in the left images are removed by a refinement step.
Figure 11B:
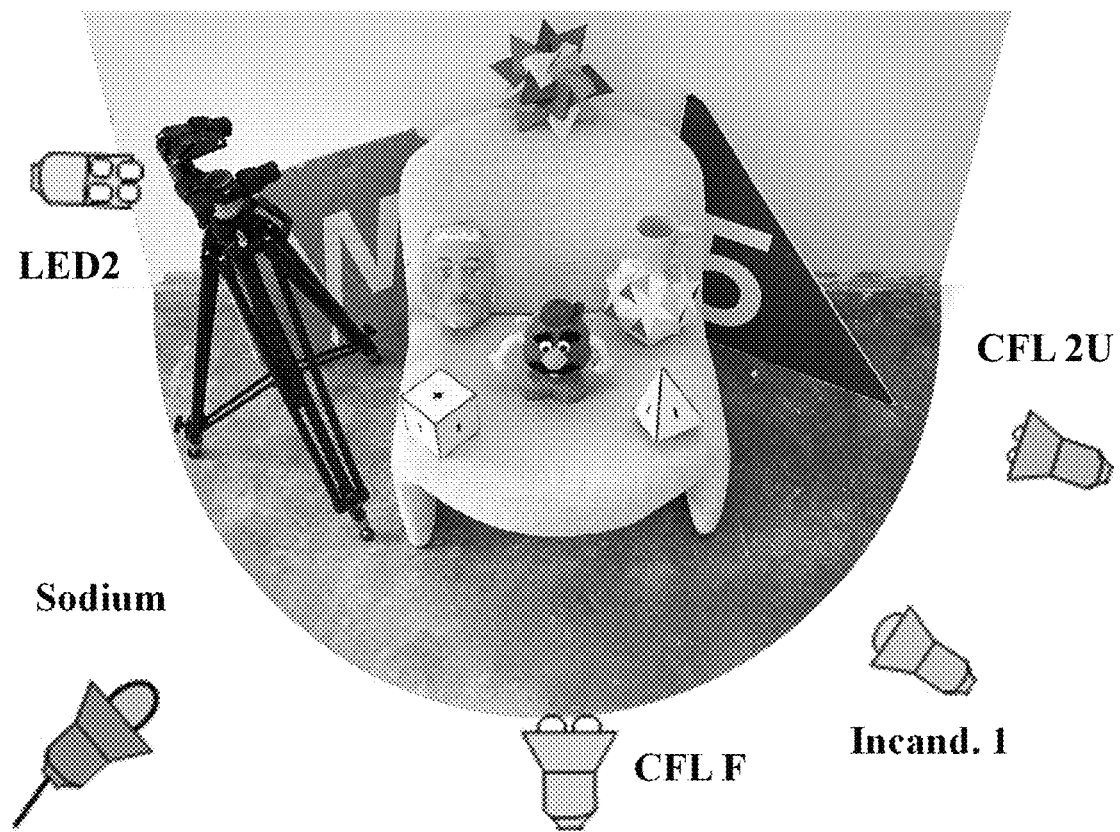
Figure 11C:
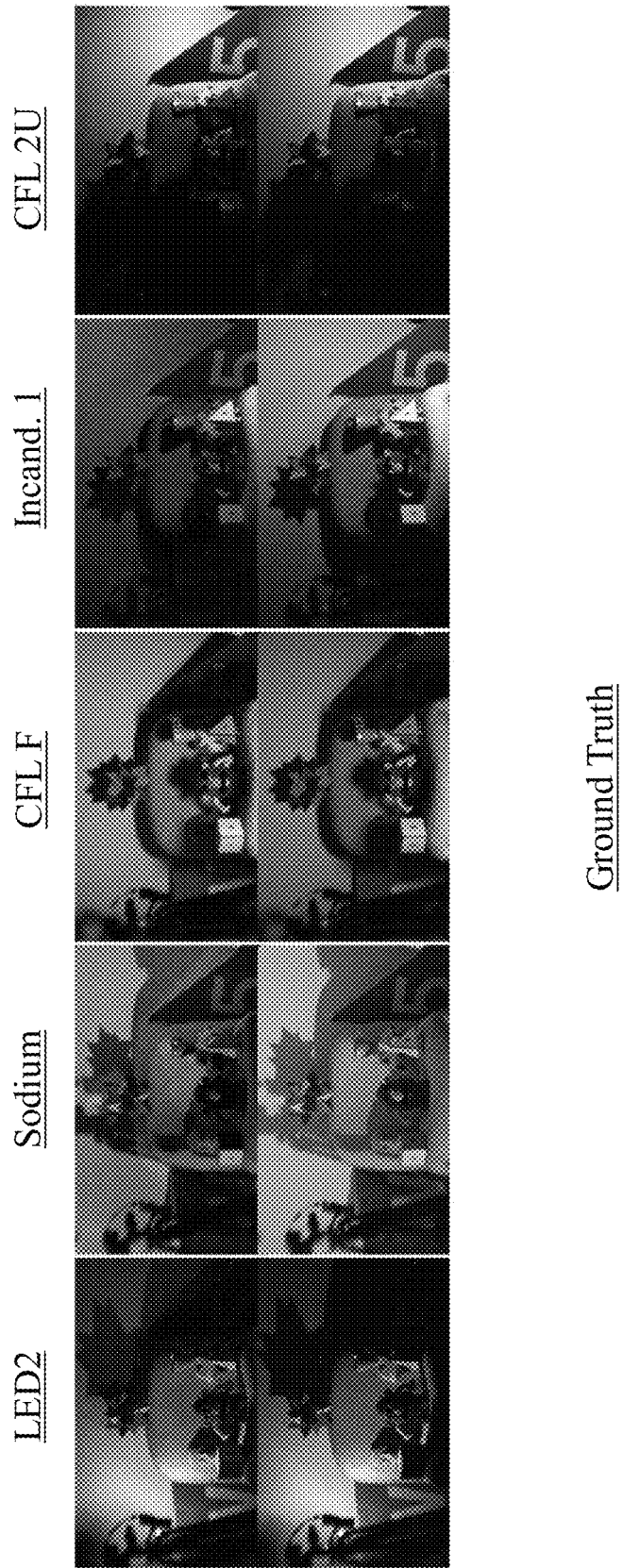
Figure 11D:
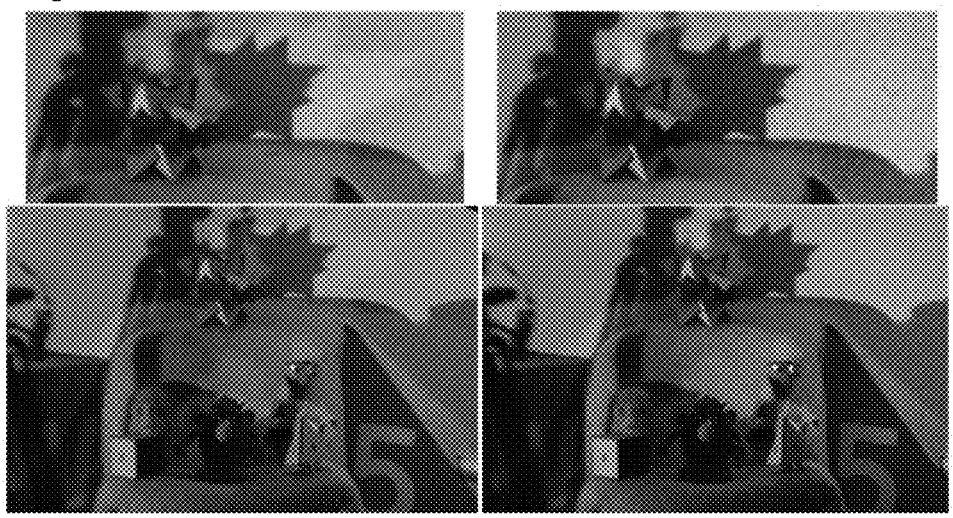
Figure 12A:
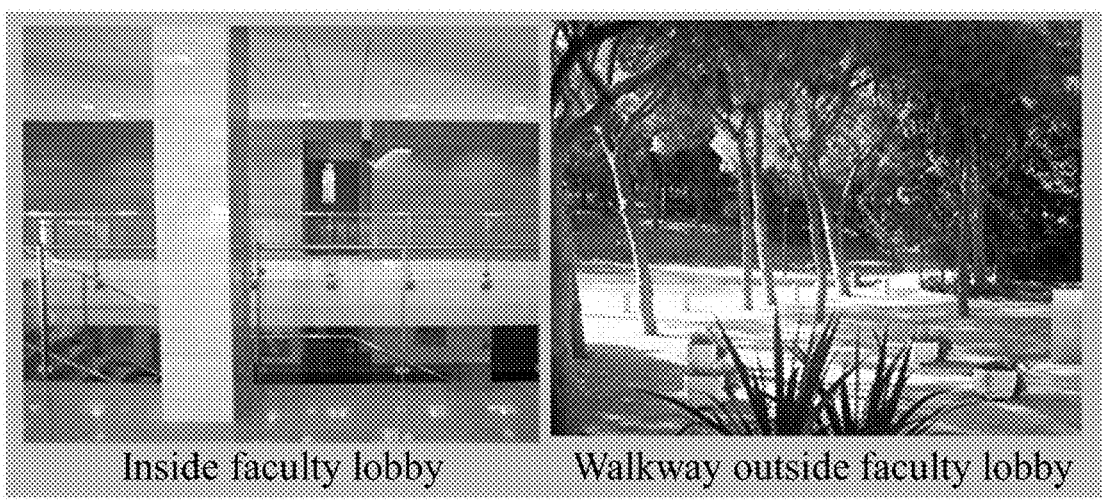
FIGS. 12A-C. Semi-reflection separation for an AC-Illuminated scene experiment. (12A) An indoor scene is illuminated by CFL-F bulbs, each connected to an arbitrary AC phase $\varphi \in P$. The ACam is placed inside the lobby, facing outside. (12B) Photo of the indoor scene in (12A) semi-reflected by a lobby glass door. At night, the outdoor scene is illuminated by a Sodium lamp. A standard exposure image shows a mixture of the semi-reflected and transmitted components. (12C) Images of the scene unmixed using S=4 source taken from DELIGHT. ACam captured a K=26 sequence using C=1200 and a camera gain of 25.
Figure 12B:
Figure 12C:
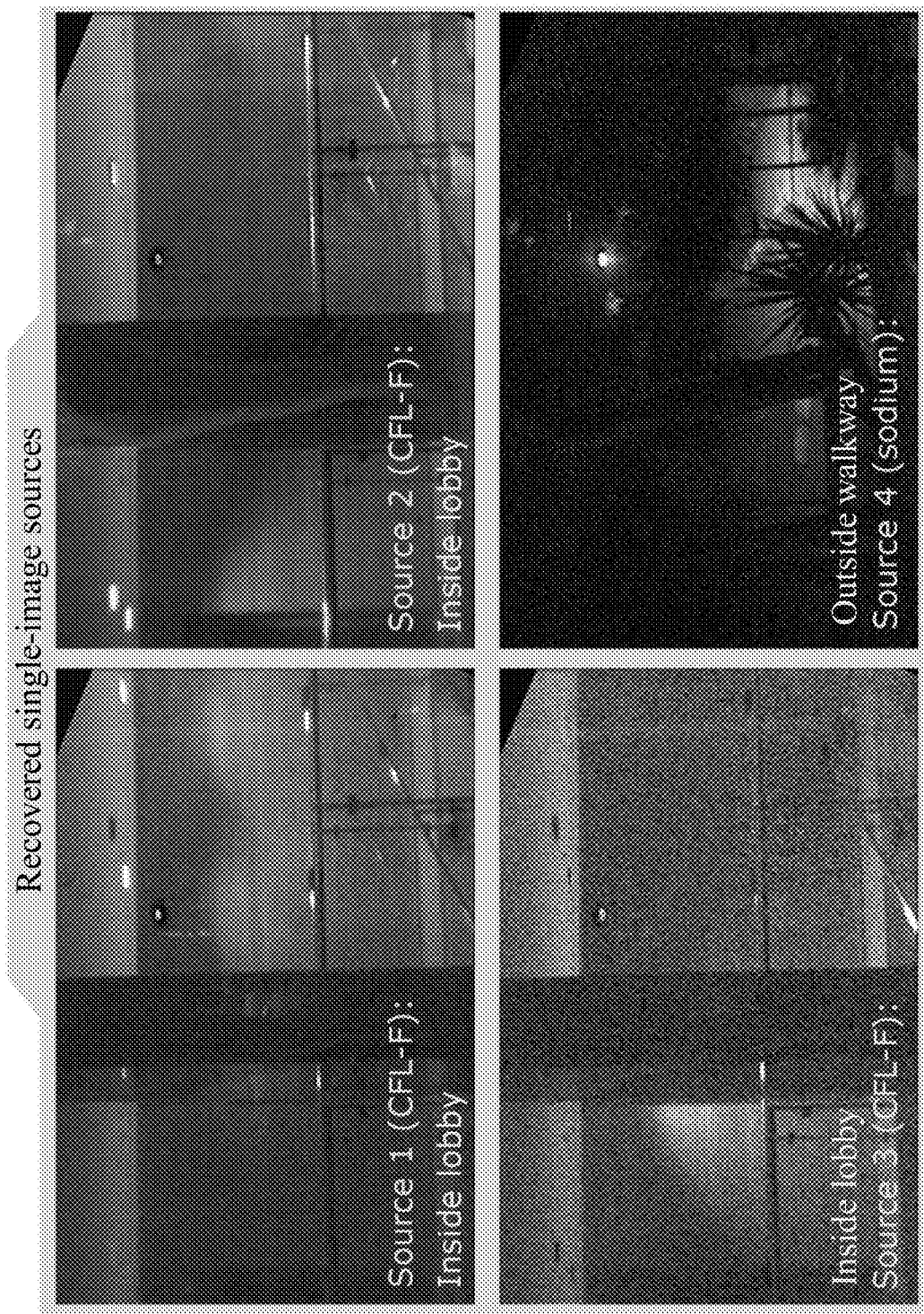

Ground Truth Experiment: FIGS. 11A-C describe a controlled lab experiment. Five different sources illuminated the scene, each arbitrarily connected to one of the grid phases $\mathbb{P} \in \{0, 2\pi/3, 4\pi/3\}$ (FIG. 11A-B). Each source is a known bulb from DELIGHT. The ACam integrated light during C=1000 cycles. The camera gain was 0. Unmixing used DELIGHT BRFs. Being a lab setting, there is ground truth to $I_s$: it was obtained by switching off all bulbs, while turning on exclusively only source s. The comparison to ground truth is shown in FIG. 11C. FIG. 11D shows the effect of refinement described in Eq. (18) for one of the sources shown in FIG. 11C.

Semi-Reflection Separation: Bulb flicker can be used for separating semi-reflections passively, using two mechanisms. Example 7 demonstrates the second mechanism, in which a scene illuminated by two light sources, one fed by AC voltage and one natural, is unmixed without prior knowledge of scene BRFs.

Here we show results for the first mechanism, which is more general and can be used to unmix scenes with an arbitrary number of illumination sources (FIG. 11A-C). The first mechanism, however, requires knowing the sources' BRFs. This is a new principle, relative to prior methods of semi-reflection separation that rely on motion, active flash/no-flash, polarization and defocus.

In FIG. 11B, both the indoor semi-reflected component and the outdoor transmitted component are under AC lighting. Indoor lighting inside the building is by sources connected to the different grid phases, yet all of them use bulb type CFL-F that appears in DELIGHT. Outdoor lighting outside this building is by sodium and fluorescent bulbs. ACam integrated C=1200 cycles. The camera gain was set to 25. FIG. 11C shows the three semi-reflected components.

Example 9: Rolling-Shutter Model for AC Flicker

Having now shown that flicker can be sensed in great detail with a specially-designed camera tethered to an AC outlet, we demonstrate that even an untethered smartphone can achieve the same task. We exploit the inter-row exposure delay of the ubiquitous rolling-shutter sensor. When pixel exposure time is kept short, this delay creates a spatiotemporal wave pattern that encodes (1) the precise capture time relative to the AC, (2) the response function of individual bulbs, and (3) the AC phase that powers them. To sense point sources, we induce the spatiotemporal wave pattern by placing a star filter or a paper diffuser in front of the camera's lens. We demonstrate several new capabilities, including: high-rate acquisition of bulb response functions from one smartphone photo; recognition of bulb type and phase from one or two images; and rendering of live flicker video, as if it came from a high speed global-shutter camera.

In some instances, we deal with a data sequence of many raw rolling-shutter frames. The sequence is converted to a canonical volume that expresses the spatiotemporal signal of flicker, as if acquired by a very fast global-shutter camera (FIG. 14). This conversion can handle temporally disorganized sequences, such as those acquired manually as stills by a smartphone. We further use this approach to render the scene at any arbitrary in-cycle canonical time, that had not been sampled during rolling-shutter data acquisition. This capability exploits the periodicity and regularity of flicker, which naturally suits Fourier analysis.

Rolling-shutter cameras have been leveraged in computational photography for three-dimensional sensing, compressed sensing and white balance. They have also been used for inter-device communication. We show experimental results using several rolling-shutter cameras: two off-the-shelf machine vision cameras and two smartphones.

Analysis Using One Image or an Image Pair

We show that from a pair, or even a single, rolling-shutter image, it is possible to extract useful information about the camera and scene illumination. This information includes (a) a flicker-independent (deflickered) image of the scene; (b) recognition of the types and electric phases of the scene's light sources; (c) image regions that are dominated by any one source; and (d) the canonical time of the image, relative to the zero-crossing of the AC-grid voltage.

This analysis mainly applies to image regions that are predominately illuminated by a single source. For example, FIG. 15A has two distinct image regions on the left and the right that are dominated by one of two sources. In regions where no source dominates (central region), the estimation degrades. We manually choose one region around a particular pixel $(r_0, c_0)$, dominated by a single source, to act as a reference whose source is connected to electric phase $\phi=0$. Moreover, here, bulb type and AC phase analysis requires prior knowledge about BRFs (e.g., DELIGHT).

For information extraction using a single image, we rely on one more assumption: that $\tau_s$ is relatively uniform in pixel neighborhoods dominated by a single source. We can also obviate this assumption, making the estimation insensitive to $\tau_s$ variations, by using a pair rather than a single image.

Figure 16A:
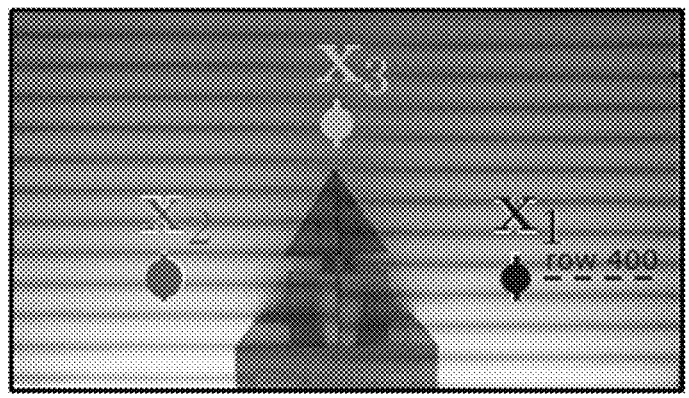
FIGS. 16A-E. Single-frame analysis. (16A) The same image as in 15B, each scene side is dominated by one of two fluorescent bulbs powered by electric phases 0 and 240. Per pixel, we search for the AC phase that best fits the flicker wave pattern in a vertical domain centered at the pixel. (16B) A schematic of the bank of W=360 samples of $B_\beta$, each corresponding to a different time $g_k^{can}$. (16C) A line graph showing the image signal $i_k^{filt}[\cdot]/\mu_{r,c}$ for $\overline{\Omega}_{x_1}$ and $\overline{\Omega}_{x_2}$ plotted in orange and purple, respectively. Superimposed are the time-shifted BRFs yielding the best match according to Eq. (40). (16D) The recovered time map $g_k^{can}$ (r,c). (16E) The estimated AC phase per pixel, $\hat{\phi}(r,c)$. Here we used the monochrome IDS camera with $T_{exp}$=1500 us.
Figure 16B:
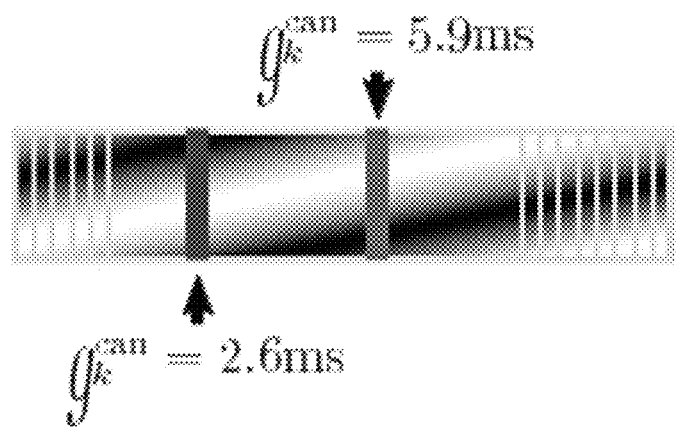
Figure 16C:
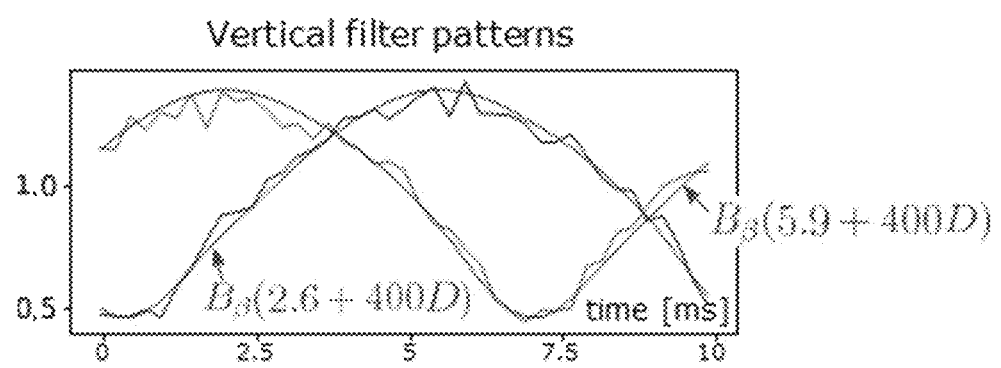
Figure 16D:
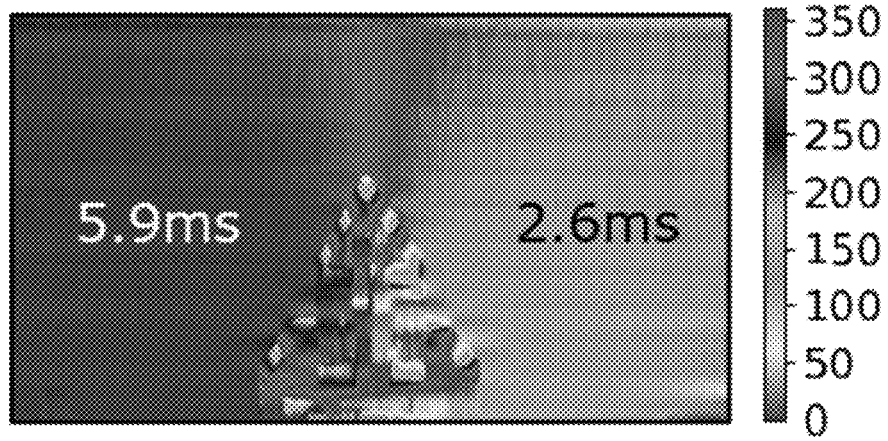

Single-Frame De-flickering by Filtering:

In FIG. 16A, pixels $x_1$, $x_2$ are in image regions dominated exclusively by either of the two bulbs. Vertical image lines $\overline{\Omega}_{x_1}$, $\overline{\Omega}_{x_2}$ are defined around each pixel according to Eq. (39). The corresponding values $i_k^{filt}[\overline{\Omega}_{x_1}]/\mu_{x_1}$, $i_k^{filt}[\overline{\Omega}_{x_2}]/\mu_{x_2}$ are plotted in FIG. 16C, where row indices are converted to canonical time using:

$$t_{k,r}^{can} = (r'-r+1)D, (r',c) \in \overline{\Omega}_{r,c} \qquad (44)$$

Figure 16E:
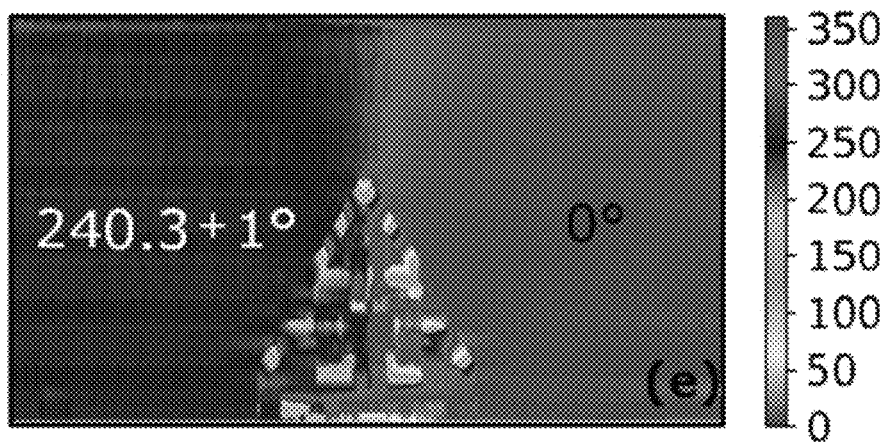

We implement Eq. (41) by searching for the optimal $g_k^{can}$ on a discrete grid having W samples, i.e. $g_k^{can}=0, \Delta/W, 2\Delta/W, \ldots$ The estimation precision is thus $\Delta/W$. In the example of FIGS. 16A-E, we manually set W=360. For $x_1$ and $x_2$, the optimal respective values of $g_k^{can}$ are 2.6 ms and 5.9 ms. Because $x_1$ is chosen to correspond to the reference electric outlet, Eq. (19) sets $\hat{t}_k^{can}=2.6$ ms. FIG. 16E maps the result to electric grid phases using Eq. (43), $\forall (r,c)$. Accordingly, the left-hand side of the image is dominated by illumination which is consistent with electric phase $\phi=240°$.

Figure 18A:
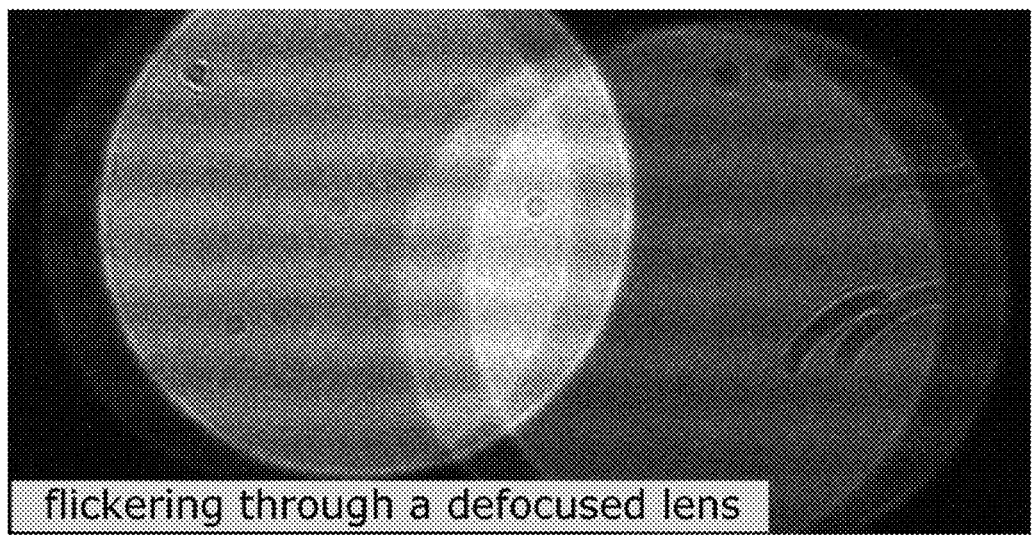
FIGS. 18A-B. (18A) Imaging the same scene as in 13B using a severely defocused lens and a rolling-shutter camera. The PSF reveals the flicker-induced wave pattern but degrades the spatial image content. (18B) The same image as 13B, imaged with a star filter, which enables bulb and phase recognition while also preserving most image details.

Example 10: Two Frames: Transport-Invariant Analysis and Optical Star-Filter for Emitter Analysis Consider scene regions having strong emitters. This is essentially the situation in wide-field cityscapes (FIG. 13B). It is generally encountered in direct measurements and analysis of AC bulbs. In images of such scenes, there is no region $\Omega$ with uniform $\tau_s$, as required above. Hence, we create $\Omega$ optically, simultaneously around all sources. The simplest way to induce $\Omega$ is to defocus the camera. Then, each light source creates a two-dimensional circular defocus point spread function (PSF), which provides support for $\Omega$, (FIG. 18A). However, defocus blur limits spatial resolution.

Figure 18B:
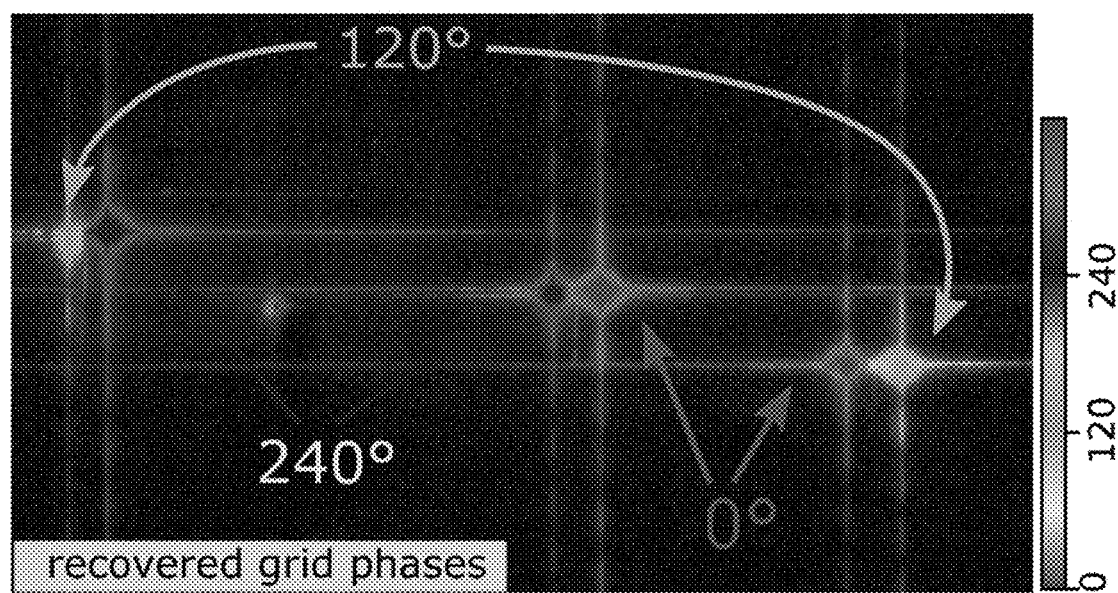

Ideally, we need an optical PSF that is vertical and narrow having a weak central point so as to minimize interference with adjacent sources. These desiderata are practically addressed by mounting an optical star-filter on the camera lens. FIG. 13B shows a cityscape scene viewed by a rolling-shutter camera through a Star-4 filter aligned with the sensor's axes. Most of the light sources are bright and spatially resolved, despite minor overlap caused by the star PSF. The vertical arms of the PSF play the role of $\Omega$, modulated by $B_s(t_k^{can}+rD-\phi_s\Delta/2\pi)$ for each source s. We acquired two star-filtered images: $i_k^{roll}$ (FIG. 13B) and $i^{DC}$ (Eq. 33). We then followed the process described hereinabove to recognize the bulbs and recover their electric phases (FIG. 18B).

Example 11: Canonical Volume from an Image Sequence

In order to demonstrate that canonical volume can be extrapolated from an image sequence, a OnePlus cellphone with exposure set to 1/500 seconds was used for manual triggering of 138 rolling-shutter frames. The results, including rendered from different time points are provided in FIGS. 20A-E.

Example 12: More Experimental Details

We used two rolling-shutter machine-vision cameras: IDS UI-155xLE (color) and IDS UI-348xLE (monochrome). In addition, sequences were captured using a OnePlus 3 smartphone mounted on a tripod and triggered manually, as well as an iPhone 7. The exposure time was set per scene depending on its brightness. We used a HOYA 52 mm cross-screen filter to capture emitter scenes. For our smartphone cameras, we estimated D using a still image of a smooth surface. Then, we applied a spatial discrete Fourier transform on a long vertical line $\bar{\Omega}$, and detected the spatial frequency having the strongest signal energy.

Figure 22A:
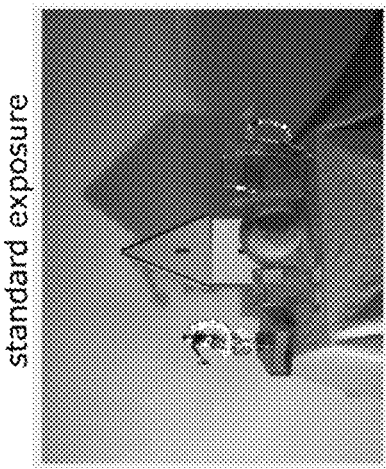
FIGS. 22A-C. Light transport decomposition. (22A) A scene illuminated by four different bulbs. In a standard long exposure, illumination from all sources is mixed together. (22B) Recovered images of the scene as it would appear illuminated by each individual source. We capture 120 rolling-shutter frames (not shown) and estimate a 25-frame global-shutter sequence of the scene. We then apply source unmixing as described herein. BRFs used here for unmixing were extracted as described in Example 14. (22C) Ground-truth single-source images captured by turning on each source individually.
Figure 22B:
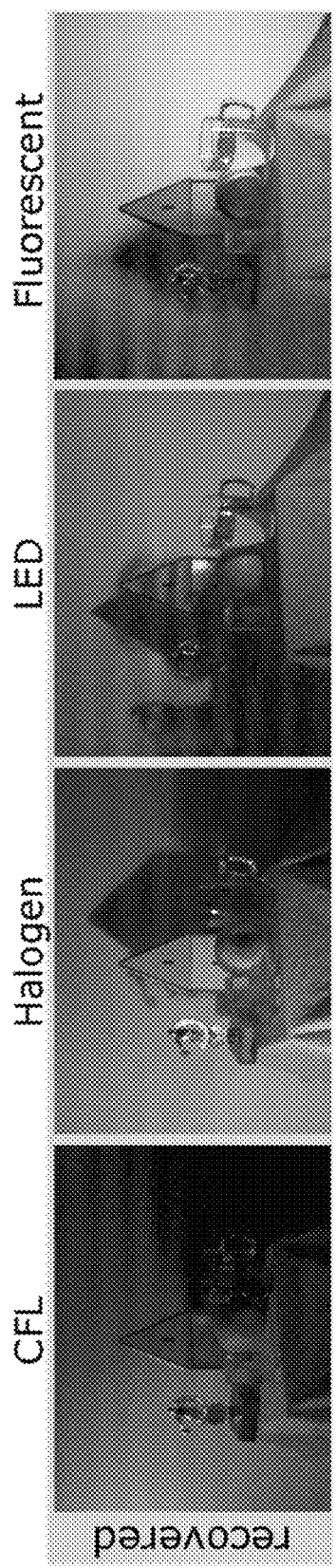
Figure 22C:
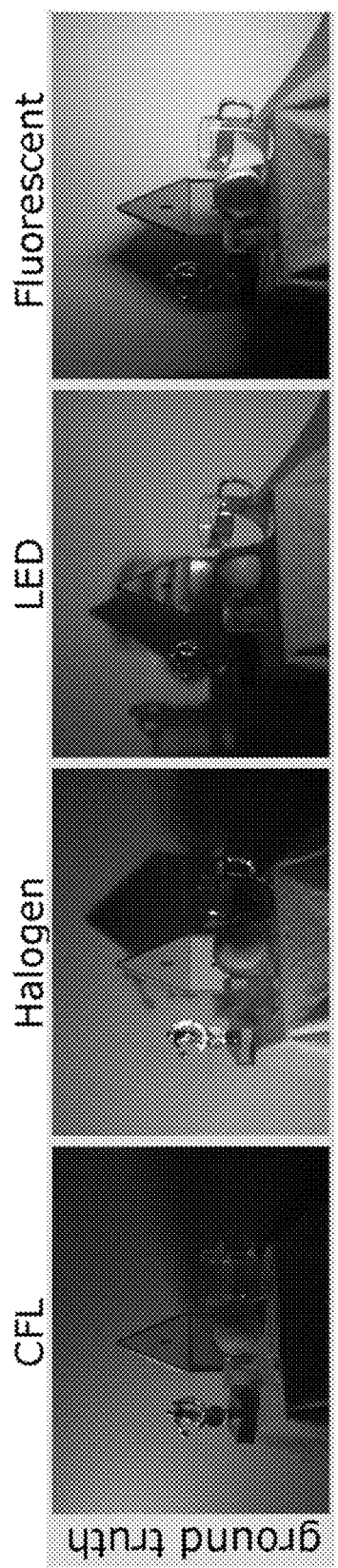

The emulated global-shutter images resulting from Example 17 enable source separation as with the ACam. An example is shown in FIGS. 22A-C. Here, the reference pixel for estimating the shift δ relative to the AC zero crossing was in a region dominated by an LED (listed as LED2 in DELIGHT). As seen in the figure, the unmixing (FIG. 22B) is consistent with the ground truth (FIG. 22C).

Figure 23:
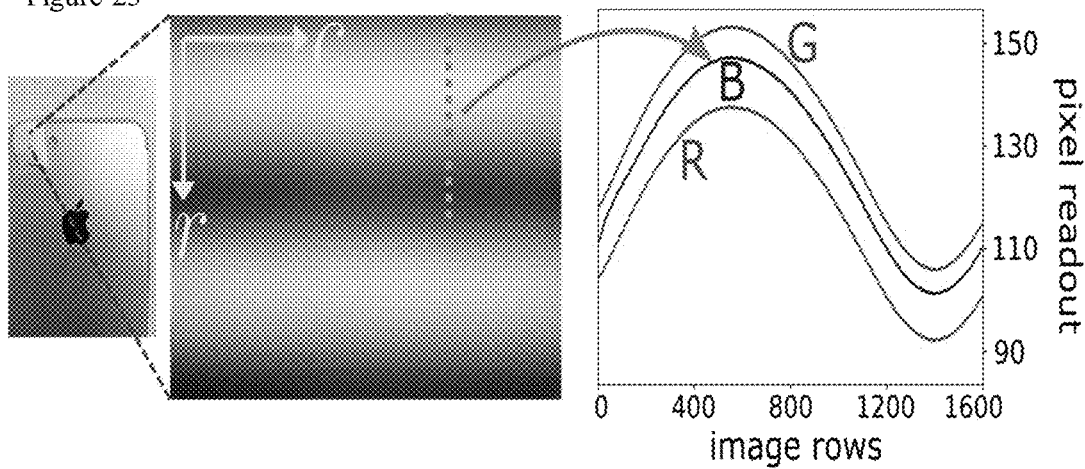
FIG. 23. An image of the white printer paper placed over an iPhone 7 camera lens with the camera pointed at a bulb (Left). The paper diffused the bulb's illumination, destroying all scene-dependent spatial image variations and making $\tau_s$ uniform. The resulting image captured the bulb response function curve at high temporal resolution, for three color bands, which is shown in a line graph. To reduce noise, we averaged across columns.

We acquired BRFs in separate, dedicated images in which the camera's inter-row delay D is minimal. We did this in two ways: The first way was to place a paper diffuser in front of a smartphone lens as in FIG. 23. This allowed us to measure BRFs up to an unknown shift δ. The second, which allows measurement of the exact BRF, is to image a white wall without a diffuser, similar to the setup in FIG. 16A. This wall was illuminated from two sides by two bulbs. One bulb was the one for which we needed to measure the BRF. The other bulb was a known reference (LED2 of DELIGHT) which provided δ.

Example 13: Comparison to the ACam

The electronic control of the ACam can be replaced by computational post processing that assigns $t^{cam}$ to each frame and row. This enables a rolling-shutter camera to operate asynchronously when capturing an image sequence. In contrast, data acquisition in the ACam is intermittently suspended during operation by a controller enslaved to AC zero crossings. Moreover, as typically the inter-row delay is much smaller than a flicker period, a rolling shutter offers very dense temporal sampling of flicker. The ACam is essentially a global-shutter system, which does not exploit the spatial domain for temporal sampling. These characteristics offer a speed advantage to a rolling shutter system.

Figure 24A:
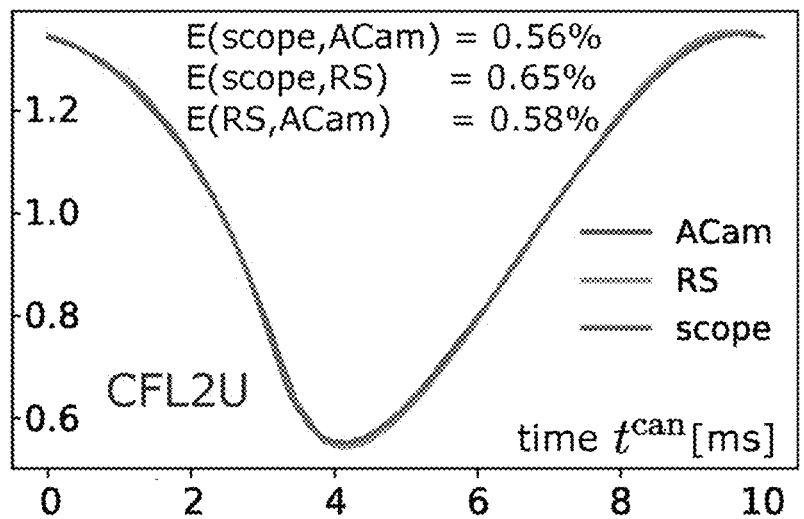
FIGS. 24A-C. (24A-B) BRF curves measured by three methods: ACam, rolling shutter (RS) using the method of Example 14, and a photodiode for (24A) a CFL2U bulb and (24B) a LED2. (24C) A chart of the computed Mean Absolute Difference, normalized by BRF amplitude, between each pair of methods, per bulb. The curves are consistent. Because ACam yields only 26 BRF samples, its measurement of the LED2 BRF is somewhat inferior.
Figure 24B:
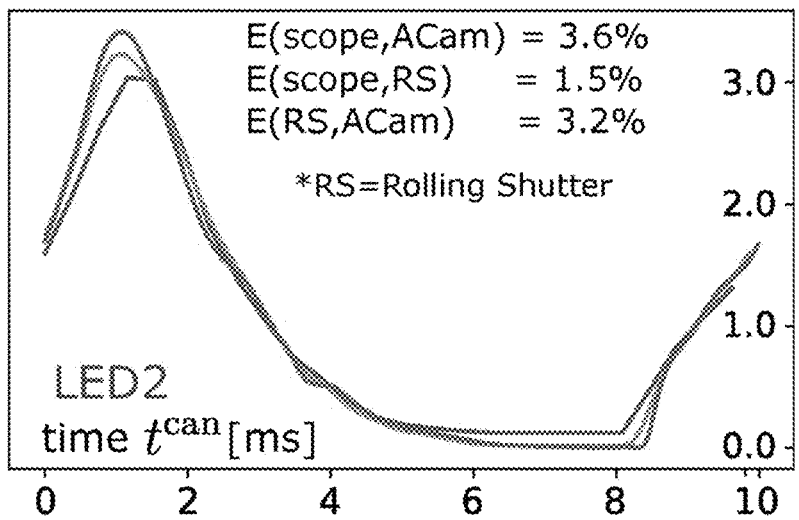
Figure 24C:
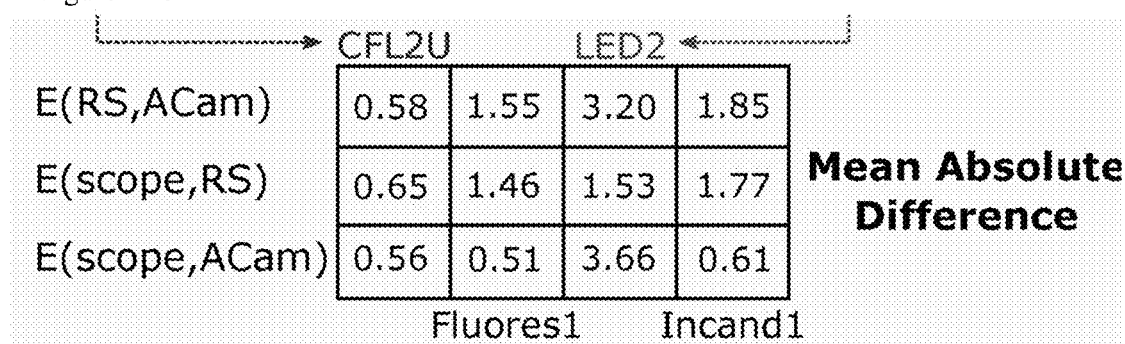

Unlike our rolling-shutter system, the ACam has relay optics, which limit the system's overall numerical aperture and complicate the system's robustness. Consequently, the ACam needed significantly longer exposures than our rolling-shutter system. Experiment times ranged between 26-400 sec, depending on scene illumination strength, while yielding 26 samples of a flicker cycle. In comparison, the experiment of FIG. 21, which shows our dimmest scene, needed less than 7 sec to yield 80 samples of a flicker cycle. Moreover, in Examples 14 and 15, one or two frames lasting at most 0.2 secs provided similar information about AC phases (in uncluttered areas), for which the ACam required a full set of images. The quality of our rolling shutter measurements is shown in FIGS. 24A-C. The figures show that the quality of the systems is comparable, while rolling shutter offers an advantage when high temporal sampling is needed.

The ACam still has advantages, though. Being a coded aperture system, ACam can integrate optically an arbitrarily large number of flicker cycles. This enables superior dynamic range and sensitivity to low-light conditions, with which rolling-shutter readouts are currently incompatible.

Figure 25:
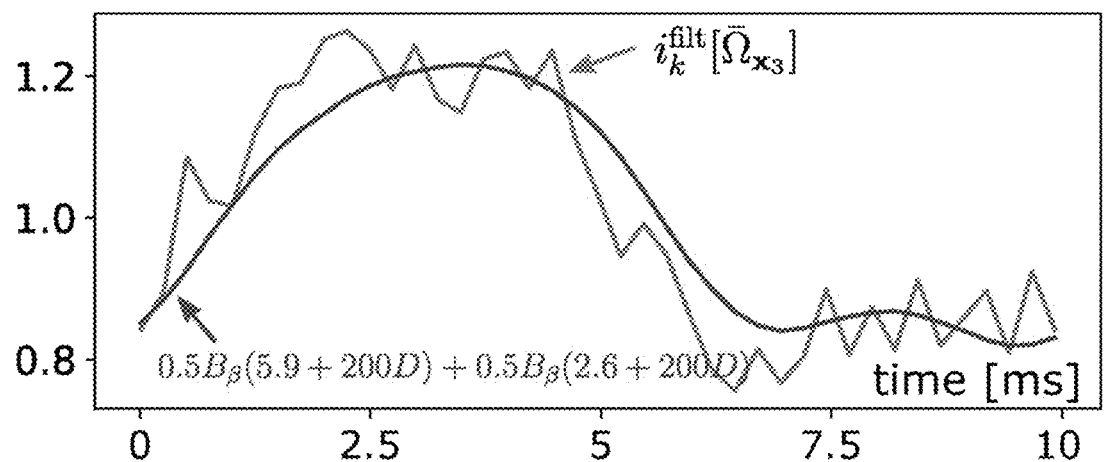
FIG. 25. A line graph demonstrating crude single-image unmixing. In the scene of 16A, pixel $x_3$ resides in a region affected strongly by two bulbs. Therefore, the vertical flicker signal around $x_3$ (in blue) is a mixture of their BRFs. Here we show that this is approximately an equal-weight mixture (red curve).

In some ways the rolling shutter approach is much simpler than a tethered coded-aperture system of ACam. It enables practical use of flicker for computer vision methods that rely on illumination and reflection modulation, e.g., photometric stereo, shape from shadows and spacetime stereo. Bulb recognition can assist in color balancing. Flicker may assist smartphones in separating window reflections as the ACam can. Scene separation into single-source images can be done using a sequence of rolling-shutter images in real-time (FIG. 22B). Further, a single rolling-shutter image can yield coarse image source unmixing (FIG. 25).

The invention claimed is:

1. A system comprising:
    an imaging device comprising a rolling shutter imaging sensor;
    at least one hardware processor; and
    a non-transitory computer-readable storage medium having stored thereon program instructions, the program instructions executable by the at least one hardware processor to:
        operate the imaging device to capture at least one image of a scene illuminated at least by a light source powered by an AC (Alternating Current) power source,
        generate a de-flickered version of said at least one image by extracting, for each pixel in said image, a flicker-independent intensity value,
        estimate, in said at least one image, a set of pixel intensity values for a vertical or horizontal sequence of pixels corresponding to one flicker cycle,
        compare said set of pixel intensity values to a database of sets of pixel intensity values corresponding to a plurality of light sources, and
        identify said light source as one of said plurality of light sources in the database, wherein said estimating is based, at least in part, on applying to said image at least one digital bandstop filter having a frequency response which blocks multiple harmonics of a base frequency given as a multiple of (i) an inter-row or inter-column delay value of said rolling shutter, divided by (ii) a duration of a cycle of said AC power source.

2. The system of claim 1, wherein said identifying comprises determining one or more characteristics of said AC power source selected from the group consisting of: a temporal point in said flicker cycle, a phase of said AC power source, phase changes of said AC power source, frequency fluctuations of said AC power source, amplitude of said AC power source, amplitude fluctuations of said AC power source, and nonlinearities in said AC power source.

3. The system of claim 1, wherein said identifying comprises one of: (i) comparing said set of pixel intensity values to a database of sets of pixel intensity values corresponding to a plurality of light sources, and (ii) applying a machine learning classifier to a set of pixel intensity values for a vertical or horizontal sequence of pixels in said at least one image corresponding to one flicker cycle, wherein the classifier was trained on a plurality of sets of pixel intensity values corresponding to a plurality of labeled light sources.

4. The system of claim 1, wherein said at least one image comprises a first image and a second image, wherein an exposure time used for said capturing of said second image is equal to an integer multiple of said flicker cycle, and wherein said estimating is based, at least in part, on said second image.

5. The system of claim 1, wherein said light source is within direct view of said imaging device, and wherein said image is captured using an optical filter operatively coupled to said imaging device, wherein said optical filter has a transfer function that creates stripes in the captured image.

6. The system of claim 1, (i) wherein said instructions further comprise operating said imaging device to capture a plurality of images, and (ii) wherein said estimating is based, at least in part, on estimating a temporal difference between each pair of images, based at least in part on relative intensity values of corresponding pixels in said pair of images.

7. The system of claim 1, wherein said instructions further comprise operating said imaging device to capture a plurality of images over a specified period, and wherein said identifying further comprises generating a global-shutter image at any point during said period, based, at least in part, on estimating a Fourier series coefficients of a temporal signal observed at each pixel in said images.

8. The system of claim 1, wherein said system is further configured for creating and storing a database of light sources, based, at least in part, on said detecting, wherein said database further comprises, for each light source, at least one of a type, a manufacturer, and a power rating.

9. A system comprising:
an imaging device comprising an imaging sensor and a shutter configured to move between a closed position and an open position;
at least one hardware processor; and
a non-transitory computer-readable storage medium having stored thereon program instructions, the program instructions executable by the at least one hardware processor to:
generate a signal having level changes corresponding to specified points in a cycle of a waveform detected from a mains alternate current (AC) outlet,
move said shutter into said open position based upon said level changes, for a specified number of said cycles,
operate the imaging device to capture image data of a scene illuminated by a plurality of light sources, wherein said image data is being captured when said shutter is in said open position during said specified number of cycles, and
extract, from said image data, components related only to a selected one of said plurality of light sources, wherein said extraction is based on detecting at least some of (i) a light response function, (ii) a chromaticity value, and (iii) an electric phase of said light source,
operatively coupled to said shutter, and wherein said capturing comprises defining a sequence of one or more of said shutter masks, wherein each of said shutter masks is applied to said shutter in said sequence, during each period when said shutter is in a said open position within a said cycle.

10. The system of claim 9, wherein each of said open position has a duration of at least 1 microsecond, and wherein said specified number of cycles is at least 2.

11. A method comprising:
operating a rolling shutter imaging sensor to capture one or more images of a scene that is illuminated, at least in part, by a light source powered by an AC power source;
estimating pixel intensity values for a vertical or horizontal sequence of pixels in the one or more images, the sequence corresponding to a flicker cycle of the light source;
determining an identity of the light source, based on the estimation; and
performing at least one of:
(a) color-correcting at least one of the one or more images, based on the determined identity of the AC-powered light source;
(b) determining a phase of the AC power, based on the estimation; and
(c) when the scene is illuminated by more than one light source, at least one of which is AC-powered, creating at least one new images of the scene, said new image simulating an appearance of the scene under illumination by not all of the more than one light source.

12. The method of claim 11, further comprising generating a de-flickered version of an image of said one or more image by extracting, for each pixel in said image, a flicker-independent intensity value, and wherein said estimating is based, at least in part, on applying to said image at least one digital bandstop filter having a frequency response which blocks multiple harmonics of a base frequency given as a multiple of (i) an inter-row or inter-column delay value of said rolling shutter, divided by (ii) a duration of a cycle of said AC power source.

13. The method of claim 11, wherein said determining of an identity comprises determining one or more characteristics of said AC power source selected from the group consisting of: a temporal point in said flicker cycle, a phase of said AC power source, phase changes of said AC power source, frequency fluctuations of said AC power source, amplitude of said AC power source, amplitude fluctuations of said AC power source, and nonlinearities in said AC power source.

14. The method of claim 11, wherein determining an identity further comprises one of:
(i) comparing said pixel intensity values to a database of pixel intensity values corresponding to a plurality of light sources, and
(ii) applying a machine learning classifier to pixel intensity values for a vertical or horizontal sequence of pixels in said at least one image corresponding to one flicker cycle, wherein the classifier was trained on a plurality of pixel intensity values corresponding to a plurality of labeled light sources.

15. The method of claim 11, further comprising operating said imaging sensor to capture a first image and a second image, wherein an exposure time used for capturing said second image is equal to an integer multiple of said flicker cycle, and wherein said estimating or said application of said classifier is based, at least in part, on said second image.

16. The method of claim 11, further comprising operating said imaging sensor to capture a plurality of images, (ii) wherein said estimating or said application of said classifier is based, at least in part, on estimating a temporal difference between each pair of images, based at least in part on relative intensity values of corresponding pixels in said pair of images.

17. The method of claim 11, further comprising operating said imaging sensor to capture a plurality of images over a specified period, and wherein said determining an identity further comprises generating a global-shutter image at any point during said period, based, at least in part, on estimating a Fourier series coefficients of a temporal signal observed at each pixel in said images.

* * * * *